Figure 1:
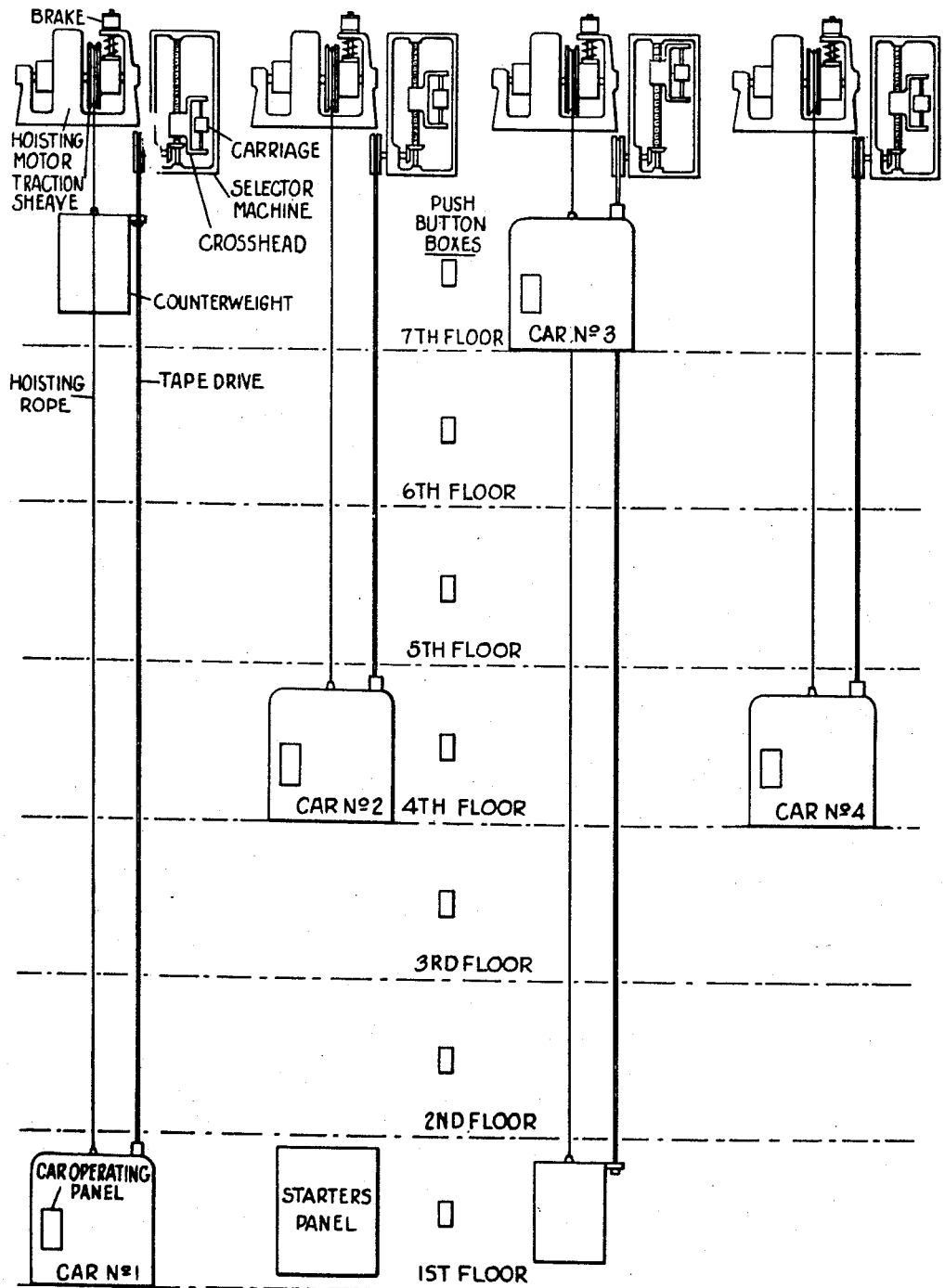

April 26, 1949.　　　G. WATSON　　　2,468,317
DISPATCHING SYSTEM FOR ELEVATORS
Filed April 24, 1946　　　21 Sheets-Sheet 1

Gavin Watson　INVENTOR
BY _Matthew E. Bradley_　ATTORNEY

April 26, 1949. G. WATSON 2,468,317
DISPATCHING SYSTEM FOR ELEVATORS
Filed April 24, 1946 21 Sheets-Sheet 3

Gavin Watson INVENTOR
BY *(signature)* ATTORNEY

April 26, 1949. G. WATSON 2,468,317
DISPATCHING SYSTEM FOR ELEVATORS
Filed April 24, 1946 21 Sheets-Sheet 4

Gavin Watson INVENTOR
BY Walter E. Bradley ATTORNEY

April 26, 1949.   G. WATSON   2,468,317
DISPATCHING SYSTEM FOR ELEVATORS
Filed April 24, 1946   21 Sheets-Sheet 8

April 26, 1949.  G. WATSON  2,468,317
DISPATCHING SYSTEM FOR ELEVATORS
Filed April 24, 1946  21 Sheets-Sheet 10

Gavin Watson  INVENTOR
BY Walter F. Bradley  ATTORNEY

April 26, 1949.    G. WATSON    2,468,317
DISPATCHING SYSTEM FOR ELEVATORS
Filed April 24, 1946    21 Sheets-Sheet 12

FIG. 5a

Gavin Watson    INVENTOR
BY Walter E. Bradley    ATTORNEY

April 26, 1949.   G. WATSON   2,468,317
DISPATCHING SYSTEM FOR ELEVATORS
Filed April 24, 1946   21 Sheets-Sheet 15

Gavin Watson   INVENTOR
BY Matthew E. Bradley   ATTORNEY

April 26, 1949.　　　　G. WATSON　　　　2,468,317
DISPATCHING SYSTEM FOR ELEVATORS
Filed April 24, 1946　　　　　　　　　　21 Sheets-Sheet 17

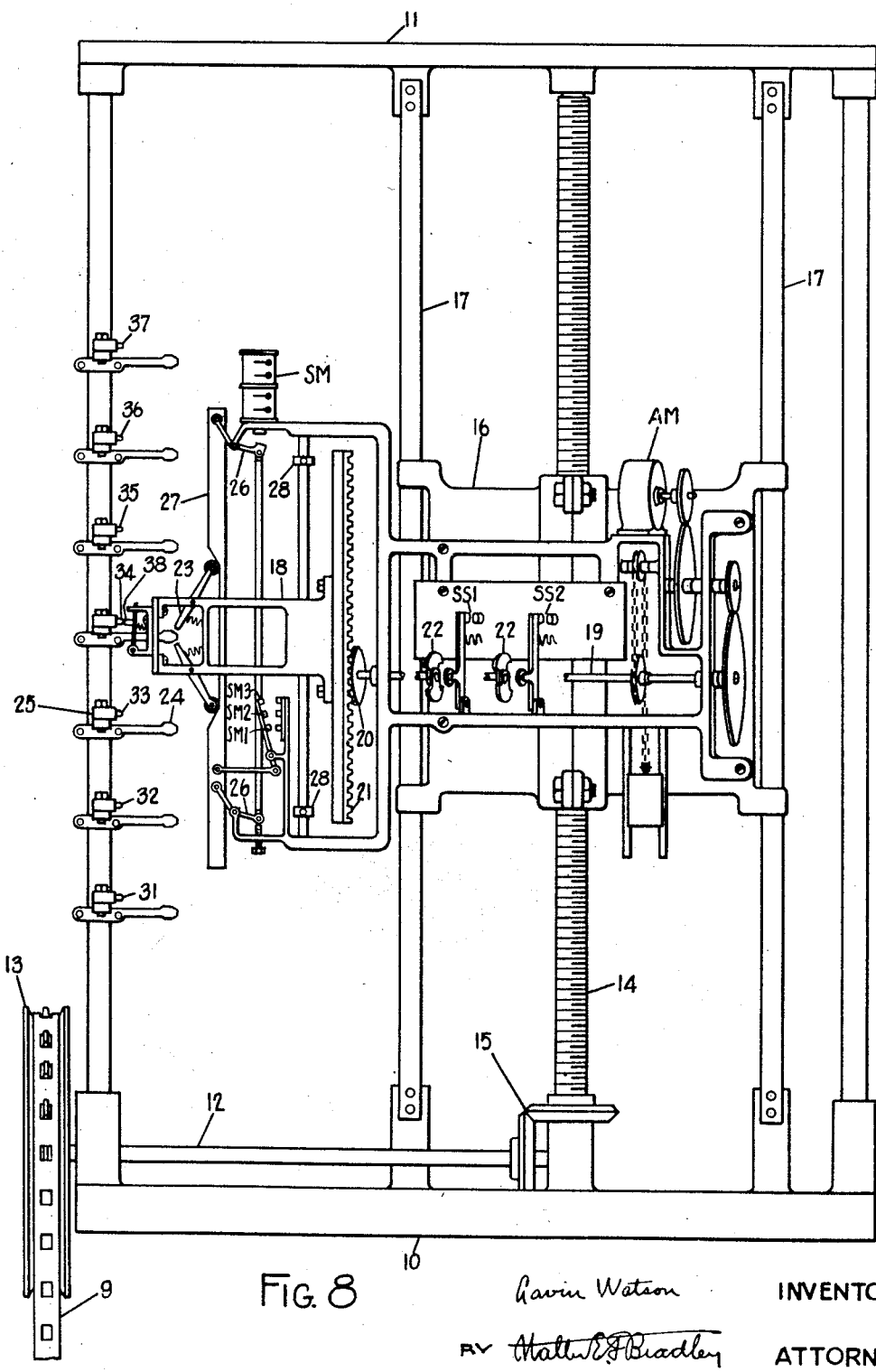

Patented Apr. 26, 1949

2,468,317

UNITED STATES PATENT OFFICE 2,468,317

DISPATCHING SYSTEM FOR ELEVATORS

Gavin Watson, Ossining, N. Y., assignor to Otis Elevator Company, New York, N. Y., a corporation of New Jersey Application April 24, 1946, Serial No. 664,500

32 Claims. (Cl. 187—29)

The invention relates to dispatching systems for elevators.

In certain types of elevator installations in which floors of the building are served by a plurality of elevator cars and in which high quality service is desired, dispatching mechanism is provided for dispatching the cars on their trips. It is desirable under certain traffic conditions that the cars be distributed to balance them against the traffic. Dispatching systems have been provided in which with the cars distributed in a desired manner to balance them against traffic they will be dispatched to continue that distribution.

The object of the invention is to provide a dispatching system for elevators in which when the cars are not distributed in the manner desired they are automatically dispatched so as to place them in that distribution.

The invention will be described as applied to a dispatching system in which the cars are given "up" starting signals to dispatch them on up trips and "down" starting signals to dispatch them on down trips. These signals are initiated by dispatching mechanism at regular intervals of time. When traffic in each direction is approximately equal, with an even number of cars in service, the "up" signals and "down" signals are initiated simultaneously and, with an odd number of cars in service, the "up" signals and "down" signals are initiated alternately. When there is both up and down traffic but traffic in one direction is predominant, with an even number of cars in service, the "up" signals and "down" signals are initiated alternately and, with an odd number of cars in service, the "up" signals and "down" signals are initiated simultaneously. When traffic in each direction is approximately equal, the cars are balanced against traffic by distributing them so that in effect there is the same number of cars on one trip as on the other trip. Thus, with the cars so distributed, they are dispatched so as to continue that distribution. When under up and down traffic conditions traffic is predominant in one direction, the cars are balanced against traffic by distributing them to provide in effect more cars for the trip in the direction of traffic predominance than for the trip in the other direction. Thus, with the cars so distributed, they are dispatched to continue that distribution.

In applying the invention to such a system provision is made so that should the cars get out of balance, the cars are automatically dispatched so as to place them in balance. With the system in operation for conditions of approximately equal up and down traffic, should the cars become distributed so that there is not in effect the same number of cars on one trip as on the other trip, a corrective starting signal is given to dispatch a car in a direction to restore the distribution. Also, with the system in operation for conditions of up and down traffic but with traffic predominant in one direction, should the cars become distributed so that there is not the proper number of cars on each trip for that traffic condition, a corrective starting signal is given to dispatch a car in a direction to restore the distribution. When the system is changed from operation under one traffic condition to operation under another, the dispatching of the cars is controlled so as to automatically place the cars in proper distribution for the new traffic conditions. Should the system be changed from operation under conditions of approximately equal up and down traffic to operation under conditions of up and down traffic with predominant traffic in one direction, either up or down, the giving of the starting signals is automatically controlled so as to dispatch the cars to place more cars on a trip in the direction of traffic predominance to thereby automatically place the cars in proper distribution for the new traffic condition. Should the system be changed from operation under conditions of up and down traffic with traffic predominance in one direction to operation under conditions of approximately equal up and down traffic, the giving of the starting signals is automatically controlled so as to dispatch the cars to place in effect the same number on a trip in each direction, again to thereby automatically place the cars in proper distribution for the new traffic condition. Proper distribution for the new traffic condition is also automatically effected when the system is changed from operation under conditions of traffic predominance in one direction to operation under conditions of traffic predominance in the other. When the number of cars in service is changed, the dispatching of the cars is controlled so as to automatically place the cars in proper distribution for the new number of cars in service, regardless of whether the system is in operation for conditions of approximately equal up and down traffic or for traffic predominance in one direction.

Manually operable control switching mechanism is provided for setting the system for the particular traffic conditions. This switching mechanism is illustrated in the form of a plural position switch, one position for approximately equal up and down traffic, one position for traffic predominance in the up direction and one position for traffic predominance in the down direction. Provision is made so that when this switch is moved from any one of these positions to another, the cars are dispatched so as to automatically place them in the proper distribution for the new traffic conditions. This switch is also provided with positions to cause operation of the dispatching mechanism either for conditions when substantially all traffic is in the up direction or for conditions when substantially all traffic is in the down direction. Provision is also made so that when the switch is moved from either of these positions to any one of the up and down traffic positions, the cars are dispatched to automatically place them in proper distribution for the particular up and down traffic positions to which it is moved. Manually operable control switching mechanism is also provided for determining the number of cars in service. Provision is made so that upon operation of this switching mechanism to add one or more cars or take one or more cars out of service, the cars are dispatched so as to automatically place them in the desired distribution.

When the cars get out of balance with respect to traffic, should a corrective starting signal and a regular timed starting signal be in overlapping relation, the corrective signal is retained for another car so that the dispatching of a car thereby to obtain the desired distribution is assured.

The invention is especially applicable to installations in which the cars are stopped at the floors in response to calls registered by push buttons at such floors or in the cars for such floors, with the starting of the cars under control of attendants in the respective cars and is illustrated as applied to such an installation. In the system shown, if a car under conditions of up and down traffic, either approximately equal or predominant in either direction with no car at the upper terminal, reaches the upper terminal before the time arrives for the giving of the starting signal, the starting signal is assigned to this car. However if, as the time arrives to give a signal to start a car down, no car is at the upper terminal, this signal is assigned to a car in a certain zone below the upper terminal which reaches its highest call, that is, highest car call or down hall call with no up hall call registered for the corresponding floor and no call registered for a floor above. Such a car is caused to stop at the floor for which such highest call is registered and become set for travel in the down direction, the signal being given as the car is brought to a stop. If a car has no call above under conditions where no car is at the upper terminal as the time arrives to give the starting signal, the signal is assigned to this car, it being brought to a stop at the first floor in the selection zone at which a stop can be made and its direction of travel set for down. Should no car be eligible to receive the signal to start down within a predetermined period after the time arrives to give this signal, or should a car receive the starting signal at the upper terminal and not leave before the expiration of this period, a detent operation takes place. If there is a detent and a car has received the signal at the upper terminal, the detent is released as soon as the car leaves. If no car is at the upper terminal, the detent is released upon a car in the selection zone reaching its highest call or upon a car entering the zone in the event it has reached its highest call at a floor below. Under conditions where traffic is in both the up and down direction, starting signals are given to start the cars on their upward trip at regular intervals and a detent operation takes place only in the event a car does not leave within a certain period after the time arrives for giving the starting signal.

The mode of carrying out the invention which is at present preferred and various features and advantages thereof will be gained from the above statements and from the following description and appended claims.

Figure 9:
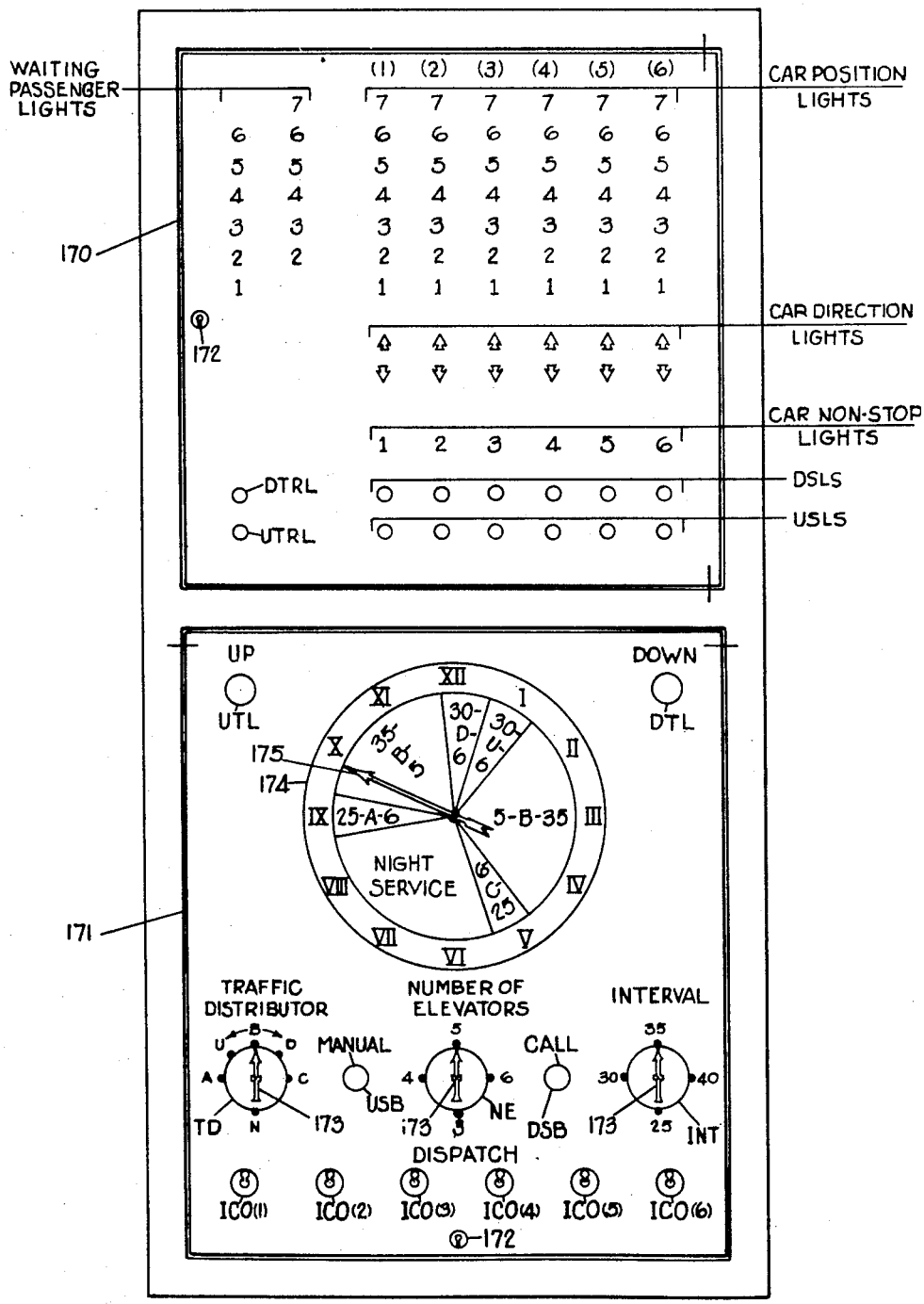

In the drawings:

Figure 1 is a schematic diagram of an elevator installation illustrating relative positions of the cars, four cars being illustrated;

Figures 2, 3, 4, 5, 6 and 7 taken together constitute a simplified wiring diagram in "straight" or "across-the-line" form of dispatching circuits for four elevators of a six car installation and control and power circuits for one of them;

Figures 2a and 2b, 3a and 3b, 4a and 4b, 5a and 5b, 6a and 6b and 7a and 7b are key sheets for Figures 2, 3, 4, 5, 6 and 7 respectively showing the electromagnetic switches in spindle form with the contacts and coils on the spindles in horizontal alignment with the contacts and coils on the wiring diagram;

Figure 8 is a schematic representation of the selector machine used in the control system; and Figure 9 is a front view of the starter's panel for a six car elevator installation.

The invention will be described as applied to a six car elevator installation but it is to be understood that it is applicable to other numbers of cars. For convenience, but four elevators are shown in Figure 1 and except for the circuits for selecting the number of cars in service, the circuits of Figures 2, 3, 4 and 5 are for but four of the cars.

For a general understanding of the invention reference may be had to Figure 1, wherein various parts of the system chosen to illustrate the principles of the invention are indicated by legend. The arrangement is the same for each elevator. Each car is raised and lowered by means of a hoisting motor, which motor drives a traction sheave over which pass hoisting ropes for the car and counterweight. An electromagnetic brake is provided and is applied to effect the final stopping operation and to hold the car when at rest.

Each elevator car is provided with a car operating panel on which are located a plurality of control switches for operation by the car attendant. These switches include a start control switch, a plurality of push buttons, one for each floor above the lower terminal, hereinafter termed car buttons, reversing buttons, a buzzer switch, a safety switch and a non-stop button. These switches are shown in the wiring diagrams of Figures 6 and 7.

Figure 5:
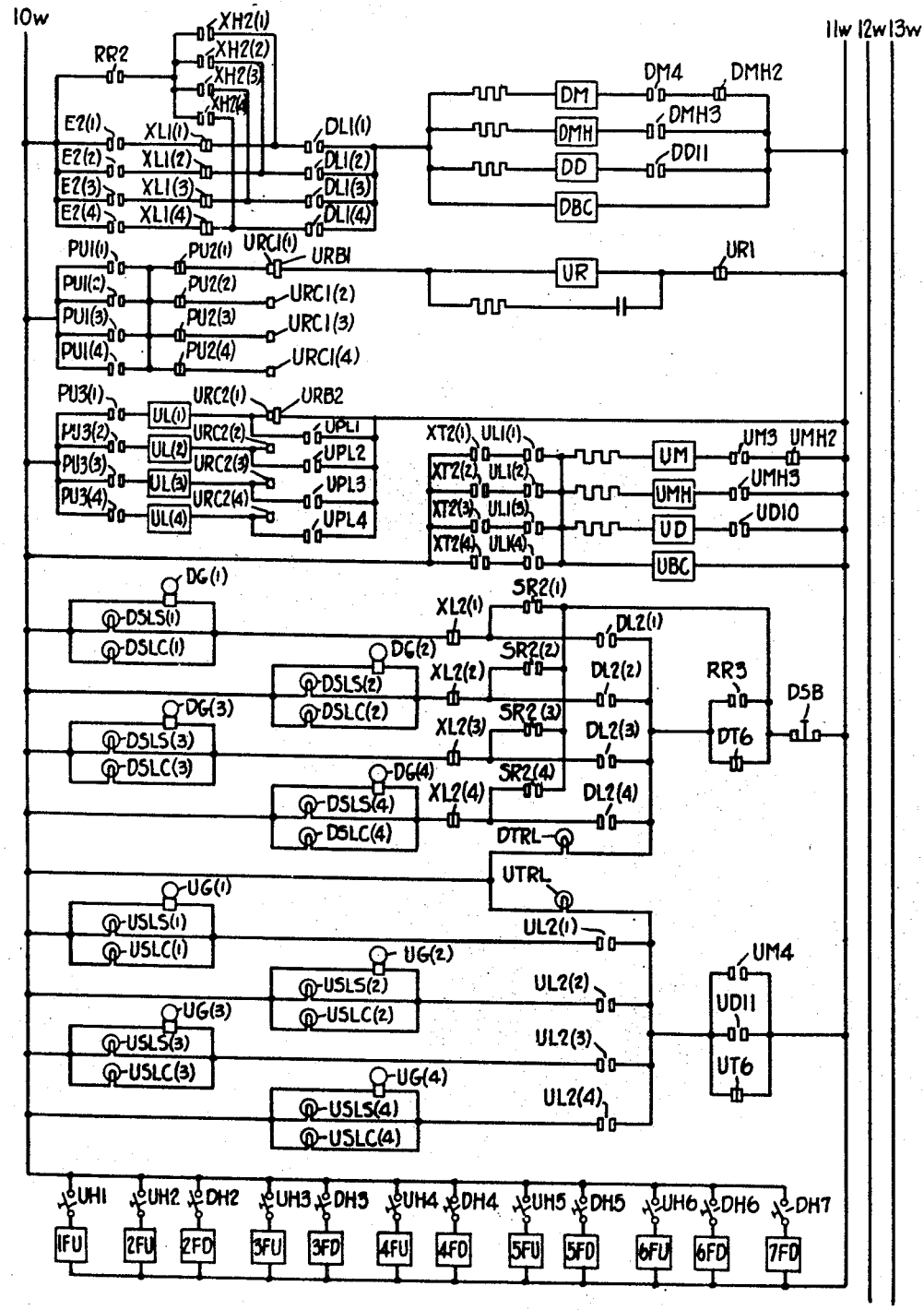
Figure 5B:
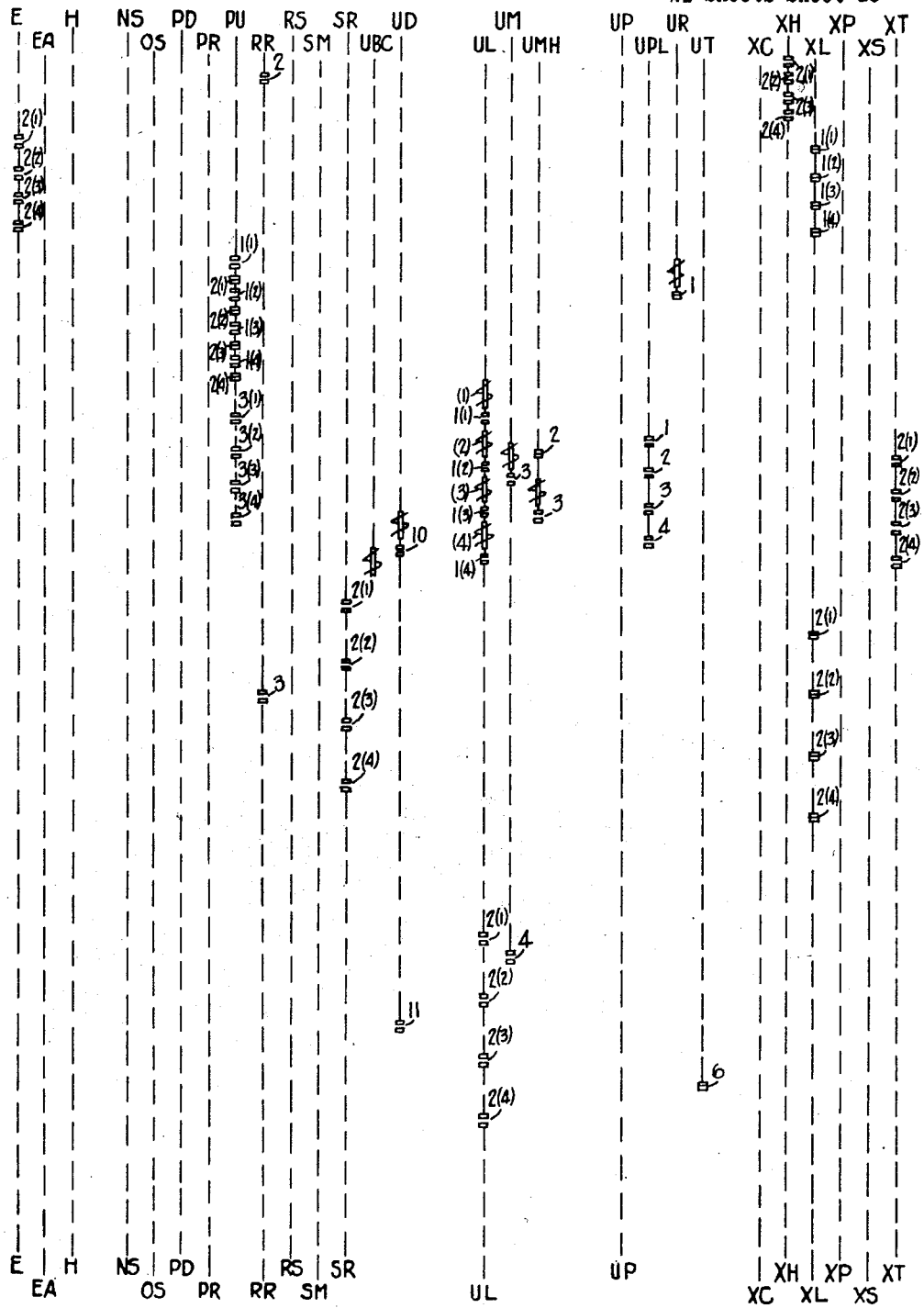

At each floor is a push button box within which are arranged push buttons, an up and a down push button at each intermediate floor and one push button at each terminal floor. These push buttons, which will hereinafter be termed hall buttons, are common to the cars and are shown in Figure 5.

Figure 6:
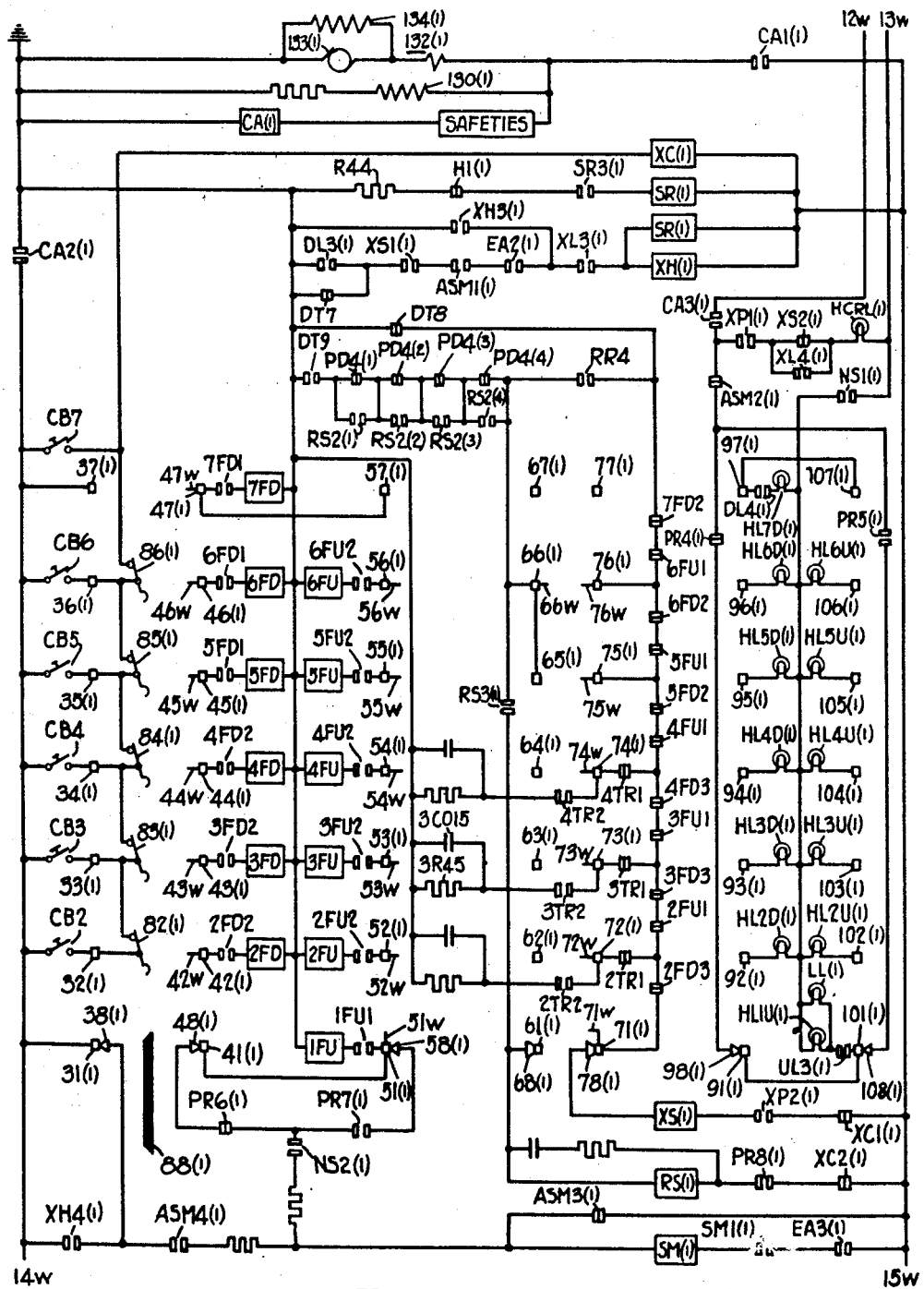
Figure 6A:
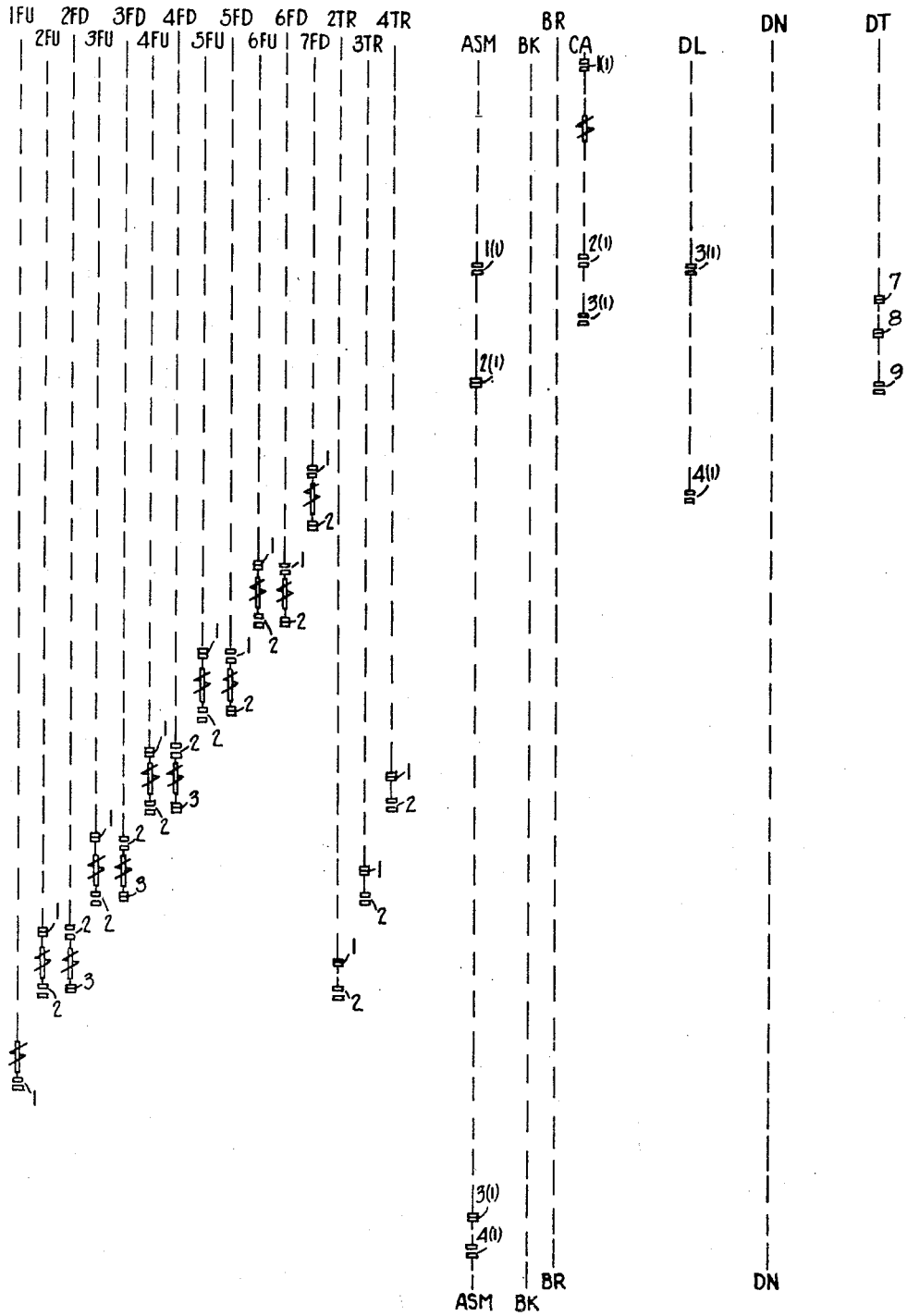
Figure 6B:
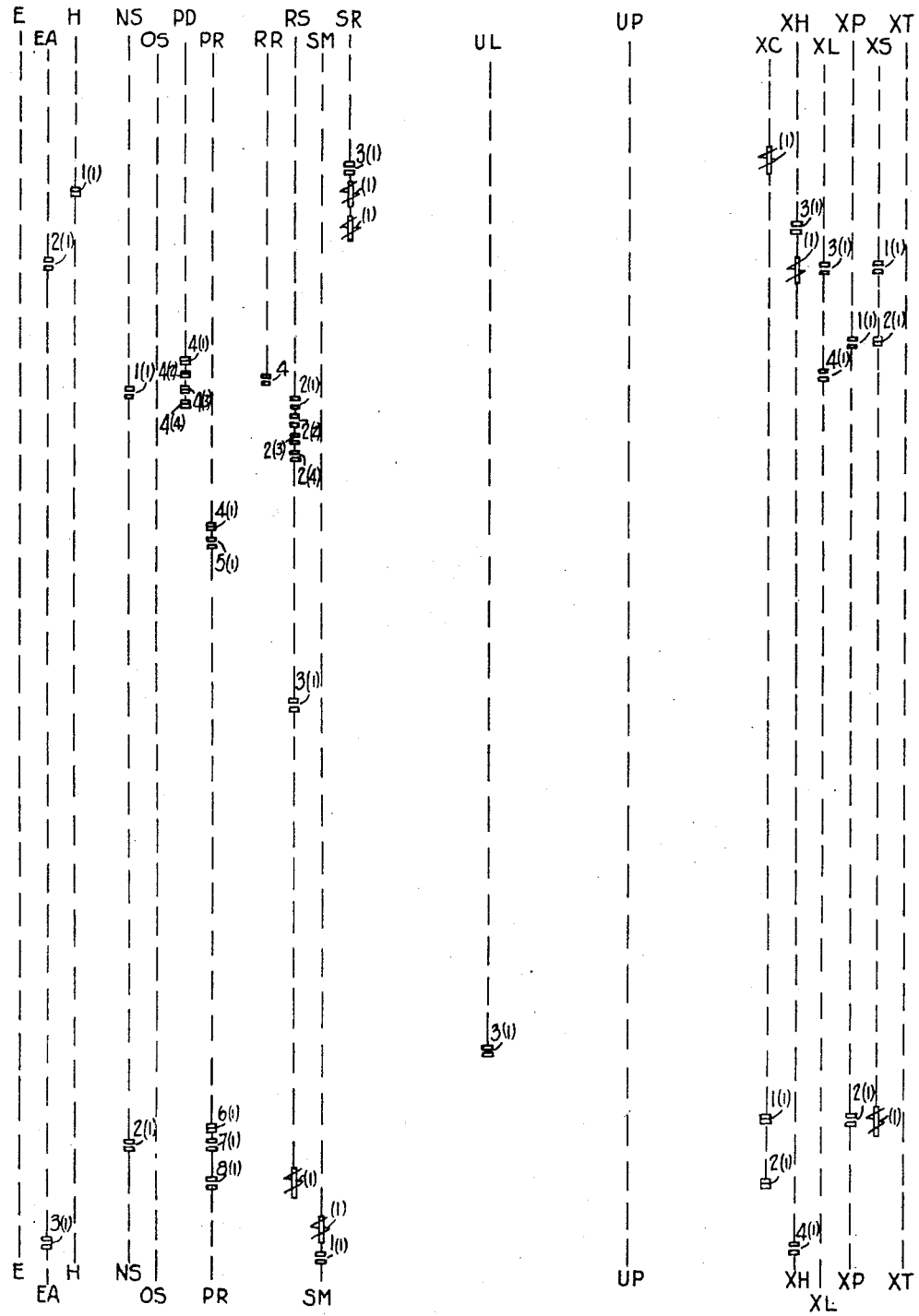
Figure 7:
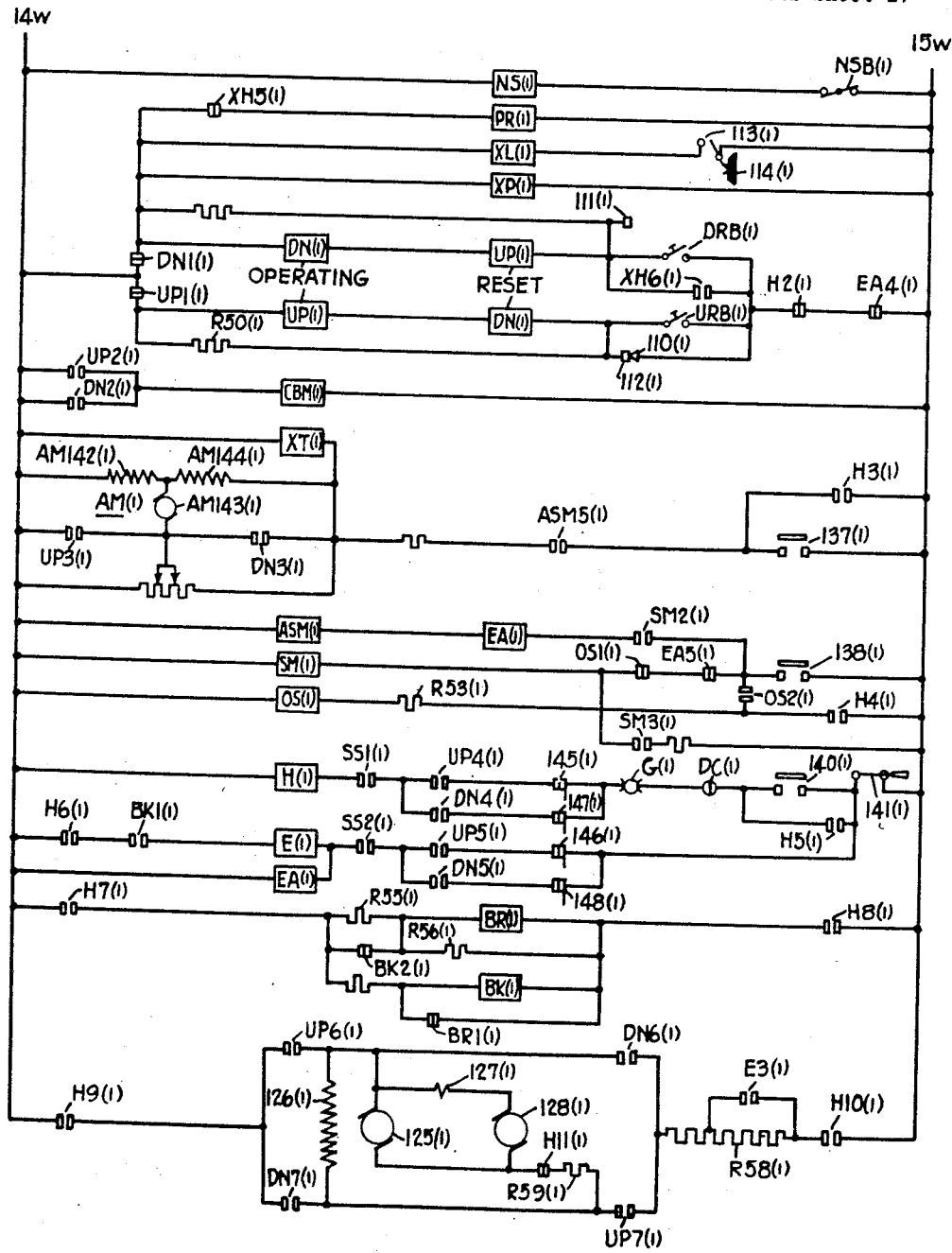
Figure 7A:
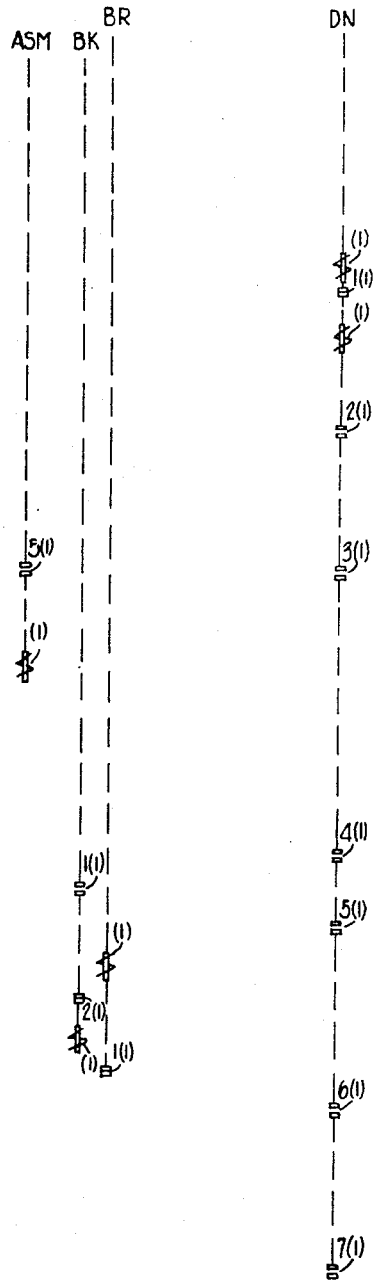
Figure 7B:
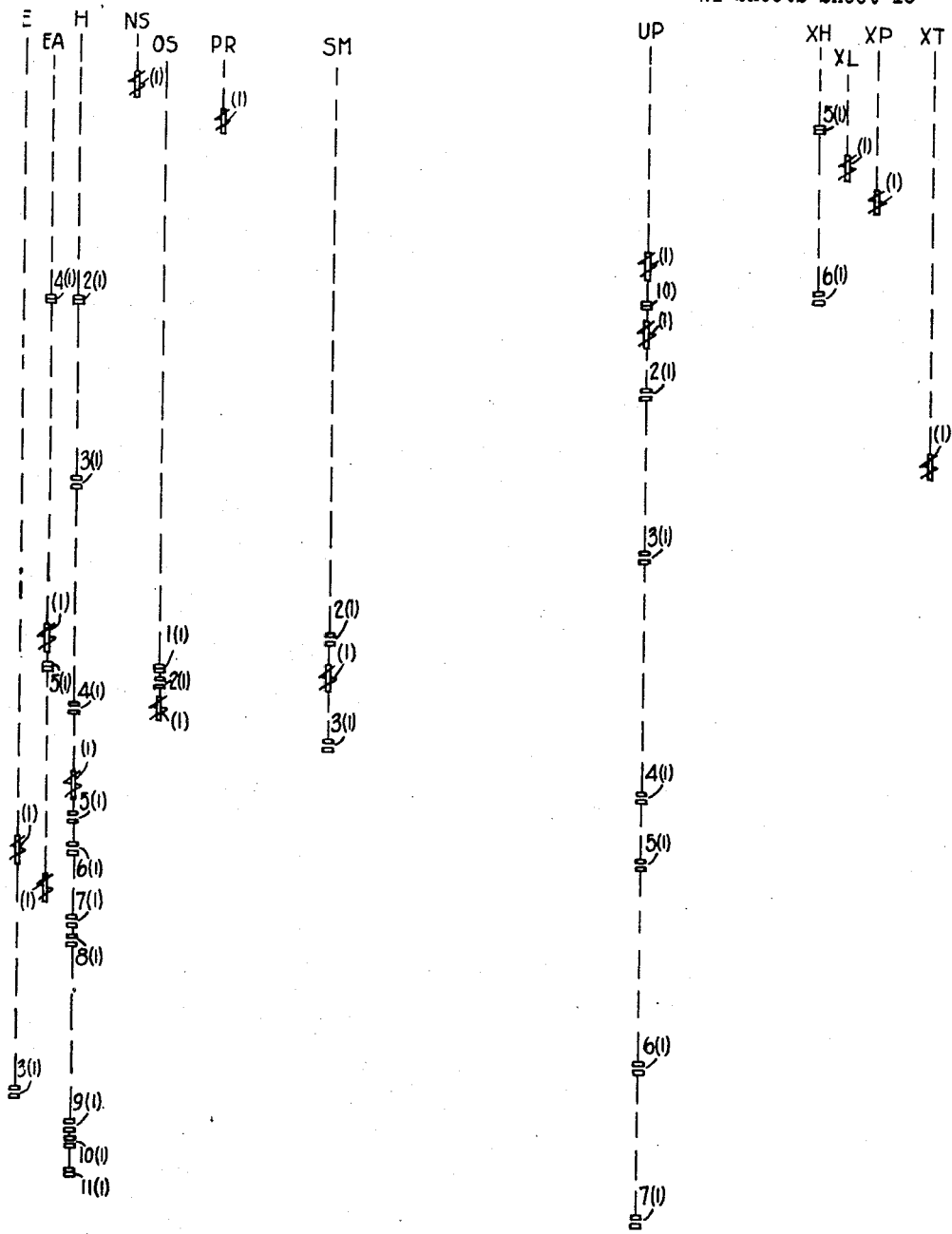

Reference may now be had to Figures 2, 3, 4, 5, 6 and 7, which illustrate diagrammatically the various dispatching, control and power circuits. Figures 2, 3, 4 and 5 show principally the dispatching circuits, these circuits being for four elevators but, as will be seen, corresponding circuits are provided for other elevators. The circuits of these figures are joined by the vertical feed lines $10w$ and $11w$. Figure 6 shows the call pick-up, call restoring, highest call and time preference circuits for one elevator. Like highest car call circuits and car call pick-up circuits are provided for each of the other elevators. As regards the highest hall call circuits, hall call pick-up and restoring circuits and time preference circuits, like circuits are provided for each of the elevators by interconnection of the selectors. This figure also shows the hall lantern circuits for one car, the circuits for the other cars being similarly arranged. The feed lines 12w and 13w to the hall lanterns extend from transformer 124 of Figure 2. Figure 7 shows additional control circuits and the power circuits for one elevator, it being understood that such circuits are provided also for the other elevators. The circuits of Figure 7 are joined with those of Figure 6 by vertically extending feed wires 14w and 15w.

To facilitate disclosure of an application of the invention, the control system illustrated has been considerably simplified as compared with control systems utilized in commercial installations. It is to be understood that in applying the invention to control systems used commercially many changes may be made, especially in adapting the invention to the more comprehensive circuits and to control features and apparatus not here shown.

The electromagnetic switches employed in the system illustrated are designated as follows:

AB, Signal relation relay
ABS, Auxiliary balance signal relay
ASM, Auxiliary stopping switch
BA, Balancing relay
BK, Brake resistance relay
CA, Potential switch
DBC, Down balance cut-out relay
DD, Down timed signal self-holding switch
DI, Down direction indicating relay
DL, Down selective relay
DM, Down balance signal relay
DMH, Down balance signal holding relay
DN, Down direction switch
DNS, Down next signal indicating relay
DPL, Down permanent light relay
DR, Down rotary switch
DT, Down traffic switch
DTP, Down traffic preference relay
E, Speed switch
EA, Auxiliary speed relay
H, Field and brake switch
MS, Timing motor stop switch
NS, Non-stop relay
OS, Operating switch sequence relay
PD, Top terminal relay
PR, Auxiliary direction relay
PU, Bottom terminal relay
RR, Down signal highest call return relay
RS, Highest call return selection relay
SM, Stopping magnet
SR, Signal highest call return switch
UBC, Up balance cut-out relay
UD, Up timed signal self-holding switch
UDT, Up-down traffic relay
UI, Up direction indicating relay
UL, Up selective relay
UM, Up balance signal relay
UMH, Up balance signal holding relay
UMR, Up signal lock-out relay
UNS, Up next signal indicating relay
UP, Up direction switch
UPL, Up permanent light relay
UR, Up rotary switch
UT, Up traffic switch
UTP, Up traffic preference relay
XC, Highest car call relay
XH, Automatic return relay
XL, Car signal direction relay
XP, Auxiliary up direction relay
XS, Highest hall call relay
XT, Auxiliary reset switch Throughout the description which follows, these letters will be applied to the coils of the above designated switches. Also, with reference numerals appended thereto, they will be applied to the contacts of these switches. The release coil of the electromechanical brake is similarly designated BR and this coil and the contacts operated by the brake are included on the spindle sheets. Differentiation will be made between the different elevators by appending to the characters employed to designate the various elements of the system numbers indicative of the different elevators and arranged in brackets. The electromagnetic switches are illustrated in deenergized condition, switches DN, UP, DD and UD, which are of the latching type, being shown in reset condition. Each of these latching type switches has two coils, one an operating coil and the other a reset coil. Also, each of relays DM, UM, DMH and UMH has two coils, one an operating coil and, in the case of relays DM and UM, the other a bucking coil and, in the case of relays DMH and UMH, the other a holding coil. Of those referred to resistances are designated generally by R and condensers by CO.

The up hall buttons are designated UH, while the down hall buttons are designated DH. Numerals are appended to these letters indicating the floors for which the buttons are provided. The hall buttons act through floor relays designated first by the numeral corresponding to the floor for which the floor relay is provided and then by the letters FU or FD in accordance with whether the floor relay is for an up hall button or a down hall button. The car buttons are designated CB and, as in the case of the hall buttons, have numerals appended thereto as indicative of the floor for which the car buttons are provided. Each car button when pressed is held pressed by a magnet CBM common to these buttons. As to the reversing buttons in the car, the up reversing button is designated URB and the down reversing button is designated DRB. The non-stop button in the car is designated NSB. The hall lanterns are designated HL and are differentiated by numerals corresponding to the floors for which they are provided and by the letter U or D, in accordance with whether up or down hall lanterns, appended to the letters HL.

Mechanism actuated in accordance with movement of the elevator car is utilized in the control circuits of each elevator. Such mechanism may be in the form of a selector machine as indicated in Figure 1. The selector machine is driven preferably by means of a steel tape attached to the car and counterweight and having teeth formed thereon for engaging teeth on the selector driving wheel. An understanding of a selector machine suitable for use in the control system may be had from the schematic illustration of such a machine in Figure 8.

The selector machine comprises a frame formed by a base plate 10, and a top pate 11 supported from the base plate by standards. The operating shaft 12 for the selector machine is rotatably supported on the base plate 10. The toothed tape 9 meshes with a toothed driving wheel 13 secured to the outer end of shaft 12 to drive the machine. A vertical screw 14 is driven by shaft 12 through the intermediary of bevel gears 15. The vertical screw 14 drives a crosshead 16 guided in its vertical movement by guide bars 17. With this arrangement the crosshead is moved in accordance with movement of the elevator car.

The crosshead carries a carriage 18 upon which is mounted mechanism for picking up calls that are registered by the car and hall buttons. Mechanism is also mounted on the carriage for causing slow-down to begin at a certain distance from the floor for which a call has been picked up and for causing the car to be brought to a stop as it arrives at the floor. The carriage is advanced from a neutral position with respect to the crosshead prior to starting the car. This advance is effected by means of a torque motor which will hereinafter be termed the advancer motor and designated AM. The advancer motor acts through a chain of gears to rotate a shaft 19. On the end of this shaft is a gear 20 which meshes with a rack 21 to vertically move the carriage either up or down depending upon the direction of rotation of the shaft, thereby advancing the carriage. The advancer motor in advancing the carriage also effects the engagement of selector switches SS1 and SS2, these switches being operated by cams 22 arranged on shaft 19. If a call is not picked up during the advance of the carriage, the carriage is brought to a stop by one or the other of stopping collars 28. The advancer motor remains energized so that the carriage is thereafter moved with the crosshead.

The carriage is returned to neutral position by means of pawls 23 which are spring biased to extended position for engaging stopping lugs 24. There are two pawls, one effective for up car travel and the other for down car travel. These pawls are carried by the carriage. A stopping lug is provided for each floor and is arranged on a floor bar 25, these floor bars being arranged on supporting standards for top plate 11 on which they are spaced in accordance with the distance between the floors for which the lugs are provided. An electromagnet is provided for controlling the extension and retraction of the pawls. This magnet which hereinafter will be termed a stopping magnet and designated SM is carried by the crosshead. The stopping magnet has two coils, one an operating coil and the other a reset coil. Upon energization of the operating coil bell crank levers 26 are pulled upwardly to cause a cam 27 to be extended outwardly to push rollers on the ends of the pawls in a direction to force the pawls into retracted positions. In moving outwardly the cam acts through a link to pull a contact lever clockwise about its pivot to close a switch having three pairs of contacts, one pair SM2 of which controls the energization of motor AM. Thus the pawls are released from the stopping collar for the floor at which the car is stopped before the advancer motor is energized to advance the carriage.

When a call is picked up, the reset coil of the stopping magnet is energized. This neutralizes the operating coil, releasing cam 27 to permit the pawls to be extended for cooperation with the stopping lug for the floor for which the call is registered and to cause opening of switch SM2 to deenergize the advancer motor. This may occur either during the advance of the carriage, in which event the advance is immediately stopped, or after the carriage has been fully advanced, in which event the carriage remains in advanced condition with respect to the crosshead. In either event the crosshead either in its initial moment as a result of starting the car or in its continued movement moves the carriage the additional amount sufficient to take up the small amount of pawl clearance for the pawl for the direction in which the car is travelling whereupon the pawl engages the stopping lug, bringing the carriage to a stop. The crosshead continues its movement and, due to the relative movement between the crosshead and the carriage, acts through rack 21 and gear 20 to effect the opening of the selector switches SS2 and SS1 in sequence to effect the slow-down and stopping of the car.

The call pick-up mechanism carried by the carriage comprises a plurality of brushes, but one of which designated 38 being shown. These brushes are arranged on a panel carried by the carriage to cooperate with stationary contacts for the various floors arranged on the floor bars 25 and rendered "alive" in response to pressing of car and hall buttons in registering calls. The contacts engaged by the respective brushes are arranged in vertical columns, only those of one column being shown and being designated 31, 32, 33, 34, 35, 36 and 37 for the first to the seventh floors respectively. When the car is stopped at a floor, the brushes are in engagement with their cooperating stationary contacts for that floor. Being on a panel carried by the carriage, however, these brushes are advanced prior to starting the car. Also, they do not move far enough to disengage their contacts for a floor during taking up of pawl clearance after a call is picked up with the result that they are maintained in engagement with their contacts during the take-up of the advance as the car comes into the floor.

The various stationary contacts and their cooperating brushes for elevator No. 1 are shown in Figure 6. Stationary contacts subject to the car buttons in the car call pick-up circuit are designated 32(1), 33(1), 34(1), 35(1) and 36(1) for the second, third, fourth, fifth and sixth floors respectively, the stationary contacts 31(1) and 37(1) for the first and seventh floors being connected directly to the feed line. These contacts are engaged by brush 38(1). No car button is provided for the first floor. The arrangement for each of the other elevators is the same. The stationary contacts subject to the down hall buttons at the second, third, fourth, fifth, sixth and seventh floors and the stationary contact for the first floor in the hall call pick-up and call restoring circuits are designated 41(1), 42(1), 43(1), 44(1), 45(1), 46(1) and 47(1) for the first, second, third, fourth, fifth, sixth and seventh floors respectively. These contacts are engaged by brush 48(1). The stationary contacts subject to the up hall buttons at the first, second, third, fourth, fifth and sixth floors and the stationary contact for the seventh floor in the hall call pick-up and call restoring circuits are designated 51(1), 52(1), 53(1), 54(1), 55(1), 56(1) and 57(1) for the first, second, third, fourth, fifth, sixth and seventh floors respectively. These contacts are engaged by brush 58(1). The arrangement of the hall call pick-up and call restoring circuits for each of the other elevators is the same, the corresponding contacts for each floor being connected together by wires 42w, 43w, 44w, 45w, 46w, 47w, 51w, 52w, 53w, 54w, 55w and 56w, contact 41(1) being connected to contact 51(1) and contact 57(1) being connected to contact 47(1), so as to be subject to the floor relays. Stationary contacts 61(1), 62(1), 63(1), 64(1), 65(1), 66(1) and 67(1) for the first, second, third, fourth, fifth, sixth and seventh floors respectively are arranged in the car return selection circuits to be engaged by brush 68(1). The arrangement for each of the other elevators is the same, the corresponding contacts 66 for each car being connected together by wire 66w. Also, stationary contacts 71(1), 72(1), 73(1), 74(1), 75(1), 76(1) and 77(1) for the first, second, third, fourth, fifth, sixth and seventh floors respectively are arranged in the highest hall call circuits to be engaged by brush 78(1). The arrangement for each of the other elevators is the same, the corresponding contacts for each car being connected together by wires 71w, 72w, 73w, 74w, 75w and 76w.

As also shown in Figure 6 for elevator No. 1, the selector has a plurality of hook switches 82(1), 83(1), 84(1), 85(1) and 86(1), one for each of floors 2, 3, 4, 5 and 6, and arranged on the floor bars for these floors to be engaged by a travelling cam 88(1) of insulating material also carried by the advancer panel. This cam is of a length to engage and open the hook switch for any particular floor slightly ahead of the engagement of the call pick-up brushes with the stationary contacts for that floor when the car is travelling in the up direction and to engage and open the hook switch for the floor below such floor slightly ahead of the engagement of the call pick-up brushes with the stationary contacts for such floor when the car is travelling in the down direction. These hook switches are subject to the control of the car buttons and are arranged in series circuit relationship in the highest car call circuit. This arrangement is the same for each elevator. The brushes 68(1) and 78(1) in the car return selection and highest hall call circuits are also of a length to engage their stationary contacts slightly ahead of the engagement of the call pick up brushes with their contacts for the corresponding floor when the car is travelling in the up direction. In addition, brush 68(1) engages its contacts shortly after the engagement of cam 88(1) with the corresponding hook switches and brush 78(1) engages its contacts shortly after the engagement of brush 68(1) with its corresponding contacts.

Stationary contacts 92(1), 93(1), 94(1), 95(1), 96(1) and 97(1) for the second, third, fourth, fifth, sixth and seventh floors respectively are arranged in the circuits for the down hall lanterns of elevator No. 1 at these floors while contacts 101(1), 102(1), 103(1), 104(1), 105(1) and 106(1) for the first, second, third, fourth, fifth and sixth floors respectively are arranged in the up hall lantern circuits of elevator No. 1. Those contacts in the down hall lantern circuits are engaged by brush 98(1) while those in the up hall lantern circuits are engaged by brush 108(1). Contact 91(1) for the first floor for engagement by brush 98(1) is connected to contact 101(1) while contact 107(1) for the seventh floor for engagement by brush 108(1) is connected to contact 97(1). The hall lantern circuits are arranged the same for each of the other elevators.

Figure 4:
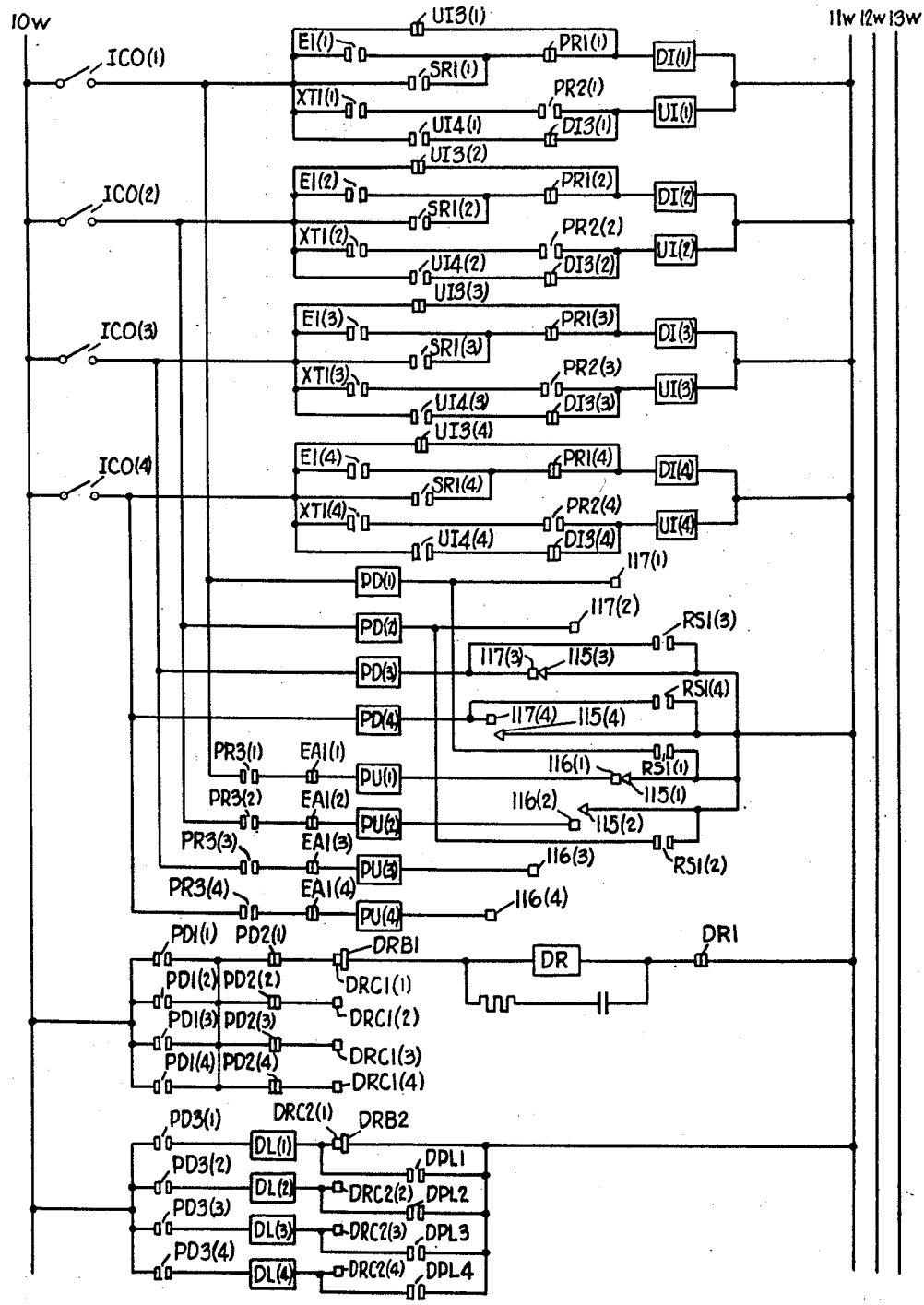
Figure 4A:
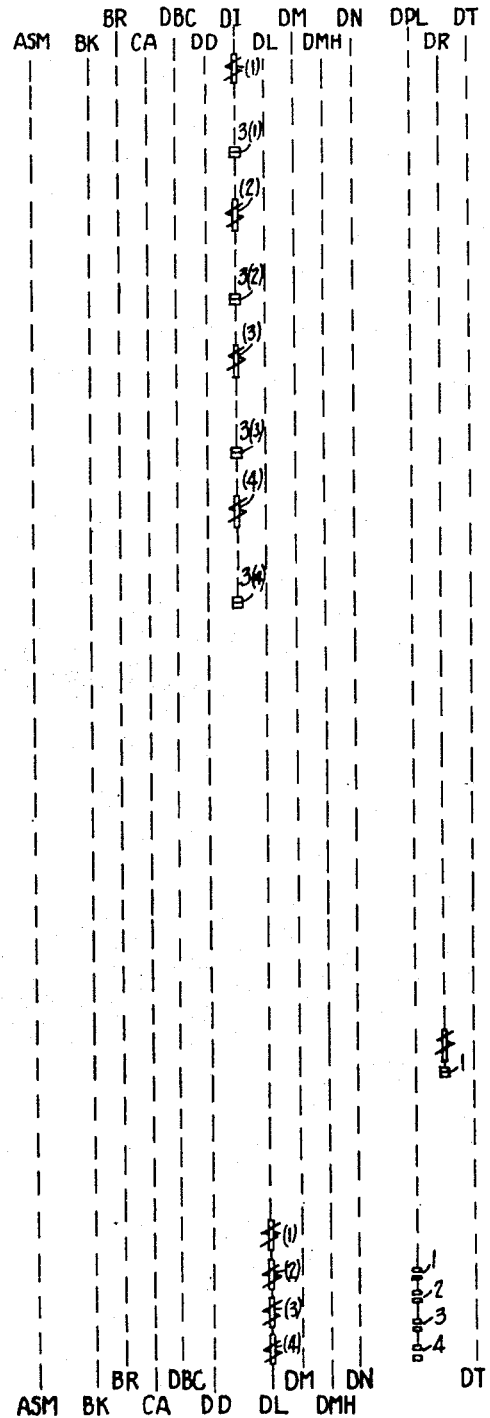
Figure 4B:
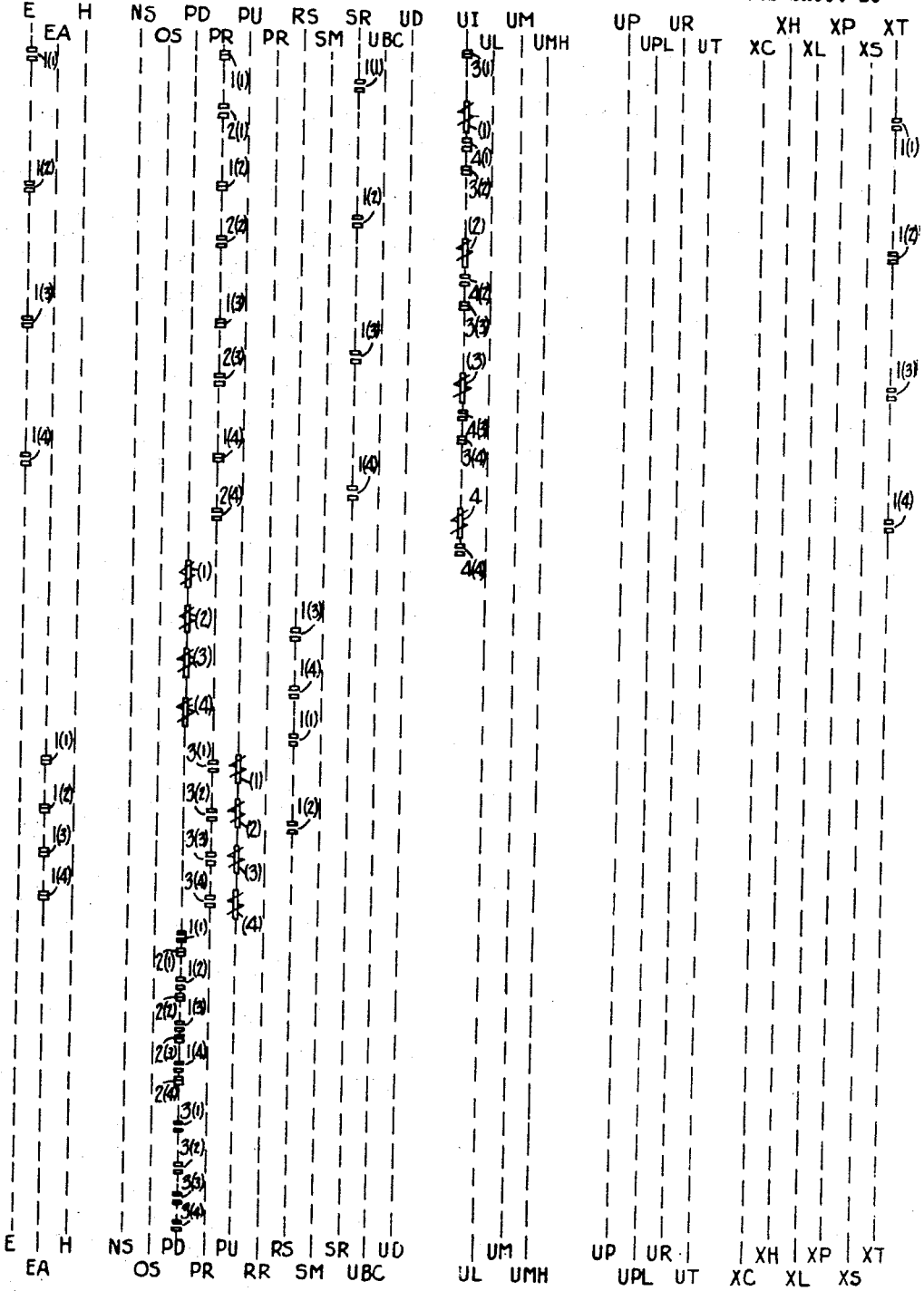

The travelling crosshead of each selector also carries an additional brush designated 110(1) for elevator No. 1 (see Figure 7) on a panel separate from the advancer panel for engaging stationary contacts designated 111(1) and 112(1) for elevator No. 1 for the terminal floors. This has to do with controlling the operation of direction switches designated UP(1) and DN(1) for elevator No. 1. An additional hook switch, designated 113(1) for elevator No. 1 (see Figure 7), is provided on the selector machine. This switch may be arranged to be operated by the cam, designated 88(1) for elevator No. 1, so as to be open when the car is at the first floor and closed when it leaves the first floor. For convenience, however, a separate cam designated 114(1) (arranged on the advancer panel) is illustrated for elevator No. 1 for operating this switch. The crosshead of each selector also carries an additional brush, designated 115(1) for elevator No. 1, on the panel separate from the advancer panel, this brush being arranged to engage stationary contacts, designated 116(1) and 117(1) for elevator No. 1, for the terminal floors. This has to do with the dispatching circuits and is shown in Figure 4.

It is believed that an understanding of the invention will be facilitated by first describing the operation of starting and stopping an elevator car, say car No. 1, together with the mechanism and circuits employed. Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. The generator of such arrangement has been illustrated. The driving motor for the motor generator set and control arrangement therefor have not been illustrated. It is to be understood that either a direct current or alternating current driving motor may be employed, depending upon the kind of power supplied to the building and the character of the installation, and that any suitable control arrangement therefor may be utilized.

Figure 2:
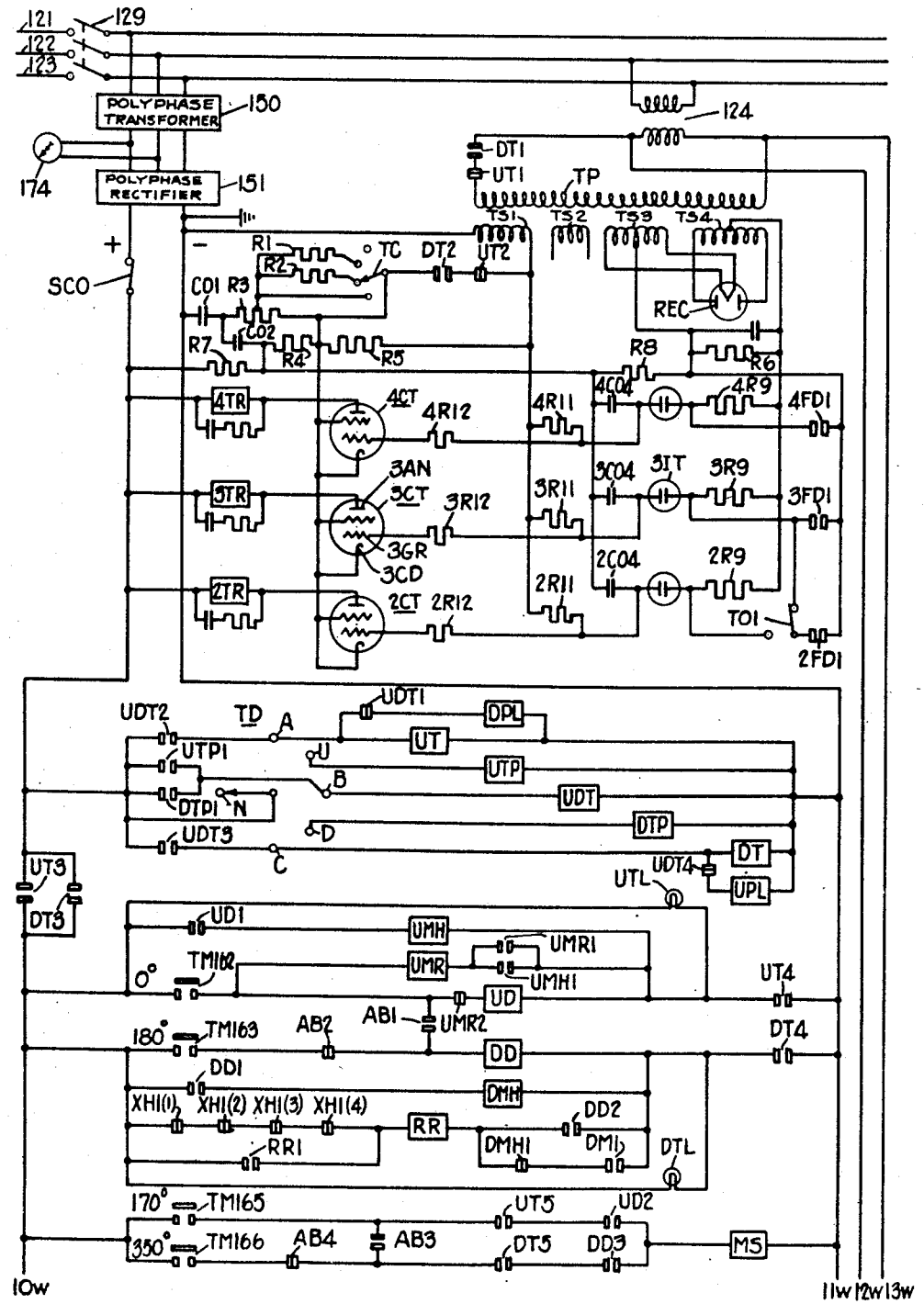
Figure 2A:
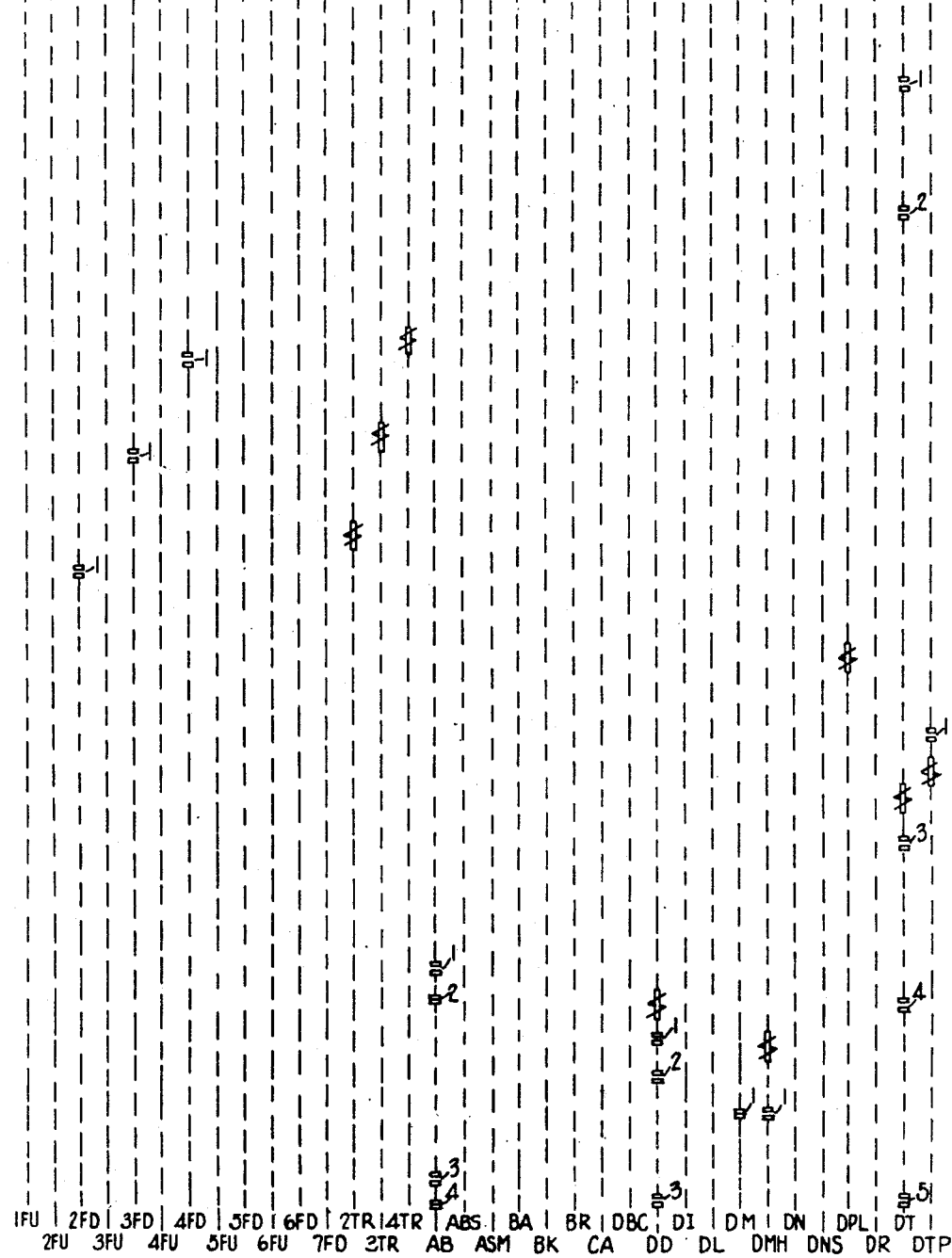
Figure 2B:
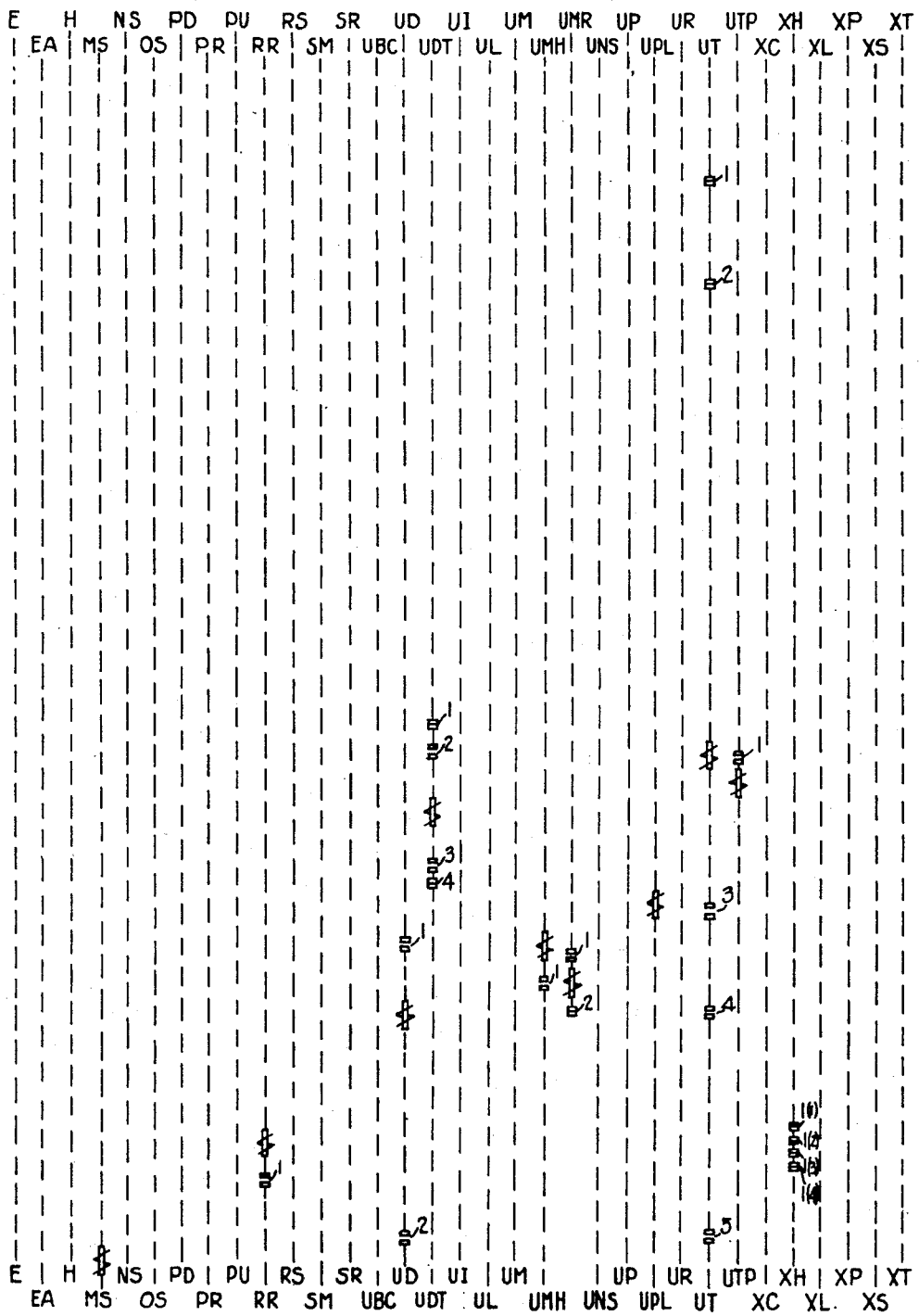

Polyphase alternating current power supply is illustrated, these supply lines being designated 121, 122 and 123 (see Figure 2). In such case the generator is driven by a polyphase alternating current motor. This motor also drives an exciter which is employed to supply current to the separately excited field windings of the supply generator and the elevator motor and to the brake and the coils of the various electromagnetic switches of Figure 7. Also, the call pick-up, call restoring, car return selection, highest call and time preference circuits (Figure 6) for each elevator are connected to the respective exciters, one side of each exciter being grounded for the purpose of effecting the completion of the circuits common to the cars. The hall button circuits through the operating coils of the floor relays are connected through transformer 124 to the supply lines for the building so as to permit the operation of the floor relays at any time. 129 is a triple pole knife switch for connecting the supply lines to the system.

The armature of the generator of the motor generator set is designated 125(1), its separately excited field winding being designated 126(1) and its series field winding 127(1). The armature of the elevator motor is designated 128(1) and its separately excited field winding 130(1). A resistance R58(1) is provided for controlling the strength of the generator separately excited field and therefore the voltage applied to the elevator motor armature. The armature of the exciter 132(1) driven by the motor generator set driving motor is designated 133(1) while its field winding is designated 134(1). R56(1) is a discharge resistance for the brake release coil BR(1), while resistance R55(1) serves as a cooling resistance for this coil.

The contacts operated by the car gate and engaged when the gate is closed are designated G(1). The door contacts operated by the various doors are arranged in series relation. These contacts are not closed until the doors are closed and locked. For convenience these door contacts are shown as a single pair of contacts designated DC(1). The car gate and hatchway doors for each elevator have not been shown but it is to be understood that they may be power operated. The start control switch in the car has a plurality of contacts designated 137(1), 138(1) and 140(1). 141(1) is the safety switch in the car.

The system is illustrated for the condition where car No. 1 is standing at the first floor. When this car last arrived at the first floor, brush 110(1) engaged stationary contact 112(1) and, upon the engagement of contacts H2(1) in the stopping operation, a circuit was established for the reset coil of down direction switch DN(1) and for the operating coil of up direction switch UP(1). This caused the down direction switch ND(1) to be reset, the condition in which it is shown in the drawings, and the operation of up direction switch UP(1) and latching of this switch in operated condition. The operation of switch UP(1) caused the engagement of contacts UP2(1), UP3(1), UP4(1), UP5(1), UP6(1) and UP7(1) and the separation of contacts UP1(1). Contacts UP1(1) disconnected the operating coil of up direction switch UP(1) and the reset coil of down direction switch DN(1) from the feed lines. Contacts UP2(1) reconnected the car button magnet CBM(1) to the supply lines. Contacts UP3(1) connected field winding AM142(1) and armature AM143(1) of the advancer motor in parallel.

Assume that the driving motor of the motor generator set is started in operation. This causes the exciter voltage to build up to full value. As it does, the potential switch CA(1) operates, engaging contacts CA1(1), CA2(1) and CA3(1). The engagement of contacts CA1(1) and CA2(1) completes a circuit for the car button magnet CBM(1) and for the coils of non-stop relay NS(1), auxiliary direction relay PR(1) and auxiliary up direction relay XP(1). The non-stop relay engages contacts NS1(1) and NS2(1). The auxiliary direction relay engages contacts PR2(1), PR3(1), PR5(1), PR7(1) and PR8(1) and separates contacts PR1(1), PR4(1) and PR6(1). The auxiliary up direction relay engages contacts XP1(1) and XP2(1). The elevator motor field winding 130(1) is connected across the exciter so that the strength of the elevator motor field builds up as the excited voltage builds up.

To start the car, the start control switch is thrown to full running position. This causes the bridging of contacts 137(1), 138(1) and 140(1), contacts 138(1) being bridged ahead of contacts 137(1) and 140(1). The bridging of contacts 138(1) completes circuits (not shown) causing the closing of the car gate and first floor hoistway door. It also completes a circuit for the operating coil of stopping magnet SM(1) through contacts OS1(1) and EA5(1). The stopping magnet upon operation engages contacts SM1(1), SM2(1) and SM3(1). Contacts SM3(1) complete a holding circuit for the operating coil of the stopping magnet. Contacts SM2(1) complete a circuit for the coil of auxiliary stopping switch ASM(1) and for one coil of auxiliary speed relay EA(1). Relay EA(1) does not operate at this time. Switch ASM(1) operates to separate contacts ASM2(1) and ASM3(1) and to engage contacts ASM1(1), ASM4(1) and ASM5(1). Contacts ASM5(1) prepare the circuit for the advancer motor AM(1). This circuit is completed by the bridging of start control switch contacts 137(1) and is through field winding AM144(1) and through field winding AM142(1) and armature AM143(1) in parallel. This results in the operation of the advancer motor to advance the carriage in the up direction. The advancer motor also effects the engagement of selector switches SS1(1) and SS2(1), preparing the circuits for the coils of field and brake switch H(1) and speed switch E(1) and completing the circuit for a second coil of the auxiliary speed relay EA(1).

The energization of both coils of relay EA(1) causes this relay to operate to engage contacts EA2(1) and EA3(1) and to separate contacts EA1(1), EA4(1) and EA5(1). Contacts EA3(1) are in the circuit for the neutralizing coil of relay SM(1) of the stopping magnet, the advance having progressed sufficiently by this time for the brushes to be off the stationary contacts for the floor at which the car is positioned. The separation of contacts EA4(1) prevents energization of the direction switches once the advancer mechanism has been energized to advance the carriage. Contacts EA5(1) render the energization of the operating coil of stopping magnet SM subject solely to holding contacts SM3(1).

The advance takes place fairly rapidly so that, upon the closure of the hoistway door and car gate, a circuit is established for the coil of field and brake switch H(1) through contacts SS1(1), UP4(1), up limit switch 145(1), gate contacts G(1), door contacts DC(1), start control switch contacts 140(1) and safety switch 141(1).

Switch H upon operation enegages contacts H3(1), H4(1), H5(1), H6(1), H7(1), H8(1), H9(1) and H10(1) and separates contacts H1(1), H2(1) and H11(1). The separation of contacts H2(1) prevents operation of the direction switches during operation of the car. Contacts H3(1) by-pass start control switch contacts 137(1) in the advancer motor circuit. Contacts H4(1) complete the circuit for the coil of operating switch sequence relay OS(1). The operation of operating switch sequence relay OS(1) causes the engagement of contacts OS2(1) and the separation of contacts OS1(1). The enegagement of contacts OS2(1) completes a holding circuit for the coil of auxiliary stopping relay ASM(1). Contacts H5(1) by-pass start control switch contacts 140(1), establishing a self-holding circuit for the coil of switch H. Thus with its contacts all by-passed, the start control switch may be returned to "off" position. Contacts H6(1) further prepare the circuit for the coil of speed switch E(1). Contacts H7(1) and H8(1) complete the circuit for brake release coil BR(1), while contacts H9(1) and H10(1) complete the circuit through contacts UP6(1) and UP7(1) for the generator field winding 126(1). Contacts H11(1) disconnect generator field winding from across the generator armature. The completion of the circuit for the generator separately excited field winding causes current to be supplied from the generator armature 125(1) to the hoisting motor armature 128(1) and, the brake being released as a result of the energization of its release coil BR(1), the elevator motor starts the car in the up direction.

The brake, upon being released, effects the separation of contacts BR1(1), which act to remove the short circuit for the coil of brake resistance relay BK(1). This relay operates to separate its contacts BK2(1) to insert cooling resistance R55(1) in circuit with brake release coil BR(1). It also engages contacts BK1(1), which completes the circuit for the coil of speed switch E(1)

through the contacts H6(1), SS2(1), UP5(1), up limit switch 146(1) and safety switch 141(1). Switch E(1) upon operation engages contacts E3(1) to short circuit a portion of resistance R58(1) in the circuit of the generator field winding 126(1). This applies full voltage to the generator separately excited field winding, causing the generator voltage to build up to full value to bring the elevator car up to full speed.

Stops during upward travel of the car are made in response to car buttons and up hall buttons. For convenience, assume that a passenger entered the car at the first floor desiring to be carried to the third floor. Upon the passenger announcing his destination, the car attendant presses car button CB3(1), this button when released being held in operated condition by car button magnet CBM(1). Upon the engagement of brush 38(1) with stationary contact 33(1), a circuit is completed through contacts ASM4(1), SM1(1) and EA3(1) for neutralizing coil SM(1) of the stopping magnet. This coil acts to oppose the operating coil SM(1) of this magnet, releasing the pawls and causing the separation of contacts SM1(1), SM2(1) and SM3(1). Contacts SM1(1) and SM3(1) break the energizing circuits for the coils of the stopping magnet, while contacts SM2(1) break the circuit for the coil of the auxiliary stopping switch ASM(1) and one coil of auxiliary speed relay EA(1). The auxiliary stopping switch separates contacts ASM1(1), ASM4(1) and ASM5(1) and reengages contacts ASM2(1) and ASM3(1). Contacts ASM4(1) disconnect brush 38(1) from the supply line. Contacts ASM5(1) deenergize the advancer motor AM(1). Contacts ASM2(1) complete a circuit through contacts PR5(1) and brush 108(1), now in engagement with contact 103(1) for the up third floor hall lantern HL3U(1), to indicate that a stop is to be made at the third floor by car No. 1 travelling upwardly. Relay EA(1) does not drop out on deenergization of its coil in series with the coil of switch ASM(1), being held in operated condition by its coil in parallel with the coil of speed switch E(1).

As the car continues its upward travel, the up pawl engages the third floor stopping collar, causing the opening of selector switches SS2(1) and SS1(1) in sequence. The opening of switch SS2(1) breaks the circuit for the other coil of relay EA(1), which drops out. It also breaks the circuit for the coil of speed switch E(1), which drops out, separating contacts E3(1) to reinsert resistance R58(1) in the circuit of the generator field winding. This decreases the voltage of the generator, causing the car to slow down.

The opening of switch SS1(1), which occurs as the car arrives at the landing, breaks the circuit for the coil of field and brake switch H(1), which drops out. The resultant separation of contacts H7(1) and H8(1) deenergizes brake release coil BR(1) and the separation of contacts H9(1) and H10(1) disconnects the generator separately excited field winding 126(1) from the feed lines. Thus the external excitation of the generator is discontinued and the brake is applied to bring the car to a stop at the third floor landing. The engagement of contacts H11(1) reconnects the separately excited field winding across the generator armature substantially to destroy the residual flux of the generator field.

The separation of contacts H7(1) and H8(1) also breaks the circuit for the coil of brake resistance relay BK(1), which drops out. The separation of contacts H4(1) breaks the circuit for the coil of operating switch sequence relay OS(1), provided the start control switch has been returned to neutral position. However, if the start control switch is held in position where contacts 138(1) are bridged, switch OS(1) remains energized upon the separation of contacts H4(1) so that contacts OS1(1) remain separated to prevent the reoperation of stopping switch SM(1). This prevents a restarting operation unless the start control switch is returned to neutral.

Similar operation is had in case an up hall button is pressed. Assume, for example, that up hall button UH2 at the second floor is pressed before brush 58(1) engages contacts 52(1). When such engagement takes place, a circuit is completed for neutralizing coil SM(1) of the stopping magnet, this circuit being through restoring coil 2FU and contacts 2FU2 of the up second floor relay, second floor stationary contacts 52(1), brush 58(1), contacts PR7(1), contacts NS2(1), coil SM(1), contacts SM1(1) and contacts EA3(1). This causes the resetting of stopping magnet SM, causing the car to be slowed down and brought to a stop at the second floor. The reengagement of contacts ASM3(1), caused by the dropping out of the stopping magnet, short circuits neutralizing coil SM(1), increasing the current supplied to the restoring coil 2FU of the up second floor relay, causing this relay to be reset.

The car is started in the down direction in a manner similar to that described for starting it in the up direction. To set the car for downward travel, up direction switch UP(1) is reset and down direction switch DN(1) is operated It will be assumed that this operation is effected at the top terminal. As the car reaches the upper terminal, brush 110(1) engages contacts 111(1) and upon the reengagement of contacts EA4(1) and H2(1) as the car comes to a stop, a circuit is completed through contacts DN1(1) for the operating coil of down direction switch DN(1) and reset coil of up direction switch UP(1), causing the car to be set for travel in the down direction. Incident to this operation contacts DN1(1) separate, breaking the circuit for the coil of direction relays PR(1) and XP(1) and up indicator light relay XL(1). Also contacts UP2 separate to break the circuit for car button magnet CBM to release any operated car buttons, this circuit being reestablished by the engagement of contacts DN2.

With the car set for downward travel, upon operation of the start control switch, the circuit for the advancer motor AM(1) is completed through field winding AM142(1) and through field winding AM144(1) and armature AM143(1) in parallel, connected thus by contacts DN3(1), moving the advance panel downwardly instead of upwardly. The circuit for the coil of switch H(1) is through the contacts DN4(1) and down limit switch 147(1) and the circuit for the coils of switch E(1) and relay EA(1) is through contacts DN5(1) and down limit switch 148(1). The circuit for the generator field winding is through contacts DN7(1) and DN6(1) so that the excitation of the generator is opposite to that previously described, causing the car to be started in the down direction instead of the up direction. It is believed that the remainder of the starting operation will be understood from the description given of starting the car in the up direction.

During upward travel of the car, stops are made in response to car buttons and up hall buttons for floors above the car in the order in which the floors are reached by the car, regardless of the order in which the buttons are pressed. Similarly, during downward travel of the car, stops are made in response to car buttons and down hall buttons for floors below the car in the order in which the floors are reached by the car, regardless of the order in which the buttons are pressed. It is believed that stops in response to car buttons during downward travel will be understood from the previous description inasmuch as when a car button is pressed it is maintained operated by the car button magnet CBM(1) so that upon the engagement of brush 38(1) with the contact rendered "alive" by this button, the neutralizing coil of the stopping magnet is energized, and the car is caused to slow down and come to a stop at the floor. Similarly, each down hall button that is pressed operates a down floor relay that remains operated until the contact rendered "alive" thereby is engaged by brush 48(1) to pick up the call, brush 48(1) being rendered effective for downward travel of the car by contacts PR6(1). This causes the stopping magnet to drop out and the floor relay to be reset and the car to be slowed down and brought to a stop at the floor at which the button is located. When a stop is to be made at a floor during down car travel, the down hall lantern at that floor is lighted upon the reengagement of contacts ASM2(1), the circuit being through contacts PR4(1) and brush 98(1) in engagement with its stationary contact for the floor at which the stop is to be made.

When the car becomes filled to capacity, nonstop button NSB(1) is pressed, deenergizing nonstop relay NS(1). This relay drops out to separate contacts NS2(1), rendering brushes 48(1) and 58(1) ineffective to pick up hall calls. The car buttons, however, are unaffected by the nonstop button and stops are made to discharge passengers. Relay NS(1) also separates contacts NS1(1) to prevent the lighting of the hall lanterns.

The operation of the other elevators is the same as that of elevator No. 1. Each of the other elevators responds to its own car buttons and also answers hall calls, the particular elevator answering any particular hall call being the first one set for travel in the direction corresponding to the call registered whose brush for that direction of travel engages its stationary contact corresponding to the hall button pressed.

Having described the operations of starting and stopping a car, the dispatching of the cars will now be described. There are several manually operable controls utilized in the dispatching circuits. These controls are mounted on the starter's panel shown in Figure 9. The starter's panel is illustrated for a six elevator installation. It has two cabinets which are provided with hinged doors, these cabinets being arranged one above the other. The door to the upper cabinet is designated 170 and the door to the lower cabinet is designated 171. Each of these doors is provided with a lock 172 for locking it in closed position. The dispatching controls are mounted on door 171 of the lower cabinet. These controls include traffic distributor switch TD having the legend "Traffic Distributor" marked on the door immediately above the switch; number of elevators switch NE having the legend "Number of Elevators" marked on the door immediately above the switch; interval control INT having the legend "Interval" marked on the door immediately above the control; up start signal button USB having the legend "Manual" marked on the door immediately above the button; down start signal or call button DSB having the legend "Call" marked on the door immediately above the button; and individual cut-out switches ICO(1), ICO(2), etc. for each elevator having the legend "Dispatch" marked on the door immediately above the switches. Both switches TD and NE are of the dial type having an operating knob 173. Switch TD has six operative positions indicated A, U, B, D, C and N. Switch NE has four operative positions designated 3, 4, 5 and 6. Interval control INT is also provided with an operating knob 173 and has four reference points for the knob which are designated 25, 30, 35 and 40 as indicative of a range of from 25 to 40 seconds. This range may vary considerably depending upon the installation. Buttons USB and DSB are push button type switches while the individual cut-out switches ICO are of the toggle type.

A traffic clock 174 is also arranged on the door to the lower panel. This clock is of the synchronous type but is provided with an hour hand 175 only for cooperating with the usual hour designations. The traffic clock is utilized to advise the starter as to the desired positions of the various controls for the different operating conditions of the day. For this purpose a disk is positioned on the face of the clock inside the circle of hour designations. Segments are marked on the disk in which the positions of the controls for the particular time periods covered by the segments are indicated. The arrangement of the segments and markings on the disk depend upon the particular installation.

An arrangement for a typical installation has been illustrated. The two digit numbers indicate the setting of control INT. The letters indicate the setting of switch TD. The single digit numbers indicate the setting of switch NE. When the hour hand enters a new segment, the starter makes the settings called for. The information placed in these segments is determined from a traffic analysis of the building and may be changed. With the disk illustrated, as the hand 175 moves from the segment marked "Night Service" to the segment marked "25—A—6," shortly before nine o'clock in the morning just before the incoming peak traffic starts, the starter moves the Interval control INT to point 25, the Traffic Distributor switch TD to position A and the Number of Elevators switch NE to position 6. He also closes all ICO switches. After nine o'clock when the peak has subsided and traffic becomes approximately equal up and down, the hand moves into the next segment marked "35—B—5." The starter then moves control INT to point 35, switch TD to position B and switch NE to position 5, and opens one of the ICO switches. Shortly before twelve, as people start to go out to lunch resulting in predominant traffic in the down direction, the hand moves into the next segment marked "30—D—6." The starter then moves control INT to point 30, switch TD to position D and switch NE to position 6 and closes the open ICO switch. At half past twelve when people start returning from lunch, the hand moves into the next segment marked "30—U—6." The starter then moves switch TD to position U. Shortly after one o'clock when traffic again becomes approximately equal up and down the hand moves into the next segment marked "35—B—5." The starter then switches control INT to point 35, switch TD to position B and switch NE to position 5 and opens one of the ICO switches. Shortly before five o'clock just before the outgoing peak traffic starts, the hand moves into the next segment marked "25—C—6." The starter then moves control INT to point 25, switch TD to position C and switch NE to position 6 and closes the open ICO switch. After five o'clock when this peak traffic is over, the hand moves back into the segment marked "Night Service." The starter then moves switch TD to position N which disconnects the dispatching mechanism.

There are also a plurality of signals and indicating devices on the starter's panel. These include an up traffic light UTL and a down traffic light DTL arranged behind jewels on the door to the lower cabinet, these lights indicating certain traffic conditions for which the mechanism is set. The legends "Up" and "Down" are marked on the door immediately above the jewels for the lights UTL and DTL respectively.

On the door of the upper cabinet in the upper left hand corner are arranged two columns of numerals which serve as waiting passenger indicators and are designated Waiting Passenger Lights. These numerals are illuminated by lamps in back of them in the cabinet, those in the left hand column being controlled by the up hall button floor relays and those in the right hand column being controlled by the down hall button floor relays. To the right of these two columns are six columns of numerals, one column for each elevator. These numerals serve as car position indicators and are designated Car Position Lights. Numerals in brackets are placed at the tops of the respective columns to indicate the elevators for which the columns are provided. The position indicator numerals also are illuminated by lamps in back of them in the cabinet. These lamps are controlled by brushes on the corresponding selector machines which engage stationary contacts on the floor bars. Below each column is a pair of jewels in the form of oppositely pointing arrows. These arrows serve as car direction indicators for the respective elevators and are designated Car Direction Lights. The jewels in the upper row are of a green color and those in the lower row are of a red color as indicative of up and down respectively. These jewels are illuminated by lamps in back of them arranged in the cabinet. These lamps may be controlled by direction indicating relays UI and DI for the respective elevators. In a row beneath the car direction indicators are car non-stop indicators designated Car Non-Stop Lights. These indicators are in the form of numerals indicative of the elevators for which the numerals are provided. These numerals also are illuminated by lamps arranged in back of the numerals in the cabinet. These lamps are controlled by the non-stop buttons for the respective elevators. The circuits for the illuminating lamps for the waiting passenger indicator, car position indicators, direction indicators and non-stop indicators are not shown in the wiring diagram.

Beneath the car non-stop indicator and in line with each column of car position indicators is a pair of start indicators. Each of these indicators is in the form of a jewel arranged to be illuminated by a lamp in back thereof in the upper cabinet. Those in the upper row designated DSLS are for indicating the cars which have received their down starting signals and those in the lower row designated USLS are for indicating the cars which have received their up starting signals. To the left of these jewels is a pair of jewels arranged one above the other. The upper one designated DTRL is for indicating that a down start signal is to be given and the lower one designated UTRL is for indicating that an up start signal is to be given. These jewels are illuminated by lamps in back of them in the upper cabinet.

There are also signals in the elevator cars. The up starting light USLC and down starting light DSLC in each car are given to advise the car attendant to start. A single stroke up gong UG and a single stroke down gong DG are provided in each car to supplement the visual starting signals. Each car is also provided with a loading light LL which advises the attendant in a car at the lower terminal that his car is to be the next to receive a starting signal, and a highest call return light HCRL which goes out to advise the attendant when his car becomes set for downward travel.

The starting signals are given at timed intervals by the operation of a timing motor arranged on the control panel. The armature of this motor is designated TM157 and the field winding TM158. The speed of this motor is controlled by manually operable interval control INT which operates a slider 160 for varying the amount of resistance R24 in shunt and in series with the motor armature. The timing motor operates switches TM162, TM163, TM165 and TM166, each switch being closed once each revolution of a shaft driven by the motor so as to operate at regular time intervals. The purposes of these switches will be explained later.

Several of the switches referred to in the description of the control system also exercise certain control of the dispatching circuits. Most of the other electromagnetically operable switches which have been listed are arranged in the dispatching circuits. Of these switches, rotary switches UR and DR are of the notching type. Each rotary switch is provided with a pair of brushes, those for the up rotary switch being designated URB1 and URB2 and those for the down rotary switch being designated DRB1 and DRB2. These brushes are rotated in step by step movement by successive deenergizations of the switch operating coil. These successive deenergizations are effected by the momentary separation of contacts UR1 for switch UR and contacts DR1 for switch DR at the completion of a notching operation. Each brush engages a plurality of stationary contacts, one for each elevator, engaging one contact at a time upon each step of rotative movement. The contacts engaged by brush DRB1 are designated DRC1(1), DRC1(2), DRC1(3) and DRC1(4) and those engaged by brush DRB2 are designated DRC2(1), DRC2(2), DRC2(3) and DRC2(4), see Figure 4. The contacts engaged by brush URB1 are designated URC1(1), URC1(2), URC1(3) and URC1(4) and those engaged by brush URB2 are designated URC2(1), URC2(2), URC2(3) and URC2(4), see Figure 5. It will be assumed that the brushes of each rotary switch are moved in a direction to successively engage contacts for elevators Nos. 1, 2, 3, 4 and back to the contacts for elevator No. 1.

In the circuit arrangement illustrated, current for the dispatching mechanism is derived from the alternating current supply lines through a polyphase transformer 150 and rectifier 151. The traffic clock 174 is connected across the secondary of the transformer. In one of the feed lines from the rectifier is a service cut-out switch SCO.

This switch is arranged on the control panel and is utilized for disconnecting the dispatching mechanism when it is desired to do service work on the system. It will be assumed that this switch and switch 129 are closed.

For convenience of description assume that there are four cars in service. For this condition number of elevators switch NE (Figure 3) is set in position 4 as illustrated. Also cut-out switches ICO(1), ICO(2), ICO(3) and ICO(4) (Figure 4) are closed. Assume further a period in which there is approximately equal traffic in both the up and down direction. For such condition traffic distributor switch TD (Figure 2) is set in position B. Assuming that this switch is moved to position B from position N, this completes a circuit for up-down traffic relay UDT. This relay operates to engage contacts UDT2 which complete the circuit for the coil of up traffic switch UT. It also engages contacts UDT3 to complete a circuit for the coil of down traffic switch DT. It also separates contacts UDT1 and UDT4 to prevent the energization of the coils of down permanent light relay DPL and up permanent light relay UPL at this time. Traffic switches UT and DT operate to engage contacts UT3 and DT3 in parallel completing the circuit for the armature TM157 and field winding TM158 of the timing motor, starting this motor in operation. The engagement of these contacts also completes the feed for further dispatching circuits, resulting in the completion of the circuit for the coil of signal relation relay AE, owing to the fact that contacts UDT5 have been engaged. The engagement of contacts UT4 and DT4 completes circuits for up traffic light UTL and down traffic light DTL respectively.

To illustrate the selection of cars, assume that both car No. 1 and car No. 2 are at the lower terminal at this time. Under such conditions, selector brushes 115(1) and 115(2) are in engagement with stationary contacts 116(1) and 116(2) respectively so that the circuits for the coils of bottom terminal relays PU(1) and PU(2) of elevators Nos. 1 and 2 respectively are completed. Contacts PR3 of the auxiliary direction relay of each of these elevators in the circuit for coil PU of that elevator are closed because the car is set for travel in the up direction. The operation of the bottom terminal relays causes separation of contacts PU2(1) and PU2(2) and the engagement of contacts PU1(1), PU1(2), PU3(1) and PU3(2). Assuming that brush URB1 of the up rotary switch is in engagement with stationary contact URC1(1) for elevator No. 1 at this time, no operation of the rotary switch takes place due to the fact that the circuit for its coil is broken at contacts PU2(1). Thus car No. 1 is selected to be the first to start from the lower terminal. Had brush URB1 been in engagement with contact URC1(2) for elevator No. 2 instead, no operation of the up rotary switch would have taken place because the circuit would have been broken at contacts PU2(2). Under such conditions car No. 2 would have been selected as the first to leave. Should brush URB1 have been in engagement with contact URC1 for some other elevator at this time, switch UR would be notched until a car is selected. Assuming that this brush had been in engagement with contact URC1(3) for elevator No. 3, the engagement of contacts PU(1) and PU(2) would complete a circuit for the coil of relay UR through contacts PU2(3) causing it to notch into engagement with contact URC1(4) where a circuit is again completed for the coil of relay UR through contacts PU2(4) upon the reengagement of contacts UR1 and so on until the brush engages contact URC1(1), selecting car No. 1.

With car No. 1 selected as the first to leave the lower terminal, the other brush URB2 of the up rotary switch is in engagement with stationary contact URC2(1) for elevator No. 1 so that the circuit for the coil of elevator No. 1 up selective switch UL(1) is completed through contacts PU3(1) to register the selection. Switch UL(1) upon operation engages contacts UL3(1) to complete a circuit through contact 101(1), brush 108(1), contacts PR5(1), ASM2(1) and CA3(1) for elevator No. 1 up hall lantern HLIU(1) at the lower terminal and loading light LL(1) in the car. Thus both the car attendant and intending passengers are advised that car No. 1 is to be the first to leave the lower terminal.

Upon the closing of timing motor switch TM162, a circuit is completed through now closed contacts UT4 of the up traffic switch for the operating coil of up timed signal self-holding switch UD, this switch being latched in operated condition and being provided with a reset coil. Switch UD upon operation engages contacts UD11 to complete a circuit for the up timer light UTRL at the starter's station, advising the starter that the timer has operated to give an up signal. These contacts also complete a circuit through contacts UL2(1) for the up starting light USLC(1) and gong UG(1) in car No. 1, advising the car attendant to start his car, and for the up starting light USLS(1) for car No. 1 at the starter's station, further advising the starter that car No. 1 is the one that has received up starting signals.

Upon the movement of the start control switch in the car to start position, the bridging of contacts 138(1) to effect the closing of the car gate and hoistway door causes the operation of auxiliary stopping switch ASM(1) as previously explained. This switch separates contacts ASM2(1) to discontinue the lighting of the loading light in the car and also the up hall lantern at the first floor to warn any further intending passengers not to try to get on the car. Also, the bridging of start control switch contacts 137(1) causes the energization of the coil of auxiliary reset switch XT(1) which engages contacts XT2(1), completing a circuit through contacts UL1(1) and UD10 for the reset coil of up timed signal self-holding switch UD. This resets switch UD, causing the separation of contacts UD11 to break the circuit for the up timer light UTRL and up starting lights USLS(1) and USLC(1) and up gong UG(1). As the car leaves the first floor, switch 118(1) closes, completing a circuit for the coil of up indicator light relay XL(1). This relay engages contacts XL4(1) to complete a circuit for highest call return light HCRL(1) to indicate that the car is travelling in the up direction.

Contacts EA1(1) separate in the starting operation to break the circuit for the coil PU(1) of the bottom terminal relay, causing this relay to drop out, the separation of contacts EA1(1) occurring before the disengagement of brush 115(1) from stationary contact 116(1) as the car leaves the first floor. Inasmuch as car No. 2 is at the first floor under the assumed conditions and its bottom terminal relay PU(2) is operated, the dropping out of relay PU(1) to reengage contacts PU1(2) completes a circuit through contacts PU1(2), stationary contacts URC1(1), brush URB1 and contacts UR1 for the coil of up rotary switch UR. This switch operates to notch brush URB1 into engagement with stationary contacts URC1(2) for elevator No. 2, selecting car No. 2 to be the next to leave the lower terminal floor.

Brush URB2 of the up rotary switch is moved along with brush URB1, brush URB2 coming to rest in engagement with contacts URC2(2). Inasmuch as contacts PU3(2) are in engagement, this completes a circuit for the coil of elevator No. 2 up selective switch UL(2) to register the selection of car No. 2. Switch UL(2) upon operation completes a circuit for the up hall lantern and loading light for elevator No. 2 to advise the car attendant and intending passengers that car No. 2 is to be the next to leave the lower terminal. Thereafter, upon reclosing of timing switch TM162, up time signal self-holding switch UD is again operated to engage contacts UD11. This completes a circuit for light UTRL at the starter's station and also completes a circuit through contacts UL2(2) for starting lights USLS(2) and USLC(2) and gong UG(2) to give the signals to the starter and car attendant for the starting of car No. 2 from the lower terminal.

Under the assumption that four cars are in service, the circuit for the coil of signal relation relay AB is completed, as previously pointed out, causing this relay to be operated. Thus contacts AB1 are engaged rendering timing motor switch TM162 also effective to control the giving of down starting signals. With conditions of approximately equal up and down traffic now being discussed, there will probably be a car at the upper terminal at the same time a car is at the lower terminal. With the cars positioned as illustrated in Figure 1, car No. 3 is at the upper terminal at the same time that car No. 1 is at the lower terminal. It will be assumed that this is the case.

As car No. 3 was brought to a stop at the upper terminal, its relays XP and XL were dropped out (as previously described for car No. 1). As a result, its highest call return light HCRL is extinguished to indicate that the car is no longer set for travel in the up direction (the circuit for this light for car No. 1 being shown in Figure 6). Also, as car No. 3 reached the upper terminal, brush 115(3) engaged contacts 117(3), completing a circuit for the coil of top terminal relay PD(3). This relay operates to separate contacts PD2(3) and PD4(3) and to engage contacts PD1(3) and PD3(3). If brush DRB1 of the down rotary switch is in engagement with stationary contact DRC1(3) at this time, no operation of the rotary switch takes place due to the fact that the circuit for its coil is broken at contacts PD2(3) before the engagement of contacts PD1(3) takes place. Thus car No. 3 is selected to leave the upper terminal. Had brush DRB1 been in engagement with another contact DRC1 instead, the down rotary switch would operate to notch its brush into engagement with contact DRC1(3) to select car No. 3 to leave the upper terminal.

With car No. 3 selected, a circuit is completed through contacts PD3(3), stationary contact DRC2(3), and down rotary switch brush DRB2 for the coil of elevator No. 3 down selector switch DL(3). This switch operates to complete a circuit for the down hall lantern for elevator No. 3 at the top floor.

Upon the closing of timing motor switch TM162, a circuit is also completed through contacts AB1 and DT4 for the operating coil of down timed signal self-holding switch DD which becomes latched in operated condition. This switch engages contacts DD2 to complete a circuit for the coil of down signal highest call return relay RR. This relay upon operation engages contacts RR1 to establish a self-holding circuit. It also engages contacts RR3 to complete a circuit for the down timer light DTRL at the starter's station, advising the starter that the timer has given a down signal. These contacts also complete a circuit through contacts XL2(3) and contacts DL2(3) for the down starting light DSLC(3) and gong DG(3) for car No. 3, advising the car attendant to start his car, and for down starting light DSLS(3) for car No. 3 at the starter's station, further advising the starter that car No. 3 is the one that has received the down starting signals.

Upon operation of the start control switch to start the car, switch ASM for elevator No. 3 operates to break the circuit for the down hall lantern at the top floor. Upon the engagement of contacts E2(3) in the starting of the car away from the upper terminal, a circuit is completed through contacts XL1(3), DL1(3) and DD11 for the reset coil of switch DD, causing this switch to be reset. Switch DD separates contacts DD2 to deenergize the coil of down signal highest call return relay RR, which separates contacts RR3 to cause the discontinuance of the giving of the downsignals. The top terminal relay PD(3) is dropped out as brush 115(3) disengages contact 117(3) as the car moves away from the upper terminal.

When timing motor operated switch TM162 closes before a car arrives at the top terminal, down starting signals may be given to a car at a floor below in the event the car has reached its highest call. In the system as shown, down start signals are given to a car at a floor in a selection zone (at the fifth or sixth floor with the circuits as shown), provided the timing mechanism has operated to close switch TM162, provided the car has reached its highest call (car call or hall call) and provided further that there is no car at the top floor. Assume such conditions exist with respect to car No. 1. With no car button pressed for the fifth, sixth or seventh floor as the car approaches the fifth floor, contacts XC1(1) and XC2(1) of the highest car call relay are closed. Thus, upon the engagement of brush 68(1) with fifth floor stationary contact 65(1), a circuit is completed through contacts DT9, contacts PD4(1), PD4(2), PD4(3) and PD4(4), closed because no car is at the top terminal, contacts 65(1), brush 68(1), contacts PR8(1) and contacts XC2(1) for the coil of highest call return selection relay RS(1). This relay upon operation engages contacts RS1(1), RS2(1) and RS3(1). Contacts RS3(1) establish a self-holding circuit for the coil. Contacts RS1(1) complete a circuit for the coil of relay PD(1), causing this relay to operate. Contacts PD4(1) are by-passed by contacts RS2(1). If brush DRB1 of the down rotary switch is in engagement with stationary contact DRC1(1) at the time relay PD operates, no notching of relay DR takes place. If in engagement with some other contact, it is notched into engagement with contact DRC1(1). In either case car No. 1 is selected as the one to receive the down start signals. The engagement of contacts PD3(1) completes a circuit for the coil of down selective relay DL(1) through contact DRC2(1) and brush DRB2, thereby registering the selection. With no hall call registered for a floor above the fifth floor and with an up fifth floor hall call not registered, upon the engagement of brush 78(1) with stationary contact 75(1) as the car approaches the fifth floor, a circuit is completed for the coil of highest hall call relay XS(1). This circuit is through contacts DT9, contacts RS2(1), contacts PD4(2), PD4(3) and PD4(4), closed because no car is at the top terminal, contacts RR4, closed as a result of the closing of switch TM162 as previously described, floor relay contacts 7FD2, 6FU1, 6FD2 and 5U1, closed because no call is registered by any one of these floor relays, contacts 75(1), brush 78(1), coil XS(1), contacts XP2(1) and contacts XC1(1). Thus, as the car approaches the fifth floor, it is selected to receive the down starting signals and circuits are set up to register the fact that the car has reached its highest call. This definitely assigns the down starting signals to this car.

Other conditions may exist when switch TM162 has operated under which a car is selected to receive the down starting signals before reaching the upper terminal and has reached its highest call. For example, if car button CB5(1) is pressed for the fifth floor, this completes a circuit through hook switches 85(1) and 86(1) for the coil of highest car call relay XC(1). As the car approaches the fifth floor, cam 88(1) opens hook switch 85(1) thus reaching its highest car call. This breaks the circuit for the coil of XC(1) so that the operation previously described is obtained. However, if the sixth floor car button CB6(1) is pressed, the operation is modified. The pressing of this button causes the operation of relay XC(1) to prevent the establishment of the circuits for the coils of either relay RS(1) or relay XS(1) as the car approaches the fifth floor. As the car reaches the sixth floor car call, hook switch 86(1) opens to break the circuit for relay XC(1). This permits the completion of the circuit for the coil of relay RS(1) through brush 68(1) and sixth floor contact 66(1). It also permits the completion of the circuit for the coil of relay XS(1) through brush 78(1) and sixth floor contact 76(1).

If a down sixth floor hall call has been registered, contacts 6FD2 are separated, preventing the establishment of the circuit for the coil of relay XS(1) until the car approaches the sixth floor and brush 78(1) engages sixth floor stationary contact 76(1), thereby reaching its highest hall call. If an up fifth floor hall call has been registered, contacts 5FU1 are separated to prevent the energization of the coil of relay XS(1) upon the engagement of brush 78(1) with stationary contact 75(1). The auxiliary stopping switch operating incident to stopping the car at the fifth floor separates contacts ASM1(1) to prevent the completion of the circuit for the coil of automatic return relay XH(1) should the highest hall call relay XS(1) be operated as a result of the reengagement of contacts 5FU1. This prevents the car being set for down travel so that a passenger entering the car at the fifth floor may be carried to a floor above. As soon as the car button for a floor above is pressed, the circuit for the coil of relay XC(1) is established so that the circuit for the coil of relay XS(1) can not be established until the car reaches the floor for which this car button is pressed. A similar operation is had in the event that the up sixth floor hall button has been pressed. If the sixth floor up hall button or seventh floor hall button has been pressed to prevent the completion of the circuit for the coil of relay XS(1) upon the engagement of brush 78(1) with stationary contact 76(1), the circuit for the coil of relay XS(1) is not completed at all, contact 77(1) not being connected in the circuit to effect the energization of this coil.

When relay XS(1) operates to register the fact that car No. 1 has reached its highest call, contacts XS1(1) engage and contacts XS2(1) separate. Assume that this operation occurs as the car approaches the fifth floor. Contacts XS1(1) complete a circuit through contacts DL3(1), closed because car No. 1 has been selected, and contacts ASM1(1), EA2(1) and XL3(1), closed because the car is set for upward travel, for the coils of automatic return relay XH(1) and signal highest call return switch SR(1). Relay XH(1) upon operation engages contact XH2(1), XH3(1), XH4(1) and XH6(1) and separates contacts XH1(1) and XH5(1). Switch SR(1) upon operation engages contacts SR1(1), SR2(1) and SR3(1). Contacts XH3(1) establish a holding circuit for these coils. Switch SR is also provided with a holding coil, the circuit for which is prepared by the engagement of contacts SR3(1) at this time. Contacts XH2(1) complete a circuit through contacts RR2, DL1(1) and DD11 for the reset coil of switch DD to effect the reset of this switch. Switch DD upon dropping out separates contacts DD2 to deenergize the coil of relay RR, which separates contacts RR4 to break the circuit for the coil of relay XS(1). Contacts XH5(1) deenergize the coil of auxiliary direction relay PR(1). Relay PR(1) separates contacts PR5(1) and engages contacts PR4(1). This renders brush 98(1) effective instead of brush 108(1) so that, brush 98(1) being in engagement with stationary contact 95(1), the down hall lantern at the fifth floor is lighted. Also, relay PR(1) separates contacts PR7(1) and engages contacts PR6(1), rendering brush 48(1) effective instead of brush 58(1) so that if a down hall had been registered for the fifth floor, the down fifth floor relay can be reset. Contacts XH4(1) complete a circuit for the neutralizing coil SM(1) of the stopping magnet, causing the car to be slowed down and brought to a stop at the fifth floor.

As the car comes to a stop, contacts H2(1) engage to complete a circuit through contacts XH6(1) for the operating coil DN(1) of the down direction switch and reset coil UP(1) of the up direction switch. This causes the operation of these switches to set the car for downward travel and the dropping out of relays XP(1) and XL(1) as a result of the separation of contacts DN1(1). The reengagement of contacts XL2(1) completes a circuit through contacts SR2(1) for the down starting lights DSLS(1) and DSLC(1) and gong DG(1), advising the starter and the car attendant that car No. 1 is to be started in the down direction, down timer light DTRL having been previously lighted by the engagement of contacts RR3 upon operation of the timing mechanism. The separation of contacts XL3(1) breaks the circuit for the coil of automatic return relay XH(1) and for the operating coil of signal highest call return switch SR(1). Relay XH(1) drops out but switch SR(1) is maintained operated owing to the fact that contacts H1(1) are now engaged completing the circuit for the holding coil of this switch.

Upon operation of the start control switch, the car is started in the down direction. Switch ASM(1) operates incident to the starting operation as previously described to break the circuit for the down hall lantern at the fifth floor. Also, switch H(I) upon operation separates contacts HI(I) to break the holding circuit for the holding coil of switch SR(I). This switch upon dropping out separates contacts SR2(I) to cause the discontinuance of the giving of the down starting signals DSLS(I) and DSLC(I).

It will be noted that the timed signal self-holding switches DD and UD upon being operated are maintained in operated condition so that if there is no car in condition to receive up starting signals or down starting signals at the time these switches are operated, such signals may be given immediately the car becomes eligible to receive it. Thus, in the example of operation given above with reference to giving the down starting signals to a car in the selection zone, switch DD, if operated before the car has answered its highest call, is maintained operated so that as soon as this call is answered the down starting signals may be given. Similarly, should no car be at the lower terminal at the time switch UD is operated, this switch is maintained operated so that upon the arrival of the car at the lower terminal it is immediately given the up starting signals. The operation of switch UD under such conditions causes the lighting of timer light UTRL to advise the starter that the timing mechanism has operated. Also, since none of the starting lights USLS are lighted, he is advised that no car is at the lower terminal floor to receive the starting signals. Similarly, the operation of switch DD under the above described conditions causes the lighting of timer light DTRL and as no starting light DSLS is lighted the starter is advised that no car is in condition to receive down starting signals.

It may happen that there is an abnormal delay in the arrival of a car at the lower terminal. In such event a car may not leave the lower terminal before motor operated switch TM165 closes. Upon the closing of switch TM165 under such conditions it completes a circuit for the coil of timing motor stop switch MS through contacts UT5 and UD2, contacts UD2 being closed because a car has not been started in the up direction since switch TM162 operated. Switch TM165 is set to close upon a certain amount of rotative movement after the closing of switch TM162, the amount depending upon the characteristics of the particular installation. In certain installations switch TM165 has been set to close upon 170° rotative movement after the closing of switch TM162. Switch MS upon operation separates contacts MS1 to break the circuit for the timing motor, bringing this motor to a stop. This is generally known as a detent operation.

When there is a detent operation due to a car not leaving the lower terminal within a certain time after the closing of switch TM162, the timing mechanism is restarted incident to the starting of the signalled car from this floor. As the start control switch is operated to start the car, contacts XT2 for that car engage to cause the reset of switch UD. Switch UD separates contacts UD2 to break the circuit for the coil of timing motor stop switch MS which reengages contacts MS1 to restart the timing motor in operation. Thus the timing motor switch operating shaft need complete only a partial revolution to effect the reclosing of switch TM162 for the giving of the next starting signals.

Similarly, it may happen that a car at the upper terminal may not leave before timing motor operated switch TM165 closes. The closing of this switch completes a circuit for the coil of timing motor stop switch MS through contacts AB3, DT5 and DD3. Switch MS operates as above described to separate contacts MS1, bringing the timing motor to a stop. The timing mechanism is restarted in operation incident to the starting of the car on its downward trip. Contacts E2 for this car close incident to the starting of the car, completing a circuit for the reset coil of switch DD which, upon resetting, separates contacts DD3 to break the circuit for the coil of the timing motor stop switch which reengages contacts MS1 to restart the timing motor in operation.

If no car is at the top terminal at the time switch TM165 is closed, switch MS may be operated to stop the timing mechanism, subject to the conditions in the selection zone. If no car is in the selection zone at this time, as a car reaches the lowest floor in the zone it is selected to receive the down starting signal, its XH relay is operated and it is stopped at that floor provided it has no call for a floor in the zone or for the upper terminal. If the car entering the zone has a call in the zone or if the car is already in the zone at the time switch TM165 closes and has not reached its highest call, and provided the car in either case has no call for the upper terminal, its relay XH is operated as the car answers its highest call. Relay XH upon operation effects the reset of switch DD to deenergize switch MS and thus restart the timing mechanism in operation. Thus, under such conditions of operation the timing motor is restarted before the down starting signals are given. Should timing motor switch TM162 reclose before the car which received the starting signals starts down, switch DD, reoperated as a result of the closing of switch TM162, can not be reset at this time because the circuit for the coil of relay RR can not be established until relay XH for that car drops back to reengage its contacts XH1 and the circuit for the reset coil of switch DD can not then be completed because contacts XH2 for that car are separated.

It is to be noted that with this arrangement the timing motor is detented whenever a car has not left the lower terminal in response to starting signals before switch TM165 closes and also when no car is assigned down starting signals in the selection zone at the time switch TM165 closes or, when a car has not left the upper terminal in response to down starting signals before switch TM165 closes. When a detent occurs due to a car having received the up starting signals and not having left the lower terminal, the detent is not released until the car leaves. When a detent occurs due to no car being available at the lower terminal to receive the starting signals, the detent is not released until a car arrives at the terminal, receives the starting signals and leaves. When a detent occurs due to a car at the upper terminal having received down starting signals and not having left, the detent is not released until the car leaves. When a detent occurs due to no car being assigned down starting signals in the selection zone at the time switch TM165 closed, the detent is not released until a car is assigned the signals.

It is thus seen from the above description that when the cars are operating under approximately equal up and down traffic conditions with traffic switch TD in position B a car, upon arrival at the lower terminal floor and becoming set for travel in the up direction under conditions where no other car is at that floor, is selected to be the next to leave. Its loading light is lighted to advise the attendant that it has been selected and the up hall lantern for that car is lighted to advise intending passengers that this car has been selected as the next to leave. Upon operation of the timing mechanism the up starting signals are given. Upon the car being started in the up direction, the signals are discontinued so that another car may be selected upon its reaching the lower terminal and its starting signals given upon the next operation of the timing mechanism. The timing mechanism operates to give the starting signals at timed intervals so that in this way the cars are started from the lower terminal with regularity.

Similar operation is had as regards starting the cars from the upper terminal. If a car arrives at the upper terminal under conditions where no other car is at that terminal, it is selected to be the next to leave, the down hall lantern at that floor lighting to advise any intending passengers who may be at that floor of this fact. Upon operation of the timing mechanism, the down starting signals are given to the car. Upon the car being started in the down direction, the signals are discontinued so that another car may be selected and its starting signals given upon the next operation of the timing mechanism.

Due to traffic conditions or other causes, cars may be delayed in their upward trip so that no car is at the upper terminal when the time for the giving of the down starting signals has arrived. Under such conditions an up travelling car, if in the selection zone or upon its arrival in that zone and provided it has reached its highest call, is brought to a stop and becomes set for travel in the down direction. Also it receives the down starting signals so that it is started in the down direction from the floor at which the stop was made. If, when a car enters this zone, no car call is registered for a floor above the car or, if such car call is registered, upon the car reaching the call, highest call return selection relay RS is operated which causes operation of the selecting mechanism to select that car. This operation takes place regardless of whether or not the time has arrived for the starting signals to be given, provided no other car has previously been selected. If the time has arrived or upon its arrival, down signal highest call return relay RR operates so that, if the car is not then answering an up hall call and if no hall call exists for a floor above the car or, if the only such call that does exist is a down hall call, upon the car reaching such call, highest hall call relay XS is operated. Relay XS in turn causes operation of automatic return relay XH to cause the car to be slowed down and brought to a stop and the reset of the down timed signal self-housing switch DD. Also, signal highest call return switch SR is operated to cause the giving of the down starting signals for the car upon the dropping out of relay XL as the car comes to a stop. When the car comes to a stop its direction of travel becomes set for down and as it starts in the down direction the down signals are discontinued.

If two cars are in the selection zone and are eligible to receive their down starting signals, the rotary switch for the down selecting circuit acts to select but one of the cars. Thus, because of its contacts DL3, only the car selected will establish the circuit for its automatic return relay XH. As soon as this circuit is established, relay RS is dropped out by the resultant separation of contacts PR8 to deenergize relay PD and thus allow another car to be selected. However, down signal highest call return relay RR has been deenergized by the reset of switch DD and the circuit for the coil of relay RR can not be reestablished until the timing mechanism operates again to close switch TM162 and the selected car has been brought to a stop to drop out its relay XH. Thus, until these conditions are fulfilled, no other up travelling car can operate its relay XH and switch SR.

When no car responds to starting signals, the timing mechanism is detented. The detent may occur as a result of a car being late in leaving the lower terminal or the upper terminal and also as a result of a car not being available to receive the up starting signals or the down starting signals. Once there is a detent operation, this is not released until a car has been given the up starting signals and has started from the lower terminal and, if the down starting signals have been given a car at the upper terminal, until such car leaves or, if no car was eligible to receive the down starting signals at the time of the detent, until a car is definitely assigned signals in the selection zone or leaves the upper terminal.

A car arriving at the top terminal has preference as to the receipt of the down starting signals. That is, if a car arrives at the upper terminal before automatic return relay XH for another car operates and becomes self-holding, the car at the upper terminal will be the one which is given the down starting signals. It is immaterial whether another car below the top terminal has been selected or not for if it has the circuit for its highest hall call return selection relay RS is broken as the aforementioned car arrives at the upper terminal and effects the separation of contacts PD4 of the top terminal relay for such car. This causes contacts RS1 of said other car to separate, permitting the notching of the down rotary switch in position to re-select the car which arrived at the upper terminal.

Up to this point the description of the operation of the dispatching system under conditions of approximately equal up and down traffic has been on the assumption that four cars were in operation. The same operation of the control mechanism is had when six cars are in operation. With number of elevators switch NE in position 6, signal relation relay AB is in operated condition the same as with switch NE in position 4. If a greater number of elevators are provided, the even numbered positions of switch NE, namely 8, 10, etc., would be connected in parallel with positions 4 and 6 so that relay AB is energized in any of these even numbered positions. When there are an odd number of cars in operation, as for example with the number of elevators switch in position 3 or 5, the coil of signal relation relay AB is not energized. In position 5, this is due to the fact that under the conditions of operation assumed, neither up traffic preference switch UTP or down traffic preference switch DTP is operated. Where a greater number of elevators are provided, the positions of switch NE for odd numbers of elevators in operation greater than five, namely 7, 9, etc., would be connected in parallel with position 5 so as to be subject to contacts UTP3 and DTP3. Thus, when an odd number of cars are in operation under conditions of approximately equal up and down traffic, signal relation relay AB is deenergized so that contacts AB1 are separated and contacts AB2 are engaged. This renders down timed signal self-holding switch DD subject to timing motor operated switch TM163 instead of switch TM162. Thus the giving of the down starting signals becomes subject to switch TM163. The giving of up starting signals, however, remains subject to switch TM162 as before. Switch TM163 is set to close upon 180° of rotative movement after the closing of switch TM162.

Contacts AB3 are separated and contacts AB4 are engaged when an odd number of cars are in operation under conditions of approximately equal up and down traffic. This renders the detenting of the timing mechanism, in case no car is available to receive the down starting signals upon the expiration of a certain timing interval after the closing of switch TM163, subject to switch TM166. The detenting of up starting signals is subject to switch TM165 as before. Switch TM166 is set to close 180° after the closing of switch TM165 or in other words 170° after the closing of switch TM163. It is to be noted that with contacts AB3 separated the coil of switch MS is deenergized, in case of a detent operation in the giving of the up starting signals, as soon as contacts UD2 open even though contacts DD3 are closed and, in case of a detent operation in the giving of the down starting signals, as soon as contacts DD3 open even though contacts UD2 are closed. During operation with an even number of cars the coil of switch MS is not deenergized after a detent operation until both contacts UD2 and contacts DD3 are separated.

Assume now a period in which the traffic is substantially all in the up direction, as during the morning incoming peak. For such condition, traffic distributor switch TD is set in position A. In this position both up-down traffic relay UDT and down traffic switch DT are not operated. Up traffic switch UT is operated and, owing to the fact that contacts UDT1 are engaged, down permanent light relay DPL is operated. With switch DT not operated, contacts DT4 are separated rendering the timing mechanism ineffective to control the giving of the down starting signals and preventing the energization of relay RR, contacts DT9 are separated preventing the energization of switches RS, contacts DT8 are engaged preparing another circuit for the coils of relays XS, contacts DT7 for each car are engaged by-passing down selective relay contacts DL3 in the circuit for the coil of automatic return relay XH for that car, and contacts DT6 are engaged causing the down timer light DTRL at the starter's station to be permanently lighted. The permanent lighting of the down timer light is to advise the starter that the up travelling cars are to be given the down starting signals immediately they are in condition to receive them.

Under such conditions of operation, the dispatching of the cars from the lower terminal in response to up starting signals given by the timing mechanism is the same as previously described. That is, the car upon its arrival at the lower terminal under conditions where no other car is already at that floor is selected to be the next to leave. Its loading light and up hall lantern are lighted immediately and upon operation of the timing mechanism to close switch TM162 the starting signals are given. Incident to the starting of the car in the up direction, discontinuance of the giving of the signals is effected and the system is put in condition to select another car, when one is already at the floor or upon the arrival of one at the floor.

When a car button is pressed in a car for a floor above that car, the coil of highest car call relay XC for that car is energized, preventing the energization of highest hall call relay XS for that car. Similarly, if a hall call is registered for a floor above the car, the back contacts of the operated floor relay are separated, also preventing the energization of the highest hall call relay XS for that car. However, upon the car reaching a floor for which a car button in that car is pressed or for which a down hall call is registered under conditions where the up hall call for that floor is not registered and no car button in that car for a floor above is operated and no hall call for a floor above is registered, the circuit for the coil of relay XS for that car is completed by way of contacts DT8. Relay XS engages contacts XS1 to complete a circuit by way of contacts DT7 for the coil of relay XH for that car. This relay operates to cause the car to be automatically slowed down and brought to a stop at that floor and its direction of travel set for down. Also, switch SR for that car is operated, which causes the down starting signals to be given for the car as it is brought to a stop. This operation may occur at any floor above the first floor and is not restricted to the selection zone as in the case with traffic distributor switch TD in position B.

Should the top terminal floor car button in the car or the hall button at that floor have been operated, the car would travel to the top floor, where its direction of travel would be changed as it is brought to a stop. Inasmuch as contact 77 for that car is not connected in the circuit for the coil of relay XS for that car, the down starting signals are given to the car through the operation of the selector machine to cause operation of relay PD for that car. Inasmuch as contacts DPL1, DPL2, DPL3 and DPL4 are engaged, the operation of relay PD for any car causes the immediate operation of relay DL for that car which operates to complete the circuit for these signals for that car, the circuit being through contacts XL2 and DL2 for that car and contacts DT6. Should two cars be travelling upwardly under conditions where only one hall call is registered above them, upon the leading car picking up this call the following car, if it has no car button pressed for a floor above it, completes the circuit for its highest hall call relay XS upon the engagement of its brush 78 with its next stationary contact, thereby completing the circuit for the coil of its automatic return relay XH, causing the car to be slowed down and brought to a stop at the floor for which the stationary contact is provided, whereupon it is set for travel in the down direction and the down starting signals given.

With such operation, each of the cars set for travel in the up direction upon being brought to a stop at a floor under conditions where no car button in that car for a floor above is operated, where no up hall call for that floor is registered and where no hall call for a floor above is registered, becomes set for travel in the down direction and its down starting signals are given immediately so that the car may return immediately to the lower terminal. In this way the cars are started from the lower terminal to take incoming passengers to their various destinations and as soon as the passengers have been distributed and no hall calls remain to be responded to for floors above, the cars are immediately returned to the lower terminal so as to enable them to keep on schedule.

Assume now a period in which the traffic is substantially all in the down direction, as during the evening outgoing peak. For such condition traffic distributor switch TD is set in position C. In this position both up-down traffic relay UDT and up traffic switch UT are not operated. Down traffic switch DT is operated and, owing to the fact that contacts UDT4 are engaged, up permanent light relay UPL is operated. With switch UT not operated, contacts UT4 are separated rendering the timing mechanism ineffective to control the giving of up starting signals and contacts UT6 are engaged to cause up timer light UTRL at the starter's station to be permanently lighted. The permanent timer light is to advise the starter that down travelling cars are to be given their up starting signals immediately they arrive at the lower terminal and become set for travel in the up direction.

Under such conditions of operation, the dispatching of the cars in response to down starting signals given by the timing mechanism is the same as previously described under conditions of approximately equal up and down traffic. Inasmuch as, due to the separation of contacts UDT5, contacts AB2 are engaged and contacts AB1 are separated and as contacts DT4 are engaged, timing motor switch TM163 is effective for the giving of these signals. If a car arrives at the upper terminal floor before the timing mechanism operates to close switch TM163, the down starting signals are assigned to the car at the upper terminal. If switch TM163 is closed before a car reaches the upper terminal, the down starting signals are assigned to a car in the selection zone upon its reaching its highest call. When a car arrives at the lower terminal and becomes set for travel in the up direction, it is immediately selected to leave, even though there be another car at that floor also selected but not yet started. Also, the up starting signals are given the car immediately. Taking for example car No. 1, as it arrives at the lower terminal and becomes set for travel in the up direction its bottom terminal relay PU(1) is operated. The resultant engagement of contacts PU3(1) completes a circuit for the coil of up selective relay UL(1) through contacts UPL1(1) of the up permanent light relay. The up selective relay engages contacts UL2(1) and thus a circuit is completed immediately for the starting signals for car No. 1 through contacts UT6. Thus this car may start immediately in the up direction. The loading light and up hall lantern at the lower terminal for that car are also lighted so that any intending passenger who may be at that floor may get on the car.

It may happen during periods of peak outgoing traffic that cars are filled to capacity at the upper floors and are non-stopped past lower floors for which down hall calls have been registered. The system is arranged so that when any such down hall call has been registered for more than a certain length of time this call becomes effective to stop an up travelling car having no car call registered for a higher floor and set the car for downward travel as it comes to a stop. This arrangement is provided for the second, third and fourth floors. This operation is effected through the control of time relays TR, one for each of floors 2, 3, and 4. Each of these time relays is controlled to operate upon the expiration of a predetermined time interval after the registration of an unanswered down hall call for the corresponding floor.

The timing circuits involved are shown in Figure 2. Certain parts of the timing apparatus are individual to the respective floors and certain parts are common to the floors. The circuits individual to the respective floors are the same for each floor. Referring for example to the circuits for the third floor, the time interval, after which the down hall call becomes effective to stop a car set for up travel, is obtained by the discharge of the condenser designated 3CO4. 3R11 is a discharge resistance for the condenser. The condenser acts through an electronic tube 3CT of the hot cathode type which is prevented from firing by a negative bias on the grid 3GR with respect to the cathode 3CD. The anode of this controlled tube is designated 3AN. 3IT is a two element tube in the condenser charging circuit. 3R9 is a current limiting resistance. 3FD1 are contacts on the down third floor relay for controlling this timing circuit.

As to the circuits common to the floors, direct current voltage for the plate circuits of controlled tubes is obtained off the direct current supply lines from the polyphase rectifier 151. TP is the primary winding of a transformer supplied from transformer 124. TS1, TS2, TS3 and TS4 are secondary windings of this transformer. Windings TS3 and TS4 supply alternating current to rectifier REC which provides direct current for charging condensers CO4. Secondary winding TS2 is utilized to supply current to the heater elements of the controlled tubes. Alternating current voltage from transformer secondary winding TS1 is superimposed on direct current voltage applied to the plate circuits of the controlled tubes. Also alternating current voltage from winding TS1 is superimposed on the direct current voltages provided by condensers CO4 in the control grid circuits of the controlled tubes. Condensers CO1 and CO2 and resistances R3 and R4 constitute a phase shift network for controlling the phase relationship of the superimposed alternating current grid voltage with respect to the plate voltage. Manually operable dial switch TC and resistances R1 and R2 constitute mechanism for adjusting the length of the time period which expires before a down call becomes effective to stop an up car.

With power on the alternating current supply lines a charge is built up on each of condensers CO4 to cause negative potential to be applied to the control grids of the controlled tubes sufficient to block the tubes. The mechanism for controlling the time relays TR is rendered effective only in position C of traffic distributor switch TD by means of contacts UT1, UT2, DT1 and DT2. In this position, switch UT is not operated and switch DT is operated. The engagement of contacts DT1 connects primary winding TP to supply transformer 124. The engagement of contacts DT2 short circuits resistance R5 to superimpose the alternating current voltage from the phase shift network onto the voltages of condensers CO4. Rectifier REC applies direct current voltage of a value sufficient to cause the breakdown of isolating tubes IT to effect the further charging of condensers CO4 and thus raises the negative potential of the grids with respect to the cathodes of the controlled tubes.

Taking the condenser 3CO4, for example, as the condenser charge builds up the potential drop across resistance 3R9 decreases until it becomes zero, whereupon tube 3IT goes out. The condenser then discharges into resistances 3R11 and R4 until, due to the lowering of the condenser charge, the voltage applied to tube 3IT rises to a point sufficient to breakdown this tube. This cycle of operation is repeated until down third floor relay contacts 3FD1 engage. Upon the closure of contacts 3FD1 an auxiliary discharge resistance is completed through resistance R3 and tube 3IT. This causes the condenser to discharge to the value of the extinction voltage of tube 3IT, whereupon the tube goes out and the condenser discharges into resistances 3R11 and R4.

Assume that the call is not answered before the condenser has discharged to a point to permit tube 3CT to fire. When this point is reached time relay 3TR is operated. This relay engages contacts 3TR2 and separates contacts 3TR1 (see Figure 6). The separation of contacts 3TR1 disconnects stationary contact 73 for each elevator from the highest hall call return circuit while the engagement of contacts 3TR2 renders these stationary contacts alive. Thus, upon the engagement of brush 78 of any up travelling car whose contacts XC1 are engaged with its contacts 73, that car is caused to slow down and stop at the third floor and become set for travel in the down direction. Also the down third floor relay is reset as a result of the operation of relay PR, for that car. Upon the resultant separation of contacts 3FD1 the condenser is recharged and the discharge, recharge cycles are resumed. It is to be noted that the connection of contacts 73 to the grounded side of the exciter is through resistance 3R45 and condenser 3CO15 in parallel. This permits current flow sufficient to operate relay XS for the first car whose brush 78 engages its stationary contact 73 and of sufficient duration to get relay XH operated and self-held. However, the charging of the condenser prevents sufficient current flow to operate the relay XS of another car, thereby minimizing the possibility of two cars answering the same timed down hall call.

A throwover switch TO1 is provided for contacts 2FD1 of the down second floor relay by means of which these contacts can be disconnected from the timing circuit for the second floor and connected to the timing circuit for the third floor in parallel with contacts 3FD1. With contacts 2FD1 connected in parallel with contacts 3FD1, upon a down hall call for the second floor existing for a certain length of time an up traveling car is caused to stop at the third floor and become set for travel in the down direction. In this way, any passengers waiting at the third floor may be also taken into the car and a stop made at the second floor on the way down. This arrangement may be provided for more than one floor if desired. For example, contacts 2FD1 and 3FD1 may be arranged for connection in parallel with contacts 4FD1.

Down starting signals are given a car which responds on an up trip to a timed down hall call as the car comes to a stop, due to switch SR for that car being operated. However, as relays RS can not be operated at floors at which such stops are made, selective relay DL for a car answering a timed down hall call can not be operated so that switch DD if operated is not reset. Thus the answering of a timed down hall call does not interfere with the operation of the dispatching mechanism.

In some elevator installations there are, under up and down traffic conditions, not only periods during which traffic in each direction is approximately equal but also periods during which up traffic is predominant and/or during which down traffic is predominant. To provide satisfactory service for these different periods, the cars should be distributed so as to balance them against the traffic conditions for the particular period.

Considering first approximately equal up and down traffic, for this condition cars should be distributed on an equal time basis throughout the entire round trip. To provide this distribution when there is in service an even number of cars, i. e., four, six, eight, etc., the time allowance for each car for an up trip and also for a down trip should be a multiple of the time interval between cars and these time allowances should be equal. Thus the up starting signals and the down starting signals should be given simultaneously. With such distribution with, for example, six cars in service, the up trip allowance and down trip allowance each would be three times the time interval, that is each car would be allowed three intervals to make its trip from one terminal to another with the result that there would be three cars on an up trip and three cars on a down trip. To distribute the cars equally throughout the building on a time basis when there is in service an odd number of cars, i. e., three, five, seven, etc., the time allowance for each car for an up trip and also for a down trip should be a multiple of the time interval between cars plus one-half an interval and these time allowances should be equal. For this condition, the up and down starting signals should be given alternately. With such distribution with, for example, five cars in service, the up trip allowance and down trip allowance each would be two and a half times the time interval, that is each car would be allowed two and a half intervals to make its trip from one terminal to another with the result that there would in effect be two and a half cars on an up trip and two and a half cars on a down trip. Such operation is had in the system illustrated by setting traffic distributor switch TD in position B and by setting number of elevators switch NE in position corresponding to the number of cars in service.

When under up-down traffic conditions, traffic in one direction predominates over that in the other, the time allowance for each car should be greater for a trip in the predominant traffic direction than for a trip in the opposite direction. Thus for predominant down traffic, the time allowance for each car for a down trip should be greater than that for an up trip, and for predominant up traffic, the time allowance for each car for an up trip should be greater than that for a down trip. Such distribution may be had by in effect assigning more cars to a down trip than to an up trip under predominant down traffic conditions and by in effect assigning more cars to an up trip than to a down trip under predominant up traffic conditions. When, for example, five cars are in service and when traffic predominance is down, with three cars assigned to the down trip and two cars assigned to the up trip and with the starting signals given simultaneously, each car would be allowed three intervals to make its down trip and two intervals to make its up trip. When traffic predominance is up, with three cars assigned to the up trip and two cars assigned to the down trip and with the starting signals given simultaneously, each car would be allowed three intervals to make its up trip and two intervals to make its down trip. When, for example, six cars are in service and when traffic predominance is down, with in effect three and a half cars assigned to the down trip and two and a half cars assigned to the up trip and with the starting signals given alternately, each car would be allowed three and a half intervals to make its down trip and two and a half intervals to make its up trip. When traffic predominance is up, with in effect three and a half cars assigned to the up trip and two and a half cars assigned to the down trip and with the starting signals given alternately, each car would be allowed three and a half intervals to make its up trip and two and a half intervals to make its down trip. Such operation is had in the system illustrated by setting traffic distributor switch TD in position U for predominant up traffic and in position D for predominant down traffic and by setting number of elevators switch NE in position corresponding to the number of cars in service.

When number of elevators switch NE is set in position corresponding to the number of elevators in service and traffic distributor switch TD is set in that one of positions B, U and D to provide the proper car distribution for the particular traffic conditions, should the cars get out of balance for such traffic conditions, the system acts automatically to restore the balance. Also, when the traffic distributor switch is moved from any one of these positions to another, the system acts automatically to place the cars in proper balance for the traffic conditions for which the switch is set. Further, when the number of cars in service is changed and the number of elevators switch is moved to position corresponding to the new number of cars, the system acts automatically to place the cars in proper balance for that one of the three traffic conditions for which switch TD is set. This may be termed automatic time distribution balancing.

Figure 3:
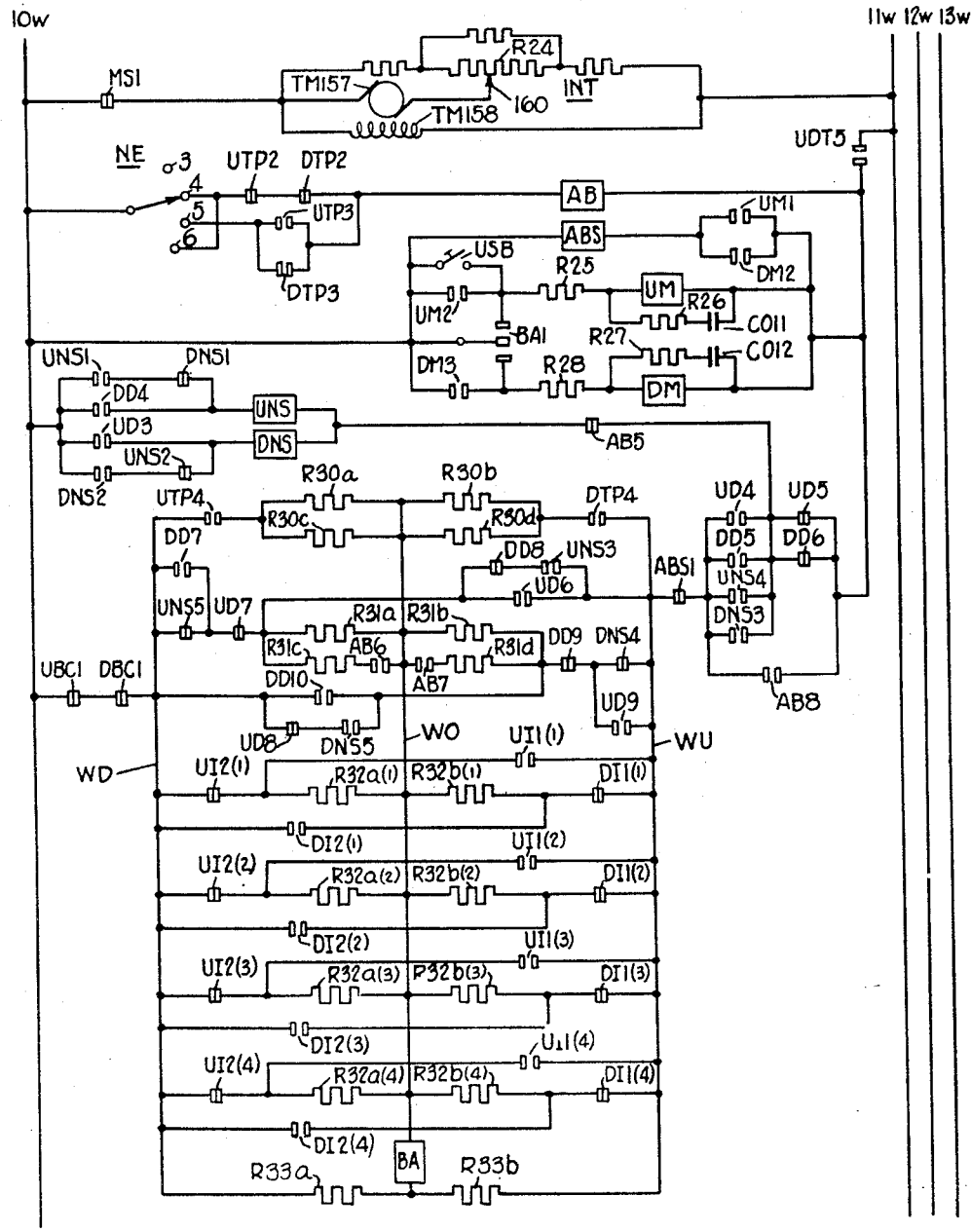
Figure 3A:
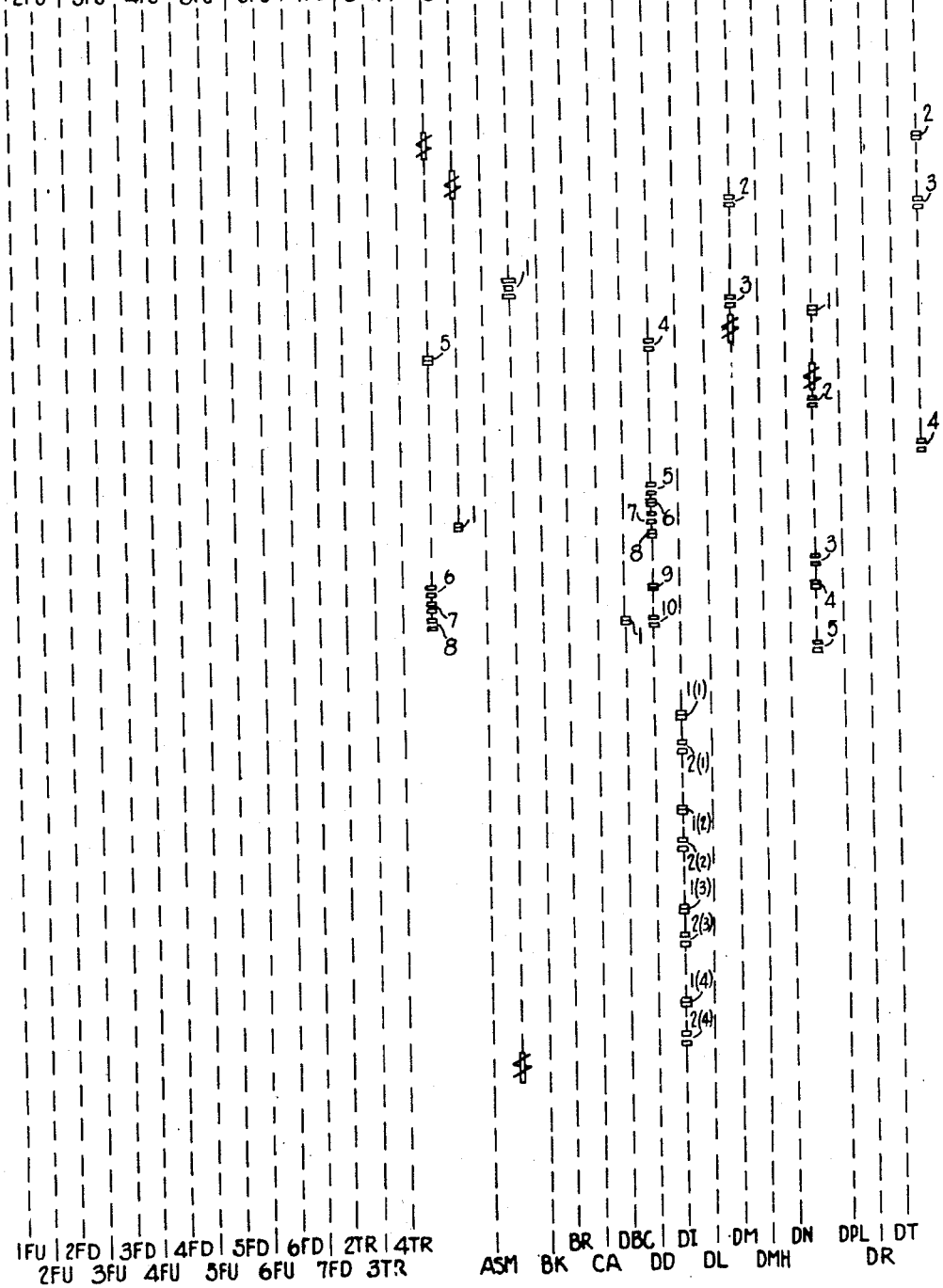
Figure 3B:
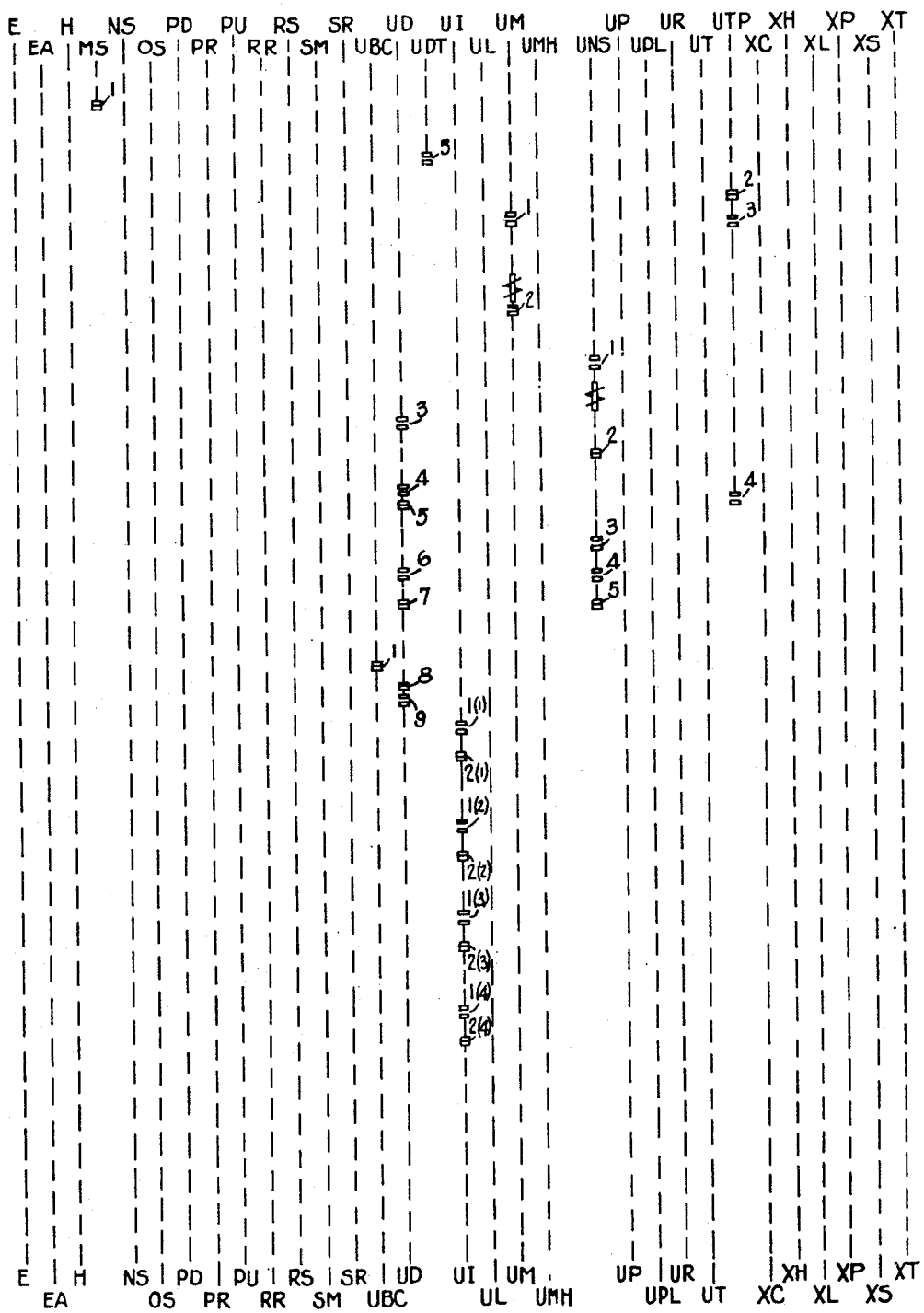

In the arrangement illustrated, the automatic time distribution balancing for these various conditions is effected by the control exercised on a Wheatstone bridge circuit (see Figure 3). The legs of this bridge are made up of resistances. Two of these legs are formed by resistances R33a and R33b of equal ohmic value which remain fixed and may be considered the fixed legs of the bridge. The other two legs are formed by resistances R32a and R32b for each car and resistances R30a, R30b, R30c, R30d, R31a, R31b, R31c and R31d, all of which are of equal ohmic value, in alterable relationships depending upon operating conditions. The latter legs may be considered as direction legs, the up leg extending from wire WO to wire WU and the down leg extending from wire WO to wire WD. Across the diagonal of the bridge is connected the coil of balancing relay BA. This relay is a polarized relay and is not actuated so long as the operating conditions are such that the bridge is balanced. When the bridge becomes unbalanced, the relay is actuated into one position or another, depending upon the conditions which cause the unbalance, causing these conditions to be corrected.

For the purposes of the functioning of the balancing device, a car at the lower terminal is not considered an up car until it is started in the up direction and a car at the upper terminal is not considered a down car until it is started in the down direction. When an up car is making a stop at a floor in the selection zone under conditions where it will be set to leave that floor in the down direction, it will be considered a down car as soon as the stop is initiated. This determination is effected through the control of direction indicating relays UI and DI for each car.

When up direction indicating relay UI for a car is operated that car for the purposes of the control of the bridge circuit is an up car and, when down direction indicating relay DI for a car is operated, that car for the purposes of the control of the bridge circuit is a down car.

For an understanding of the control and operation of the direction indicating relays, assume that a car, say car No. 1, arrives at the lower terminal and becomes set for upward travel. As it is desired to still consider the car a down car, the operation of relay UI(1) and the dropping out of relay DI(1) does not then take place and thus no change in the bridge circuit is effected. However, relay PR(1) is operated which engages contacts PR2(1) preparing the circuit for the coil of relay UI(1). As the start control switch is operated to start the car in the up direction, contacts XT1(1) engage, completing the circuit for the coil of relay UI(1). Relay UI(1) operates to separate contacts UI3(1), effecting the deenergization of the coil of relay DI(1) which has been operated up to this time and causing this relay to drop out. It also engages contacts UI4(1) which together with the engagement of contacts DI3(1) establishes a holding circuit for the coil of relay UI(1). Also contacts UI1(1) engage and contacts UI2(1) separate transferring resistance R32a(1) from the down leg to the up leg of the bridge while contacts DI1(1) engage and contacts DI2(1) separate transferring resistance R32b(1) from the down leg to the up leg of the bridge. Thus as the car changes from a down car to an up car, a change in the bridge circuit takes place. Similarly, when a car, say car No. 1, arrives at the upper terminal and becomes set for downward travel, it is considered as remaining an up car and no change in the bridge circuit is effected. However, relay PR(1) is deenergized with the result that contacts PR1(1) engage preparing the circuit for the coil of relay DI(1). Upon the car being started on its downward trip, contacts E1(1) engage, completing the circuit for the coil of relay DI(1). This relay operates to separate contacts DI3(1), breaking the holding circuit for the coil of relay UI(1) which drops out to engage contacts UI3(1) to complete a holding circuit for the coil of relay DI(1). As a result of the operation of relay DI(1) and the dropping out of relay UI(1), resistances R32a(1) and R32b(1) are transferred from the up leg to the down leg of the bridge. Thus as the car changes from an up car to a down car, a change in the bridge circuit takes place. When an up car, say car No. 1, is stopped in the selection zone through the operation of automatic return relay XH(1), signal highest call return switch SR(1) is operated at the same time as previously explained. This switch upon operation engages contacts SR1(1) which together with the reengagement of contacts PR1(1) effected as a result of the simultaneous operation of relay XH(1) completes the circuit for the coil of relay DI(1). This relay operates and drops out relay UI(1) as above set forth, causing the car for the purposes of controlling the operation of the balancing device to change from an up car to a down car as soon as switch SR(1) and relay XH(1) operate. Also this results in both of resistances R32a(1) and R32b(1) being transferred from the up leg to the down leg of the bridge, thus changing the bridge circuit. Thus it will be seen that with, for example, four cars in service with two of them up cars and two of them down cars, there will be four of the R32 resistances, say resistances R32a(1), R32b(1), R42a(2) and R32b(2), connected in parallel in the down leg of the bridge and four of these resistances, with the above assumption, R32a(3), R32b(3), R32a(4) and R32b(4), connected in parallel in the up leg of the bridge. Inasmuch as these resistances are of equal ohmic value, this causes the bridge to be balanced with the result that balancing relay BA is not operated. It is believed clear that the same condition exists in the case of other even numbers, i. e., six, eight, etc., of cars in service.

For an understanding of the operation of the balancing device, operation under conditions of approximately equal up and down traffic with an even number, say four, of cars in service will first be described. For such conditions, traffic distributor switch TD is set in position B and number of elevators switch NE is set in position 4. This causes switches UT and DT and relays AB and UDT to be operated. As a result, the giving of the up starting signals and the down starting signals is subject to switch TM162 as previously explained. Also, the Wheatstone bridge circuit is rendered effective by the engagement of contacts AB8, and contacts AB6 and AB7 are engaged connecting resistances R31c and R31d in parallel with resistances R31a and R31b respectively.

In discussing the balancing circuits, so far only the relationship of the cars to each other has been considered. Another factor is the relationship of the cars to the starting signals. Under the assumed conditions of approximately equal up and down traffic and with an even number of cars in service, it is unlikely that the start control switch for the selected car at the lower terminal which has received its starting signals will be operated to start in the up direction exactly at the same instant that the selected car at the upper terminal which has received its starting signals starts in the down direction or, when a car is selected to receive the starting signals at a floor in the selection zone instead of the upper terminal, at the same instant switch SR for that car is operated. In fact, a considerable difference of time may be involved. Yet the cars are still balanced for, as soon as the last of these cars being dispatched leaves, there will be the same number of cars travelling upwardly as there are cars travelling downwardly. To prevent the false registration of an unbalanced condition on the bridge and thus the false operation of balancing relay BA under such conditions of apparent unbalance when in fact the cars are balanced, the bridge is balanced through the control exercised on the resistances R31. With switches UD and DD both reset, two of these resistances are connected across each leg of the bridge. Thus these resistances balance each other and do not cause operation of relay BA. When switch TM162 closes, switches UD and DD are operated to transfer these resistances to opposite legs of the bridge so that these resistances still balance each other. Incident to the starting of the selected car from a terminal, that one of switches UD and DD for the direction of travel of the car is reset to transfer two of these resistances R31 to one leg of the bridge at the same time that the direction indicating relay for that car for that direction is operated and the other direction indicating relay for that car is dropped out to transfer two R32 resist- ances over to the other leg. As a result, the resistance balance is maintained regardless of whether the start control switch for the selected car at the other terminal has been operated to start the car or not. Similarly, when down starting signals are definitely assigned to a car in the selection zone, switch DD is reset and relay DI for that car is operated and relay UI for that car is dropped out as a result of the operation of relay XH and switch SR so that the up and down legs of the bridge are balanced even though the start control switch for the selected car at the lower terminal is operated for that car before or after this assignment to a car in the selection zone.

For a better understanding of these operations under the continued assumption of approximately equal up and down traffic and of four cars in service, assume that car No. 2 is travelling up and car No. 4 is travelling down, that car No. 1 has arrived at the lower terminal and has become selected as the next to leave and that car No. 3 has arrived at the upper terminal and has become selected as the next to leave. It will be seen from previous description that under this assumption resistances R32a(2), R32b(2), R32a(3) and R32b(3) are connected in the up leg of the bridge and resistances R32a(1), R32b(1), R32a(4) and R32b(4) are connected in the down leg of the bridge so that the R32 resistances are balanced. Also, with switches UD and DD both reset, resistances R31a and R31c are connected through contacts UNS5 and UD7 in the down leg of the bridge and resistances R31b the R31d are connected through contacts DD9 and DNS4 in the up leg of the bridge. Thus resistances R31 balance each other and do not cause operation of relay BA. When switch TM162 closes it causes the simultaneous operation of switches UD and DD with the result that contacts UD6 engage and contacts UD7 separate to transfer resistances R31a and R31c to the up leg of the bridge and contacts DD9 separate and contacts DD10 engage to transfer resistances R31b and R31d to the down leg of the bridge. Thus resistances R31 again balance each other and do not cause the operation of relay BA. Assume that car No. 1 is started from the lower terminal before car No. 3 is started from the upper terminal. Incident to the starting of car No. 1 contacts XT1(1) engage to complete a circuit for the coil of up direction indicating relay UI(1) and at the same time contacts XT2(1) engage to complete a circuit for the reset coil of switch UD and for the coil or up balance cut-out relay UBC. Relay UBC separates contacts UBC1 to disconnect the balancing circuits from the supply lines during the transition of the balancing resistances. Relay UI(1) causes the dropping out of relay DI(1) as previously explained and together they transfer resistances R32a(1) and R32b(1) from the down leg to the up leg of the bridge. The reset of switch UD causes the separation of contacts UD6 and the engagement of contacts UD7 to transfer resistances R31a and R31c from the up leg to the down leg of the bridge. Thus resistances R32a(1) and R32b(1) are balanced by resistances R31a and R31c so that upon the reengagement of contacts UBC1, which takes place as a result of the separation of contacts EA1(1) in the starting operation, balancing relay BA is not operated. When car No. 3 leaves the upper terminal its contacts E1(3) engage to complete a circuit for the coil of down direction indicating relay DI(3) at the same time that contacts E2(3) engage to complete a circuit for the reset coil of switch DD and for the coil of down balance cut-out relay DBC. Relay DBC separates contacts DBC1 to disconnect the balancing circuits from the supply lines during the transition of the balancing resistances. Relay DI(3) causes the dropping out of relay UI(3) and together they transfer resistances R32a(3) and R32b(3) from the up leg to the down leg of the bridge. The reset of switch DD causes the separation of contacts DD10 and engagement of contacts DD9 to transfer resistances R31b and R31d from the down leg to the up leg of the bridge. Thus resistances R32a(3) and R32b(3) are balanced by resistances R31b and R31d so that upon the reengagement of contacts DBC1, which takes place as the result of the car leaving the upper terminal, balancing relay BA is not operated.

Should car No. 3 leave the upper terminal before car No. 1 is started from the lower terminal, relays DI(3) and UI(3) transfer resistances R32a(3) and R32b(3) from the up leg to the down leg of the bridge and switch DD is reset to transfer resistances R31b and R31d from the down leg to the up leg of the bridge, thus maintaining the balance. When car No. 1 is started from the lower terminal relays UI(1) and DI(1) transfer resistances R32a(1) and R32b(1) from the down leg to the up leg of the bridge and when switch UD is reset it transfers resistances R31a and R31c from the up leg to the down leg of the bridge, thus maintaining the balance. Thus relay BA is not operated under these conditions.

Should car No. 3 be selected to receive the down starting signals at a floor in the selection zone instead of at the upper terminal, the transition of the balancing resistances is made when the signals are definitely assigned to this car rather than when the car is started downwardly. Inasmuch as this assignment can not be made unless switch TM162 under the conditions assumed has been closed, either switches UD and DD both must be operated and therefore resistances R31 balance each other or, if the start control switch for car No. 1 is operated to start the car from the lower terminal before the assignment is made, resistances R31 are balanced by resistances R32. When this assignment is made switch SR(3) operates to engage contacts SR1(3) which, together with the reengagement of contacts PR1(3) as a result of the simultaneous operation of relay XH(3), causes the operation of relay DI(3) and the dropping out of relay UI(3). At the same time relay XH(3) causes the reset of switch DD and the operation of relay DBC. During the momentary interruption of the balancing circuits by relay DBC, relay DD transfers resistances R31b and R31d to the up leg of the bridge and relays DI(3) and UI(3) transfer resistances R32a(3) and R32b(3) to the down leg of the bridge. Thus the balance is maintained so that the relay BA is not operated upon the engagement of contacts DBC1. It is believed it will be understood from the previous description that the balance is maintained when the start control switch for car No. 1 is operated to start the car after the assignment of signals to car No. 3.

The detenting of the timing mechanism has no function in connection with placing the cars in a given distribution or reestablishing a given distribution when the cars get out of balance. A detent operation simply stops the timing mechanism until the condition which caused the detent is corrected. The detent is released incident to the starting of the late car from the terminal or to the assignment of the down starting signals to a car in the selection zone without affecting the balancing resistance transition which takes place at that time. However, the detenting assists in obtaining the desired distribution of the cars as it prevents further operation of the timing mechanism until the particular operations which this mechanism has initiated have been responded to.

With an even number of cars in service under conditions of approximately equal up and down traffic, should the cars get out of balance for any reason, without the balancing circuits the unbalance would not be corrected by the natural functioning of the dispatching system as the timing mechanism and circuits controlled thereby have no knowledge of the number of cars on an up trip compared with those on a down trip. For example, should for some reason there get to be two more cars on say a down trip than on an up trip, the timing mechanism would continue to initiate the starting signals and each car would get its up starting signals and its down starting signals each complete trip. Thus there would remain two more cars on a down trip than on an up trip with the possibility of considerable detenting due to the lack of the proper number of cars on the up trip. With the balancing circuits, however, relay BA operates, as soon as the unbalance occurs, to cause the unbalance to be corrected. Correction of unbalances will now be described.

Continuing with the assumption of four cars in service with switch TD in position B, assume that say car No. 1 has been selected to receive its down starting signals at the upper terminal but leaves before these signals have been given. Its relays DI(1) and UI(1) act as before described to transfer resistances R32a(1) and R32b(1) to the down leg of the bridge. However, as the starting signals have not been given, neither of switches DD or UD is operated and resistances R31 are connected in balanced relation in the up and down legs of the bridge. Therefore resistances R31 can not act to balance resistances R32a(1) and R32b(1) with the result that four more resistances are connected in the down leg of the bridge than in the up leg of the bridge. The same result is had should car No. 1 leave the upper terminal under conditions where another car was also at the upper terminal and selected over car No. 1 as the next to leave. This is true regardless of whether or not switch TM162 has operated to give down starting signals to the other car. If switch TM162 has not operated, both switches UD and DD are not operated. If switch TM162 has operated, both switches UD and DD are operated. In either case, resistances R31 are connected in balanced relation in the up and down legs of the bridge. However, switch DD if operated, is not dropped out as car No. 1 leaves as contacts DL1(1) are not engaged. Thus resistances R32a(1) and R32b(1) transferred to the down leg of the bridge by the departure of car No. 1 can not be balanced by resistances R31b and R31d with the result that four more resistances are connected in the down leg of the bridge than in the up leg of the bridge.

In each of these examples of resistance unbalance, balancing relay BA operates in a direction to complete the circuit for the coil of up balance signal relay UM. This relay upon operation engages contacts UM2 to establish a self-holding circuit and engages contacts UM1 to complete a circuit for the coil of auxiliary balance signal relay ABS. Relay ABS separates ABS1 to disconnect the balancing circuits from the supply lines. Relay UM also engages contacts UM4 to cause, assuming switch TM162 does not close, the immediate giving of starting signals to the selected car at the lower terminal or, if no car is there, to a car as soon as it arrives at the lower terminal. Starting signals initiated by operation of relay BA will be hereinafter termed corrective starting signals to distinguish from the regular or timed starting signals given by timing motor operated switch TM162 or TM163. It also engages contacts UM3 which prepares a circuit for the bucking coil of relay UM. When a car is dispatched from the lower terminal by those corrective starting signals, the car balance is restored. As the car is started its contacts XT2 engage completing the circuit for the bucking coil of relay UM. This causes relay UM to drop out with the result that relay ABS is also dropped out. This reconnects the balancing circuits to the supply lines and, as resistances R32a and R32b for the car dispatched by the balancing device have been transferred to the up leg of the bridge as the result of the operation of relay UI and dropping out of relay DI for that car as the car leaves, the bridge has been restored to balanced condition so that relay BA does not reoperate.

In case the unbalance were in the up direction instead of the down direction, as due to a car leaving the lower terminal before receipt of its timed starting signals, relay BA would operate in the opposite direction to cause the operation of down balance signal relay DM. Relay DM also establishes a self-holding circuit through its contacts DM3 and causes the operation of relay ABS through its contacts DM2. Relay ABS operates to disconnect the balancing circuits. Relay DM also engages contacts DM1 to cause, assuming switch TM162 has not yet closed, the operation of relay RR. Relay RR acts to cause the immediate giving of down corrective starting signals to the selected car at the upper terminal or, if no car is there, either to cause the immediate giving of down corrective starting signals to a car as soon as it arrives at the upper terminal or to cause a car selected in the selection zone which has reached its highest call to be brought to a stop at a floor and set for downward travel and down corrective starting signals to be given to it as it comes to a stop. It also engages contacts DM4 which prepares a circuit for the bucking coil of relay DM. When a car is dispatched from the upper terminal by corrective starting signals or, if a car is selected to be given these signals at a floor in the selection zone, when the signals are definitely assigned to this car, the car balance is restored. When a car is dispatched from the upper terminal on corrective signals the circuit for the bucking coil of relay DM is completed through contacts E2, XL1 and DL1 for this car and contacts DMH2 as soon as this car leaves. In the event the corrective signals are given to a car at a floor in the selection zone, the circuit for this bucking coil is completed through contacts RR2, contacts XH2 and DL1 for this car and contacts DMH2 upon operation of relay XH at the initiation of the slow down.

The energization of the bucking coil causes relay DM to drop out with the result that relay ABS is also dropped out. This reconnects the balancing circuits to the supply lines and, as resistances R32a and R32b for the car given down corrective starting signals by the balancing device have been transferred to the down leg of the bridge as a result of the operation of relay DI and the dropping out of relay UI for that car as the car leaves the upper terminal or is definitely assigned down corrective starting signals in the selection zone, the bridge has been restored to balanced condition so that relay BA does not reoperate.

If an unbalance occurs but, before correction of the unbalance has been effected as set forth in any of the above assumed conditions, switch TM162 is closed, the timing mechanism takes over the signals. The operated balance signal relay is maintained operated, however, holding corrective signals in abeyance to be given to another car. Should there be further operations of the timing mechanism to give regular starting signals before a car is dispatched by a corrective signal, the operated balance signal relay is maintained operated until, in case relay UM is the one operated, a car at the lower terminal which has received the up corrective starting signals has its start control switch operated to start the car or, in case relay DM is the one operated, either a car at the upper terminal which has received the down corrective starting signals leaves or a car is definitely assigned down corrective starting signals in the selection zone. Should switch TM162 already have been closed but the timed signal self-holding switch for one direction operated in response thereto not yet be reset at the time that the balance signal relay for that direction is operated, the effect of the balance signal relay is held in abeyance.

That these operations may be better understood, assume in the previous examples where up balance signal relay UM was operated that switch TM162 is closed before the start control switch for the car at the lower terminal, which has received the up corrective starting signals given by relay UM, is operated to start the car. When switch TM162 closes, timed signal self-holding switches UD and DD are both operated. Switch UD engages contacts UD11 to by-pass contacts UM4 in the circuit for the up starting signals for the selected car. These signals now become timed up starting signals instead of corrective up starting signals. Switch UD also engages contacts UD1 to complete a circuit for the coil of up balance signal holding relay UMH. This relay upon operation separates contacts UMH2 in the circuit for the bucking coil of relay UM and engages contacts UMH3 to prepare a circuit for the holding coil of relay UMH. The engagement of contacts XT2 for the selected car, incident to the operation of the start control switch for the selected car to start the car upwardly, completes the circuit for the holding coil of relay UMH so that this relay remains operated upon the reset of switch UD in response to the engagement of these contacts XT2. The circuit for the holding coil of relay UMH is broken upon the dropping out of the up selective relay UL for that car as it leaves the lower terminal. Thus contacts UMH2 remain separated until this UL relay is deenergized, preventing the dropping out of relay UM. Therefore this relay remains operated to cause up corrective starting signals to be given to another car at the lower terminal. It is believed that it will be seen from the above that the prevention of the completion of the circuit for the bucking coil of relay UM is continued, regardless of the number of intervening cars sent off on up timed starting signals, until relay XT for a car to which up corrective starting signals have been given is operated, incident to the starting of the car away from the lower terminal, before another closing of switch TM162.

Assume that, instead of the unbalance occurring to cause operation of relay UM before the closing of switch TM162, it occurs afterwards but before the operation of the start control switch for a car at the lower terminal to which up timed starting signals initiated by the closing of switch TM162 have been given. Such unbalance may occur, for example, due to a car leaving the upper terminal ahead of a car at that terminal which has received the down timed starting signals. Under these conditions, relay UM operates and becomes self-holding but can not have any effect on a car at the lower terminal until after the start control switch in a car at that terminal which has received up timed starting signals has been operated to start the car in the up direction and thus effect the reset of up timed signal self-holding switch UD. As above, relay UM is maintained operated until relay XT for a car at the lower terminal to which the up corrective starting signals have been given is operated, incident to the starting of the car away from the lower terminal, before another closing of switch TM162.

Thus it is seen that with the system set for an even number of cars in service and for approximately equal up and down traffic, regardless of the conditions under which the unbalance occurs to cause operation of relay UM, the dispatching of a car from the lower terminal by up corrective starting signals to restore the system to balanced condition is assured.

Assume in the previous example where down balance signal relay DM was operated to give down corrective starting signals to a car at the upper terminal that switch TM162 is closed before the car to which the starting signals have been given leaves the upper terminal. When switch TM162 closes, switches UD and DD are both operated. Switch DD engages contacts DD2 to take over the circuit for the coil of relay RR. Thus the down starting signals for the selected car, the circuit for which is completed through contacts RR3, now become down timed starting signals instead of down corrective starting signals. Switch DD also engages contacts DD1 to complete a circuit for the coil of down balance signal holding relay DMH. This relay upon operation separates contacts DMH2 in the circuit for the bucking coil of relay DM and engages contacts DMH3 to prepare a circuit for the holding coil of relay DMH. Upon operation of the start control switch for the selected car to start the car downwardly, the resultant engagement of contacts E2 for that car completes the circuit for the holding coil of relay DMH so that this relay remains operated upon the reset of switch DD in response to the engagement of these contacts E2. The separation of contacts DD2 when switch DD is reset breaks the circuit for the coil of relay RR as contacts DMH1 are separated. The circuit for the holding coil of relay DMH is broken upon the dropping out of down selective relay DL for that car as it leaves the upper terminal. Thus contacts DMH2 remain separated until this DL relay is deenergized, preventing the dropping out of relay DM. Therefore this relay remains operated to cause reoperation of relay RR and thus down corrective starting signals to be given to another car.

If an unbalance occurs to cause the operation of relay DM under conditions where there is no car at the upper terminal to receive the down corrective starting signals and switch TM162 closes before down corrective starting signals are assigned to a car in the selection zone, switch DD takes over the circuit for the coil of relay RR as before to cause either down timed starting signals to be given a car which arrives at the upper terminal or to cause a selected car in the selection zone which has reached its highest call to be slowed down and stopped at a floor and to be given the down timed starting signals as it comes to a stop. In either event, relay DMH prevents the dropping out of relay DM which remains effective to cause down corrective starting signals to be given to another car.

Assume that, instead of the unbalance occurring to cause operation of relay DM before the operation of switch DD by the closing of switch TM162, it occurs afterwards but before the reset of switch DD. Such unbalance may occur, for example, due to a car leaving the lower terminal ahead of the car at that terminal which has received the up starting signals. Under these conditions, relay DM operates and becomes self-holding but can not exercise any corrective effect until either a selected car at the upper terminal which has been given the down timed starting signals has left that terminal or until after a selected car in the selection zone has reached its highest call and has operated its XH relay. As above, relay DM is maintained operated to cause down corrective starting signals to be given to another car.

Thus it is seen that, with the system set for an even number of cars in service and for approximately equal up and down traffic, regardless of the conditions under which the unbalance occurs to cause operation of relay DM, the dispatching of a car either from the upper terminal or from a floor in the selection zone by down corrective starting signals to restore the system to balanced condition is assured.

The balance signal relays UM and DM are delayed in operating to prevent the setting up of corrective signals should there be a momentary operation of relay BA without actual car unbalance, as due to differences in timing involved in the operation of switches or switching sequences not taken care of by balance cut-out relays UBC and DBC. This delay, in the case of relay UM, is effected by resistances R25 and R26 and condenser CO11 and, in the case of relay DM, is effected by resistances R27 and R28 and condenser CO12.

While in the examples of operation so far given under conditions of approximately equal up and down traffic with an even number of cars in service, the number of elevators in service was assumed to be four, similar operation is had with other even numbers, say six, eight, etc., of cars in service. It is believed that this will be understood from previous description without further discussion.

Assume now that an odd number of cars are in service under conditions of approximately equal up and down traffic. With traffic switch TD in position B and number of elevators switch NE in a position for the odd number of cars in service, relay AB is not operated regardless of the odd number of cars in service. Thus, contacts AB8 are separated so that the bridge circuit is controlled instead through contacts of switches UD and DD and next signal indicating relays UNS and DNS. Also contacts AB6 and AB7 are separated rendering resistances R31c and R31d ineffective to control relay BA. Also contacts AB5 are engaged in the circuit for the coils of relays UNS and DNS.

As regards the relationship of the cars to the starting signals with an odd number of cars in service, since the starting signals are given alternately there will be an apparent unbalance of cars either on the up trip or the down trip, i. e., more cars in one direction than the other. Yet this is actually a balanced condition for the cars are responding to their starting signals in the intended manner as has been previously described. To prevent the false registration of an unbalanced condition on the bridge and thus the false operation of balancing relay BA under such apparent unbalanced conditions, the bridge is balanced by the control exercised on resistances R31a and R31b by switches UD and DD and relays UNS and DNS.

For a better understanding of these operations, assume that three cars, namely, Nos. 1, 2 and 3, are in service, that car No. 3 is travelling down and car No. 2 is travelling up and that car No. 1 has arrived at the lower terminal and has received its up starting signals. As the starting signals are given alternately, only switch TM162 has closed to cause the operation of switch UD under the assumed conditions. Switch UD separates contacts UD7 transferring resistance R31a to the up leg of the bridge, paralleling resistance R31b. Due to the direction of travel of cars Nos. 2 and 3, resistances R32a(2) and R32b(2) are connected in the up leg of the bridge and resistances R32a(3) and R32b(3) are connected in the down leg of the bridge. As car No. 1 is still a down car for the purpose of operation of the balancing device, resistances R32a(1) and R32b(1) are connected in the down leg of the bridge. Inasmuch as car No. 4 is out of service its direction indicating relays DI(4) and UI(4) are deenergized at switch ICO(4) so that resistance R32a(4) is connected in the down leg of the bridge and R32b(4) is connected in the up leg of the bridge. Thus under the assumed conditions there are five resistances, namely, R32a(1), R32b(1), R32a(3), R32b(3) and R32a(4) connected in the down leg of the bridge and five resistances, namely, R31a, R31b, R32a(2), R32b(2) and R32b(4) connected in the up leg of the bridge. This is a balanced condition so that relay BA is not operated. The circuit for the coil of relay BA under these conditions extends on the right of the bridge through contacts ABS1, UD4 and DD6.

Switch UD, upon operation, also engages contacts UD3 which completes a circuit for the coil of down next signal indicating relay DNS through contacts DD6. Relay DNS upon operation engages contacts DNS2 to establish a self-holding circuit. It also engages contacts DNS3 to by-pass contacts UD4. Incident to the starting of car No. 1 from the lower terminal resistances R32a(1) and R32b(1) are transferred to the up leg of the bridge. However, switch UD is reset at the same time separating contacts UD9 and engaging contacts UD8 which, owing to the fact that contacts DNS4 are now separated and contacts DNS5 are now engaged, transfers resistance R31b to the down leg of the bridge. Also, resistance R31a is transferred to the down leg of the bridge by the separation of contacts UD6 and engagement of contacts UD7. Thus the bridge remains balanced and relay BA is not operated, the circuit for its coil being maintained through contacts DNS3 after contacts UD4 separate.

This transfer of resistances R31a and R31b from the up leg to the down leg of the bridge may be regarded as in anticipation of the next starting signals to be given being down starting signals. Were it not for the control obtained by relay DNS, resistance R31b would be left in the up leg of the bridge, throwing the resistances out of balance.

Upon the closing of switch TM163 to cause the operation of switch DD, contacts DD4 engage to complete the circuit for the coil of up next signal indicating relay UNS. This relay operates to separate contacts UNS2 breaking the holding circuit for the coil of down next signal indicating relay DNS which drops out. Relay UNS also engages contacts UNS1 to establish a self-holding circuit upon the reengagement of contacts DNS1. It also engages contacts UNS4 to by-pass in the circuit for the coil of relay BA contacts DD5, just engaged, and DNS3 which drop out. No transfer of resistances R31 is effected at this time as contacts DD7 by-pass contacts UNS5 to maintain resistances R31a connected in the down leg of the bridge and as contacts DD10 by-pass contacts UD8 and DNS5 to maintain resistance R31b connected in the down leg of the bridge. Assuming that car No. 2 arrives at the upper terminal and is selected to receive down starting signals, upon this car starting down switch DD is reset at the same time that relays UI(2) and DI(2) transfer resistances R32a(2) and R32b(2) from the up leg to the down leg of the bridge. The reset of switch DD, owing to the fact that contacts UNS3 are engaged and contacts UNS5 are separated, causes through the separation of contacts DD7 and the reengagement of contacts DD8 the transfer of resistance R31a from the down leg to the up leg of the bridge and, owing to the fact that contacts DNS4 are engaged and contacts DNS5 are separated, causes through the engagement of contacts DD9 and the separation of contacts DD10 the transfer of resistance R31b from the down leg to the up leg of the bridge. Thus the bridge remains balanced and relay BA is not operated, the circuit for its coil being maintained through contacts UNS4 after the separation of contacts DD5. This transfer of resistances R31a and R31b from the down leg to the up leg of the bridge may be regarded as in anticipation of the next starting signals to be given being up starting signals. Were it not for the control obtained by relay UNS, resistance R31a would be left across the down leg of the bridge, throwing the resistances out of balance.

Continuing with car No. 2 as an example, this car may be selected to receive the down starting signals at a floor in the selection zone instead of the upper terminal. The definite assignment of signals to this car can not be made unless switch TM163 is closed to cause the operation of switch DD and thus the operation of relay UNS and the dropping out of relay DNS, but no transfer of resistances is effected as a result of these operations as above explained. When this assignment is made switch SR(2) operates to cause the operation of relay DI(2) and the dropping out of relay UI(2) and at the same time relay XH(2) operates to cause the reset of switch DD. Thus resistances R32a and R32b are transferred to the down leg of the bridge and resistances R31a and R31b are transferred to the up leg of the bridge at the same time. Thus the bridge remains balanced and, upon the reengagement of contacts DBC1, relay BA is not operated.

Should the cars get out of balance for any reason relay BA operates to correct the unbalance. Assume that car No. 2 leaves the upper terminal before receipt of its starting signals, which places the cars out of balance. Regardless of whether or not switch TM163 has operated to cause the operation of switch DD, the resistances are balanced at the instant before the car leaves as above explained. Inasmuch as switch DD, if operated, is not reset by car No. 2 leaving since the car has not received starting signals, there can be no transfer of resistances R31 which remain connected in the down leg of the bridge. However, relay DI(2) is operated and relay UI(2) is dropped out as the car leaves causing resistances R32a(2) and R32b(2) to be transferred from the up leg to the down leg of the bridge. This places four more resistances in the down leg of the bridge than in the up leg of the bridge so that relay BA is operated to cause the operation of up balance signal relay UM. Relay UM operates as previously described to cause the immediate giving of up corrective starting signals to the selected car at the lower terminal or, if no car is there, to a car as soon as it arrives at the lower terminal. As soon as a car has been dispatched from the lower terminal by corrective starting signals, the car balance is restored and resistances R32a and R32b for this car are transferred to the up leg of the bridge, restoring the balancing resistances to balanced condition. Also relays UM and ABS are dropped out, there being no operation of relay BA as a result of the reengagement of contacts ABS1 as the bridge is balanced.

Assume that car No. 1 leaves the lower terminal before receipt of its starting signals, placing the cars out of balance. It is believed that it will be understood from the above description that this places four more resistances in the up leg of the bridge than in the down leg of the bridge so that relay BA is operated to cause the operation of down balance signal relay DM. Relay DM acts as previously described through relay RR to cause the immediate giving of down corrective signals to the selected car at the upper terminal or, if no car is there, either to cause the immediate giving of down corrective starting signals to a car as soon as it arrives at the upper terminal or to cause a car selected in the selection zone which has reached its highest call to be brought to a stop at a floor and down corrective starting signals to be given as it comes to a stop. As soon as a car has been dispatched from the upper terminal by corrective starting signals or has been definitely assigned corrective starting signals in the selection zone, the car balance is restored and resistances R32a and R32b for this car are transferred to the down leg of the bridge, restoring the balancing resistances to balanced condition. Also relays DM and ABS are dropped out, there being no resultant operation of relay BA owing to the fact that the bridge is balanced.

The corrective starting signals and timed starting signals may overlap in which event the corrective signals are held in abeyance in a manner similar to that described under the assumption of an even number of cars in service. Assume that the unbalance is such that up balance signal relay UM is operated. Should switch TM162 be closed at this time or, if not, should it be closed before the start control switch for a car at the lower terminal which has received the up corrective starting signals is operated to start the car, the dropping out of relay UM is prevented by relay UMH as previously described. Therefore, relay UM remains operated to cause up corrective starting signals to be given to another car at the lower terminal. Assume now that the unbalance is such that down balance signal relay DM is operated. Should switch TM163 be closed at this time or, if not, should it be closed before a car at the upper terminal which has received the down corrective starting signals leaves or, in the event no car is there, should it be closed before a car is definitely assigned down corrective starting signals in the selection zone, the dropping out of relay DM is prevented by relay DMH as previously described. Therefore, relay DM remains operated to cause down corrective starting signals to be given to another car.

Thus it is seen that, with the system set for an odd number of cars in service and for approximately equal up and down traffic, regardless of the conditions under which an unbalance occurs, the balancing device acts to correct this unbalance. While in the examples of operation so far given under conditions of approximately equal up and down traffic with an odd number of cars in service, the number of elevators in service was assumed to be three, similar operation is had with other odd numbers, say five, seven, etc., of cars in service. It is believed that this will be understood from previous description without further discussion.

In changing over, under conditions of approximately equal up and down traffic, from an even to an odd number of cars in service or from an odd to an even number, switch NE and the individual cut-out switch involved may be operated at such time as to cause an unbalance. In such case the balancing device acts as previously described to correct the unbalance. For example, assume that car No. 4 is out of service at the lower terminal, that car No. 3 is on down motion and car No. 1 and car No. 2 on up motion and that switch DD is operated. Under such conditions, resistances R32a(1), R32b(1), R32a(2), R32b(2) and R32b(4) are connected in the up leg of the bridge and resistances R31a, R31b, R32a(3), R32b(3) and R32a(4) are connected in the down leg of the bridge. Assume further that under such conditions switch ICO(4) is closed to put car No. 4 back in service and switch NE is moved from position 3 to position 4. This is an unbalanced condition for, as switch DD is operated, there is still to be a car dispatched by down starting signals which will place three cars on down motion and one on up motion. The closure of switch ICO(4) causes operation of relay DI(4) to transfer resistance R32b(4) to the down leg of the bridge. The operation of relay AB as a result of movement of switch NE to position 4 connects resistances R31c and R31d in parallel with resistances R31a and R31b in the down leg of the bridge. Thus a total of four resistances, namely, R32a(1), R32b(1), R32a(2) and R32b(2) are connected in the up leg of the bridge and a total of eight resistances, namely, R31a, R31b, R31c, R31d, R32a(3), R32b(3), R32a(4) and R32b(4) are connected in the down leg of the bridge. This unbalance causes operation of relay BA and in turn relay UM to give up corrective starting signals to dispatch a car from the lower terminal to correct the unbalance.

When changing over from an even to an odd number of cars in service, the change-over may be effected at such time that one of the next signal indicating relays should be operated to balance the resistances yet it can not function at that time. To prevent the operation of relay BA under conditions of such apparent unbalance, the balancing circuit is disconnected from its supply lines. For example, assume that car No. 4 is taken out of service at the lower terminal at a time when car No. 1 and car No. 3 are on up motion and car No. 2 is on down motion and switches UD and DD are both reset. This results in resistance R31a being connected in the down leg of the bridge and resistance R31b in the up leg, with resistances R31c and R31d disconnected. As resistances R32a(1), R32b(1), R32a(3), R32b(3) and R32b(4) are connected in the up leg of the bridge and resistances R32a(2), R32b(2) and R32a(4) are connected in the down leg of the bridge, the bridge is out of balance. However, as it has been assumed that both of switches UD and DD are reset and as neither of relays UNS and DNS is operated when such change-over is effected, contacts UD4, DD5, UNS4, DNS3 and AB8 are all separated, disconnecting the bridge circuit. Should switch DD be the next to operate, there is no car unbalance and resistance R31b is transferred to the down leg of the bridge placing the resistances in balance. Thus there is no operation of a balance signal relay when the circuit for the coil of relay BA is reestablished by the engagement of contacts DD5 and also contacts UNS4. Instead, should switch UD be the next to operate, it would mean that still another car is to be placed on up motion by timed starting signals. This would be an actual unbalance and this unbalance is registered on the bridge by this transfer of resistance R31a to the up leg of the bridge by the operation of switch UD. Thus upon the reestablishment of the circuit for the coil of relay BA by the engagement of contacts UD4, this relay operates to cause operation of relay DM to effect dispatching of a car by down corrective starting signals to restore the balance.

A similar operation is had should in the above example both switches UD and DD be operated at the time the changeover is effected. Under such conditions resistance R31a is connected in the up leg of the bridge and resistance R31b is connected in the down leg. Thus, resistances R32a(1), R32b(1), R32a(3), R32b(3), R32b(4) and R31a are connected in the up leg and resistances R32a(2), R32b(2), R32a(4) and R31b are connected in the down leg so that the bridge is out of balance. However, as contacts UD5, DD6 and AB8 are separated, the bridge circuit is disconnected. Should switch DD be reset first, there is no car unbalance and resistance R31b is transferred to the up leg of the bridge and, say car No. 1 has responded to the down signals, resistances R32a(1) and R32b(1) are transferred to the down leg, placing the resistances in balance. Thus there is no operation of relay BA upon the engagement of contacts DD6. However, should switch UD be reset first, there is a car unbalance and resistance R31a is transferred to the down leg of the bridge and, as car No. 2 is the one responding to the up signals, resistances R32a(2) and R32b(2) are transferred to the up leg of the bridge and the bridge is not balanced. Thus upon the engagement of contacts UD5, relay BA is operated to effect the dispatching of a car by down corrective starting signals to restore the balance.

It is believed it will be seen from the above description that with the system set for operation under approximately equal up and down traffic conditions and with either an even or an odd number of cars in service, the balancing device acts automatically to correct any condition of unbalance that should arise. Also, the system acts to prevent a false operation of the balancing device under conditions of apparent unbalance.

Referring now to conditions of up and down traffic with traffic in one direction predominant, assume first with an even number, say four, of cars in service that traffic is predominant in the up direction. For this condition, traffic distributor switch TD is set in position U and number of elevators switch NE is set in position 4. For convenience of description, assume that switch NE was already in position 4 and that, at the time switch TD is moved from position B to position U, car No. 2 and car No. 4 are on up motion and car No. 1 and car No. 3 are on down motion, that both of switches UD and DD are reset, and that switch TM162 is the next to close. Thus at the instant before switch TD is moved to position U, the cars are balanced for conditions of approximately equal up and down traffic. This balance is registered on the bridge by having six resistances, namely, R32a(2), R32b(2), R32a(4), R32b(4), R31b and R31d connected in the up leg of the bridge and six resistances, namely, R32a(3), R32b(3), R32a(1), R32b(1), R31a and R31b connected in the down leg of the bridge. When switch TD is moved to position U it completes the circuit for the coil of up traffic preference relay UTP. This relay upon operation engages contacts UTP1 to reestablish the circuit for the coil of relay UDT causing this relay and thus also switches UT and DT to reoperate. Relay UTP also separates contacts UTP2 to break the circuit for the coil of relay AB. It also engages contacts UTP4 to connect resistances R30a and R30c in the down leg of the bridge. At the same time relay AB drops out to separate contacts AB6 and AB7 which disconnect resistances R31c and R31d from the legs of the bridge but, as this does not balance the addition of resistances R30a and R30c to the down leg of the bridge, the bridge is unbalanced. However, as the next starting signals will be up signals, there is no actual car unbalance. The operation of relay BA is therefore prevented, relay AB separating contacts AB8 to disconnect the balancing circuits from their supply lines. Upon the closing of switch TM162, switch UD operates to transfer resistance R31a to the up leg of the bridge. Thus resistances R30a and R30c are balanced by resistances R31a and R31b, balancing the bridge and preventing the giving of any corrective signals upon the reestablishment of the circuit for the coil of relay BA by the engagement of contacts UD4.

The operation of switch UD causes up starting signals to be given to a car at the lower terminal. Assume that these signals are given to car No. 3. As this car is started from the lower terminal, resistances R32a(3) and R32b(3) are transferred to the up leg of the bridge and at the same time resistances R31a and R31b are transferred to the down leg of the bridge as a result of relay DNS having been operated due to the engagement of contacts UD3, maintaining the bridge balanced.

With this set-up each car is allowed two and a half times the time interval between cars to make an up trip and one and a half times the time interval between cars to make a down trip. Starting with the up timed starting signals which have just been given car No. 3, the next timed starting signals will be down signals and will be given a half time interval later. It will be assumed that these signals are given to car No. 2.

The next timed starting signals to be given will be up signals and will be given another half time interval later. It will be assumed that these signals are given to car No. 1. The next timed starting signals will be down signals and will be given another half time interval later. It will be assumed that these signals are given to car No. 4. The next timed starting signals will be up signals and will be given another half time interval later. It will be assumed that these signals are given to car No. 2. The next timed starting signals will be down signals and will be given another half time interval later. Assuming no passing of cars, these signals will be given to car No. 3. Thus the down starting signals are given car No. 3 two and a half intervals after the giving of up starting signals to this car Also, the up starting signals are given car No. 2 one and a half intervals after the giving of down starting signals to this car. In other words, in effect two and a half cars are placed on up motion and one and a half cars are placed on down motion. This is obtained by having, after the dispatch of a car by an up signal, three cars on up motion and one car on down motion with the next signal a down signal and, after the dispatch of a car by a down signal, two cars on up motion and two cars on down motion, with the next signal and up signal.

Were switch TM163 first to close after movement of switch TD to position U in the example immediately preceding, switch DD would operate to give down starting signals to a car, say at the upper terminal, with the result that there would in effect be two and a half cars assigned to down motion and one and a half cars to up motion. Thus the cars would not be in balance for the particular operating conditions for which it is set. However, switch DD transfers resistance R31b to the down leg of the bridge with the result that there are four resistances, namely, R30a, R30c, R31a and R31b across the down leg of the bridge which are not balanced. Therefore, with the completion of the circuit for the coil of relay BA by the engagement of contacts DD5, this relay operates to cause the operation of relay UM to give up corrective starting signals to a car at the lower terminal. When a car is dispatched by these signals, there will be one and a half cars assigned to down motion and two and a half cars to up motion, balancing the cars, also the resistances R32 for this car are transferred to the up leg of the bridge without any corresponding transfer of any of the R31 resistances with the result that the bridge is again balanced.

Assume now with still an even number, say four, of cars in service that under up and down traffic conditions traffic is predominant in the down direction. For this condition, traffic distributor switch TD is set in position D. Assume that switch TD is moved from position B to position D at a time when two cars are on down motion, one car is on up motion, one car is at the lower terminal and switch UD is operated. Thus at the instant before switch TD is moved to position D the cars are balanced for approximately equal up and down traffic. This balance is registered on the bridge by having six R32 resistances connected in the down leg of the bridge and six resistances, two of which are R32 resistances and four of which are R31 resistances, connected in the up leg of the bridge. Assume further that when switch TD is moved to position D that switch TM163 will be the next to close to initiate down starting signals. This will cause more cars to be assigned to down motion than to up motion. When switch TD is moved to position D, it completes the circuit for the coil if down traffic preference relay DTP. This relay engages contacts DTP1 causing reoperation of relay UDT and switches UT and DT. It also engages contacts DTP4 to connect resistances R30b and R30d in the up leg of the bridge. It also separates contacts DTP2 to deenergize relay AB with the result contacts AB6 and AB7 separate to disconnect resistances R31c and R31d from the up leg of the bridge so that the bridge remains balanced. The engagement of contacts AB5 completes the circuit for the coil of relay DNS, causing this relay to operate to register the fact that the next starting signals to be initiated will be down signals. Assuming that the car at the lower terminal has received the up starting signals initiated upon the previous operation of switch UD, as it leaves this terminal its R32 resistances are transferred to the up leg of the bridge at the same time resistances R31a and R31b are transferred to the down leg of the bridge as a result of the operation of relay DNS, causing the bridge to remain balanced. Upon the closing of switch TM163 to cause the operation of switch DD resistances R31a and R31b are maintained connected in the down leg of the bridge, maintaining the bridge balanced. Upon a car being dispatched say from the upper terminal by down starting signals as a result of the operation of switch DD, one more car is placed on down motion than on up motion.

With this set-up each car is allowed two and a half times the time interval to make a down trip and one and a half times the time interval to make an up trip or, in other words, two and a half cars are placed on down motion and one and a half cars are placed on up motion. It is believed that this will be understood without detailed description, especially in view of the description given in connection with movement of the traffic distributor switch to position U.

Had, in the previous example, there been two cars on down motion and two cars on up motion so that both of switches UD and DD were reset at the time switch TD is moved to position D, resistances R30b and R30d added to the up leg of the bridge are not immediately balanced. However, as the next starting signals will be down signals, there is no actual car unbalance. The operation of relay BA is therefore prevented, relay AB disconnecting the balancing circuits from their supply lines. This connection is not reestablished until switch DD operates to transfer resistance R31b to the down leg of the bridge, balancing the bridge. Were switch TM162 first to close after movement of switch TD to position D, in the above example, switch UD would operate to give up starting signals to a car at the lower terminal, putting the cars out of balance for the particular operating conditions for which it is set. However, switch UD causes an unbalance of the balancing resistances to effect the operation of relay BA and in turn relay DM to give corrective starting signals to dispatch a car, say from the upper terminal, counteracting dispatching a car away from the lower terminal in response to the operation of switch UD. This places the cars in balance.

Assume now under conditions of up and down traffic with an odd number, say five, of cars in service and with the cars balanced that traffic becomes predominant in the up direction. For this condition, switch TD is set in position U and switch NE is set in position 5. Assume further that switch NE was already in position 5 and that, at the time switch TD is moved from position B to position U, car No. 1, car No. 2 and car No. 3 are on up motion and car No. 4 and car No. 5 are on down motion. Under this assumption, relay DNS is operated so that the resistances are in balance at the instant before this movement of switch TD takes place. Upon movement of switch TD to position U, resistances R30a and R30c are connected in the down leg of the bridge and relay AB is operated connecting resistances R31c and R31d in parallel with resistances R31a and R31b respectively. Also, relay DNS is dropped out by the separation of contacts AB5 causing the four R31 resistances to balance each other. Thus, resistances R30a and R30c balance the R32 resistances of one of the cars on up motion. The bridge therefore remains balanced. Relay DNS is dropped out because relay UTP upon operation engages contacts UTP3 which with switch NE in position 5 causes operation of relay AB. Relay AB in turn separates contacts AB5 to deenergize relay DNS. Furthermore, due to the separation of contacts AB2 and engagement of contacts AB1 the signals are initiated simultaneously by the closing of switch TM162. As the up and down starting signals are initiated simultaneously, the R31 resistances balance each other to maintain the bridge balance and the cars are maintained in the number-trip relationship previously assumed, that is, three on up motion and two on down motion. Thus, each car is allowed three intervals for an up trip and two intervals for a down trip.

Assume now that instead of there being three cars on up motion and two cars on down motion at the time switch TD is moved to position U, there are three cars on down motion and two cars on up motion. Under this assumption, relay UNS is operated so that the resistances are in balance at the instant before this movement of switch TD takes place. Upon movement of switch TD to position U, resistances R30a and R30c are connected in the down leg of the bridge and relay AB is operated connecting resistances R31c and R31d in parallel with resistances R31a and R31b respectively. Also relay UNS is dropped out by the separation of contacts AB5 causing the four R31 resistances to balance each other. Thus there are four resistances, namely, resistances R30a and R30c and resistances R32a and R32b for one of the cars on down motion connected in the down leg of the bridge which are not balanced. Thus relay BA is operated and in turn relay UM is operated to cause the giving of up corrective starting signals to dispatch a car from the lower terminal. This balances the cars, placing three cars on up motion and two cars on down motion and balances the resistances.

The operation is similar under conditions of up and down traffic with an odd number, say five, of cars in service when with the cars in balance the traffic becomes predominant in the down direction. For this condition, traffic distributor switch TD is set in position D. Assume that switch TD is moved from position B to position D at a time when there are three cars on down motion and two cars on up motion. Under this assumption relay UNS is operated so that the resistances are in balance at the instant before this movement of switch TD takes place. Upon movement of switch TD to position D, resistances R30b and R30d are connected in the up leg of the bridge, resistances R31c and R31d are connected back in circuit by relay AB as a result of the engagement of contacts DTP3 and relay UNS is dropped out causing the R31 resistances to balance each other. Under these conditions resistances R30b and R30d balance the R32 resistances for one of the cars on down motion. The bridge therefore remains balanced. As the up and down signals are initiated simultaneously, the R31 resistances balance each other and the cars are maintained in the number-strip relationship previously assumed, that is, three on down motion and two on up motion. Thus, each car is allowed three intervals for a down trip and two intervals for an up trip.

Assume now that instead of there being three cars on down motion and two cars on up motion at the time switch TD is moved to position D, there are three cars on up motion and two cars on down motion. Under this assumption relay DNS is operated so that the resistances are in balance at the instant before this movement of switch TD takes place. Upon movement of switch TD to position D, resistances R30b and R30d are connected in the up leg of the bridge, resistances R31c and R31d are connected back in circuit and relay DNS is dropped out causing the R31 resistances to balance each other. Thus, there are four resistances, namely, resistances R30b and R30d and resistances R32a and R32b for one of the cars on up motion connected in the up leg of the bridge which are not balanced. This causes operation of relay BA and in turn operation of relay DM to cause the giving of down corrective starting signals to dispatch a car, say from the upper terminal. This places three cars on down motion and two cars on up motion, balancing the cars and balancing the resistances.

Thus it is seen that with the traffic distributor switch in position U, one more interval is allotted to the up trip than to the down trip and more cars are placed on the up trip than on the down trip. With the traffic distributor switch in position D, one more interval is allotted to the down trip than to the up trip and more cars are placed on the down trip than on the up trip. In either case, if an even number of cars are in service, the starting signals are initiated alternately and, if an odd number of cars are in service, the starting signals are initiated simultaneously. If with an even number of cars in service the traffic distributor switch is moved from position B to position U under conditions where the next starting signals to be initiated will be up signals the desired assignment of cars to up and down trips is had without corrective operation by the balancing device. However, if this operation should take place at a time when the next starting signals to be initiated are down starting signals which would place more cars on a down trip than on an up trip the balancing device operates to dispatch a car in the up direction to place the cars in balance. Similarly, if with an even number of cars in service the traffic distributor switch is moved from position B to position D under conditions where the next starting signals to be initiated will be down starting signals the desired assignment of cars to up and down trips is had without corrective operation by the balancing device. However, if this operation should take place at a time when the next starting signals to be initiated are up starting signals which would place more cars on an up trip than on a down trip the balancing device operates to dispatch a car in the down direction to place the cars in balance. If with an odd number of cars in service the traffic distributor switch is moved from position B to position U under conditions where there is one more car on up motion than on down motion, the desired assignment of cars to up and down trips is had without corrective operation of the balancing device. However, if this operation should take place at a time when there is one more car on down motion than on up motion the balancing device operates to dispatch a car in the up direction to place the cars in balance. Similarly, if with an odd number of cars in service the traffic distributor switch is moved from position B to position D under conditions where there is one more car on down motion than on up motion the desired car assignment is had without corrective operation of the balancing device. However, if this operation should take place at a time when there is one more car on up motion than on down motion the balancing device operates to dispatch a car in the down direction to place the cars in balance.

It is believed that it will be seen from previous description without further explanation that with the traffic distributor switch TD in either position U or position D, should the cars get out of balance, the corresponding unbalance of the bridge circuit would be effected by the transfer of resistances indicative of the unbalance, causing the operation of relay BA and therefore of the proper balance single relay to correct the unbalance.

Also, it is believed that it will be seen without detailed explanation that, with the traffic distributor switch in either position U or position D, should a car be taken out of service or placed back in service and should switch NE and switch ICO for the particular elevator involved be operated at such time as to cause an unbalance of the cars, the balancing device operates to automatically correct the unbalance and thus place the cars on proper time distribution balance for the new condition of operation.

For example, assume that, with five cars in service and switch TD in position U, switch ICO for a car at the lower terminal is opened to take that car out of service and switch NE is moved from position 5 to position 4 at a time when three cars are on up motion and two cars are on down motion, switches UD and DD both being reset. At the instant before this change is made the two R30 resistances connected in the down leg of the bridge are balanced by the R32 resistances of one of the cars on up motion so that the bridge is balanced. When the change is effected the transfer of the R32b resistance for the car taken out of service from the down leg to the up leg of the bridge creates the unbalance of two resistances but the bridge circuit is now open. If switch UD is the next to operate, a car would be dispatched from the lower terminal before one is dispatched, say from the upper terminal, with the result that the cars would be distributed in effect three and a half cars on up motion and one half cars on down motion, placing them out of balance for the operating conditions assumed. Switch UD upon operation transfers resistance R31a to the up leg of the bridge creating an unbalance of four resistances across the up leg of the bridge. At the same time the bridge circuit is completed so that relay BA operates to cause the operation of relay DM to dispatch a car, say from the upper terminal, by corrective starting signals thereby placing in effect two and a half cars on up motion and one and a half cars on down motion, correcting the unbalance. If instead of switch UD, switch DD had been the next to operate, a car would be dispatched, say from the upper terminal, placing in effect two and a half cars on up motion and one and a half cars on down motion which is the proper distribution for the conditions assumed. Switch DD upon operation transfers resistance R31b to the down leg of the bridge with the result that the bridge is balanced so that no corrective operation takes place.

As another example, assume that, with four cars in service and switch TD in position D, switch ICO for a car at the lower terminal is closed to place that car in service and switch NE is moved from position 4 to position 5 at a time when three cars are on down motion and one car is on up motion. Under such conditions, switch DD has just been reset and relay UNS is operated. At the instant before this change is made the R32 resistances of two of the cars on down motion are balanced by two R30 resistances and two R31 resistances so that the bridge is balanced. When the change is effected, there will be four cars on down motion and one car on up motion whereas it is desired to have three cars on down motion and two cars on up motion. Thus the cars would be unbalanced. However, in effecting this change, relay UNS is dropped out so that the R31 resistances now balance each other and the R32b resistance for the car put back in service is transferred from the up leg to the down leg of the bridge, creating an unbalance of four resistances across the down leg of the bridge. Thus relay BA operates to cause operation of relay UM to dispatch a car from the lower terminal, thereby placing three cars on down motion and two cars on up motion correcting the unbalance. If, instead of there being three cars on down motion and one on up motion, there were two cars on down motion and two cars on up motion at the time the change was effected, relay DNS would be operated so that the resistances would be balanced at the instant before the change was made. When the change is made there will be three cars on down motion and two cars on up motion so that the cars are balanced. The bridge is also balanced as the R31 resistances balance themselves as before and the two R32 resistances in the down leg of the bridge resulting from placing another car in service at the lower terminal, are balanced by the two R30 resistances. Thus relay BA would not be operated.

When with the system operating under conditions of up and down traffic with traffic predominant in one direction, traffic reverts to approximately equal up and down, the traffic distributor switch is returned to position B. Should this take place at a time to cause the cars to be unbalanced, the balancing device acts automatically to correct this condition.

For example, assume an even number, say four, of cars in service with the traffic distributor switch in position U and that at the time this switch is moved to position B there are two cars on up motion and two cars on down motion and switch UD is operated. At the instant before switch TD is operated, resistances R30a and R30c are balanced by resistances R31a and R31b so that the bridge is balanced. As there will be a car dispatched in the up direction in response to up starting signals initiated when switch UD was operated, the cars will be unbalanced for approximately equal up and down traffic as the result of this operation of switch TD at this time. When switch TD is moved to position B, the two R30 resistances are disconnected and resistances R31c and R31d are connected in the up leg of the bridge. Thus the four R31 resistances connected in the up leg of the bridge are not balanced so that relay BA operates to cause operation of relay DM to dispatch a car, say from the upper terminal, to balance the cars. Should both switches UD and DD be reset at the time this change was effected the cars would not be thrown out of balance by the operation of switch TD so that no operation of the balancing device would take place. Should switch DD be the last operated before the change is effected, relay UNS would be operated so that at the instant before the change is effected the two R30 resistances would be balanced by resistances R31a and R31b. When the change is effected relay UNS is dropped out and resistances R31c and R31d are connected in circuit and the R31 resistances balance each other. Thus the bridge is balanced and remains so. It is believed that the operation of the system when switch TD is moved from position U to position B with an odd number of cars in service or from position D to position B with either an even number or an odd number of cars in service will be understood from previous description. If in any case an unbalance is created the balancing device acts automatically to place the cars in balance.

Should the traffic distributor switch be moved from position U to position D or vice versa and an unbalance result therefrom, the balancing device acts automatically to correct the unbalance. Assume that with four cars in service switch TD is moved from position D to position U at a time when three cars are on down motion and one car on up motion. At the instant before this change is effected this is a balanced condition and the R32 resistances for two of the cars on down motion are balanced by the two R30 resistances and the resistances R31a and R31b, relay UNS being operated. When this change is effected, the cars are unbalanced for the new operating conditions and resistances R30b and R30d are disconnected from the up leg of the bridge and resistances R30a and R30c are connected in the down leg of the bridge. Thus there are four resistances in the down leg of the bridge which are not balanced. The balancing device is operated therefore to cause a car to be dispatched from the lower terminal by corrective signals, placing the cars in balance, the next signals to be initiated being up starting signals. If the change is effected when there are two cars on down motion and two cars on up motion the bridge is balanced at the instant before the change is made as relay DNS is operated causing the two R30 resistances to be balanced by resistances R31a and R31b. When the change is effected the cars are thrown out of balance as the next signals are to be down starting signals. When the change is effected two R30 resistances are disconnected from the up leg of the bridge and two R30 resistances are connected in the down leg of the bridge. As the two R31 resistances remain connected in the down leg of the bridge, the bridge is unbalanced to cause the giving up of corrective starting signals to dispatch a car from the lower terminal thereby and place the cars in balance. It is believed that it will be seen from the above that the cars are placed in balance when, with an even number of cars in service, traffic distributor switch is moved from position U to position D and when, with an odd number of cars in service, the traffic distributor switch is moved from position U to position D or vice versa.

In view of the detailed description of operation given, it is believed that it will be seen that when switch TD is moved from either position A or position C to any one of positions B, U or D, the starting signals are given so as to dispatch the cars to automatically place them in the desired distribution for the particular position to which the switch is moved.

While in the examples of operation under up and down traffic conditions in which a predominance of traffic in one direction is involved, the number of elevators in service for the operation described were four and five, similar operation is had with other even numbers, say six, eight, etc., and other odd numbers, say seven, nine, etc., of cars in service. Position 3 of switch NE is preferably not connected to control relay AB but it may be arranged as for position 5, to be connected to the coil of relay AB through contacts UTP3 and DTP3.

Furthermore, while in the examples of operation to illustrate unbalanced conditions, the unbalances were not extreme, the balancing device acts to correct the unbalance regardless of how extreme the unbalance may be. For example, when all cars are at the down terminal at the time switch TD is moved to one of positions B, U or D, corrective starting signals are given until the cars are in balance for the particular position of switch TD and the number of elevators in service.

The resistances for connection across the up and down legs of the bridge are controlled in such way that substantially the same ratio of resistances is obtained for minimum unbalanced conditions. Assume, for example, an installation of eight cars. This means a total of sixteen R32 resistances, four R31 resistances for an even number of cars in service and two R31 resistances for an odd number of cars in service. Taking approximately equal up and down traffic with all eight cars in service, for example, this means a total of twenty resistances which, when the bridge is balanced, are connected ten in the up leg of the bridge and ten in the down leg of the bridge. In case of an unbalance, two resistances are taken from one leg of the bridge and connected in the other leg of the bridge which means a resistance ratio of twelve and eight. In case there are six cars in service the R32 resistances for the two cars out of service balance each other. Thus, when the cars are balanced the resistance ratio is ten and ten and when a minimum unbalance occurs the resistance ratio is as before twelve and eight. Similarly, with only four cars in service the resistance ratio is ten and ten for balanced conditions and twelve and eight for minimum unbalanced conditions. Similarly, with seven cars in service under conditions of approximately equal up and down traffic for balanced conditions the resistance ratio is nine and nine owing to the fact that resistances R31c and R31d are disconnected and in case of a minimum unbalance the resistance ratio is eleven and seven. It is believed that it will be seen from the above that these resistance ratios are had with five or three cars in service. Similarly, under up and down traffic conditions with traffic predominant in one direction with an even number of cars, that is four, six or eight, the two R30 resistances with resistances R31c and R31d disconnected make a resistance ratio of ten and ten for car balance and twelve and eight for minimum car unbalance. With an odd number of cars in service, i. e., five or seven, resistances R3Ic and R3Id are connected so that the resistance ratio is eleven and eleven with cars balanced and thirteen and nine with minimum car unbalance. This assures reliable operation of the balancing device.

The starter may manually dispatch a car from the lower terminal by pressing button USB. This causes operation of relay UM to give starting signals to a car at the lower terminal as previously described. The manual dispatching of a car by pressing button USB will cause an unbalance of cars when the manually dispatched car leaves. However, the balancing device acts automatically as previously described to dispatch a car on down signals, restoring the balance.

In case of some delay in responding to down starting signals, the starter may by intermittently pressing button DSB call this delay to the attention of the attendant of the car which has received the signals. This causes flashing of the down starting light.

Contacts UMH1 engaged as a result of the closing of timing motor switch TM162 complete a circuit for the coil of up signal lock out relay UMR. This relay engages contacts UMR1 to establish a self-holding circuit and separates contacts UMR2 to break the circuit for the operating coil of switch UD. This prevents reoperation of switch UD should the car which has received signals start before switch TM162 opens. Thus reoperation of switch UD can not take place until the timing mechanism has completed another cycle of operation.

For night service, traffic distributor switch TD is moved to position N. In this position switches UT and DT are deenergized so that contacts UT3 and DT3 are separated. This disconnects the dispatching circuits from the supply lines, shutting down the dispatching system.

By way of review, when traffic in each direction is approximately equal the up starting signals and down starting signals are initiated simultaneously for an even number of cars in service and alternately for an odd number of cars in service. This distributes the cars on an equal time basis throughout the building. When, with up and down traffic, traffic predominates in the up direction or in the down direction, the cars are distributed so that more of them are on the trip in the direction of predominant traffic than on the trip in the other direction. In this way the ratio of up cars to down cars may be varied to suit these different traffic conditions, balancing the cars against the traffic.

Should the system get out of balance under any of these conditions, the balancing device acts to give corrective signals to dispatch a car in a direction to restore the balance.

The dispatching system is arranged to enable it to be set for any of these particular up and down traffic conditions. When the system is changed from operation for any one of these traffic conditions to another, should an unbalance for the new traffic condition result, the balancing device acts automatically to place the cars in balance for the new condition. Also, when the number of elevators in service under any of these up and down traffic conditions is changed, should an unbalance result, the balancing device acts automatically to place the cars in balance for the new number of cars in service. Thus, no matter what the reason that an unbalance occurs, the balancing device acts automatically to correct the unbalance.

A car may be selected under certain conditions to receive down starting signals at a floor in an upper zone instead of at the upper terminal. The starting signals as well as the cars exercise control of the balancing device. When the starting signals are initiated simultaneously and a car being dispatched from the lower terminal leaves before a car being dispatched from the upper terminal leaves or, in the event a car has been selected to receive the down starting signals at a floor in the upper zone, before the signals are definitely assigned, or vice versa, the initiated signals for the car last to leave or to be so assigned signals serve to balance the initiated signals for the car first to leave or to be so assigned signals, thereby preventing corrective operation by the balancing device when there is in fact no unbalance. When the starting signals are initiated alternately, upon a car which has been given starting signals leaving or upon a car being definitely assigned down starting signals in the upper zone, the next signals to be initiated serve to balance this car, thereby preventing corrective operation by the balancing device when again there is in fact no unbalance. Thus the balancing device exerts its corrective action only when there is an actual unbalance of the cars for the particular traffic condition.

When the balancing device has been operated to initiate up corrective starting signals, should up timed starting signals have already been initiated or be initiated before a car is dispatched by the corrective signals, the corrective starting signals are held in abeyance. The up corrective starting signals are maintained until a car is dispatched by them to correct the unbalance. When the balancing device has been operated to initiate down corrective starting signals, should down timed starting signals have already been initiated or be initiated before a car is dispatched from the upper terminal by these signals or is definitely assigned the signals in the upper zone, the corrective starting signals are held in abeyance. The corrective signals are maintained either until a car is dispatched from the upper terminal by these signals or is definitely assigned them in the upper zone. Thus the action of the balancing device to correct an actual unbalance is assured.

Although the invention has been described as applied to an installation in which the cars may be set for downward travel at any one of a plurality of floors in a certain zone, it is applicable to installations in which such direction change may take place at any floor and to installations in which the cars are caused always to travel to the upper terminal. Likewise, various numbers of floors may be included in the selection zone. The invention may be applied to installations in which cars run express past certain floors. Also the invention is applicable to installations having no peak traffic in which event positions A and C of the traffic distributor switch TD and the circuits subject thereto could be omitted. The balancing arrangement is applicable to installations employing other modes of dispatching the cars such as those in which the cars are always dispatched in a certain order, usually in the order of cars Nos. 1, 2, 3, 4, etc. Certain features of the invention may be omitted for certain installations such as those relating to predominant traffic under up and down traffic conditions in which event position U and D of the traffic distributor switch and circuits controlled thereby could be omitted. It may be considered desirable for certain installations to provide a plurality of say two U positions and/or D positions for the traffic distributor switch in which case in each added position another half car would be taken from the number of cars for the lesser traffic and added to the number of those for the more predominant traffic. Also it may be desirable for certain installations, for conditions of traffic predominance to vary the interval between the initiating of up and down starting signals to vary the times allowed for up and down trips. In this way the ratio of cars for the direction of traffic predominance to those for the other direction may be varied. The distribution of the cars, the number of cars in service and the intervals between signals for the different traffic periods may be controlled automatically by the traffic clock if desired. Other forms of balancing arrangements may be employed.

The invention is applicable to installations in which no provision is made for special response to timed down hall calls. While a seven floor installation has been described, it is to be understood that the invention is applicable to other numbers of floors. Also the invention is applicable to installations of greater numbers of cars than the numbers mentioned. Other circuit arrangements and mechanisms for controlling the starting and stopping of the cars may be employed. Also the cars may be controlled in other ways, as for example, stopping may be controlled by car attendants with stops for intending passengers indicated by signals. Other forms of power supply may be employed.

In addition, it is contemplated that many of the features of the invention disclosed may be carried out in other ways and may be used in connection with apparatus and circuits different from those specifically described. Many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. A dispatching system for a plurality of elevator cars in which the cars are given starting signals by dispatching mechanism in such way as to balance the cars, characterized in that balancing means is provided which is responsive to an unbalance of the cars to cause an additional starting signal to be given to dispatch a car in a direction to restore the balance.

2. A dispatching system for a plurality of elevator cars in which the cars are given starting signals to dispatch them on up trips and starting signals to dispatch them on down trips and in which when there is traffic in both up and down directions such signals are initiated by dispatching mechanism at such times as to balance the cars against traffic, characterized in that the giving of said signals may also be initiated by a balancing device which is controlled by the ratio of up cars to down cars and by said dispatching mechanism.

3. A dispatching system for a plurality of elevator cars in which the cars are given starting signals to dispatch them on up trips and starting signals to dispatch them on down trips and in which when an even number of cars are in service and when the traffic in each direction is approximately equal such signals are initiated simultaneously by dispatching mechanism at regular intervals of time, characterized in that a balancing device is provided which is controlled by the ratio of up cars to down cars and by said dispatching mechanism for causing, when the number of cars for one direction exceeds the number of cars for the other direction under conditions where the number of cars for each direction will not be equalized by the dispatching of a car by a starting signal for said other direction initiated by said dispatching mechanism, a corrective starting signal to be given to dispatch a car in said other direction.

4. A dispatching system for a plurality of elevator cars in which the cars are given starting signals to dispatch them on up trips and starting signals to dispatch them on down trips and in which when an odd number of cars are in service and when the traffic in each direction is approximately equal such signals are initiated alternately by dispatching mechanism at regular intervals of time, characterized in that a balancing device is provided which is controlled by the ratio of up cars to down cars and by said dispatching mechanism for causing, when the number of cars for one direction exceeds the number of cars for the other direction under conditions where the number of cars for said other direction will not be caused to exceed those for said one direction by the dispatching of a car by a starting signal for said other direction initiated by said dispatching mechanism, a corrective starting signal to be given to dispatch a car in said other direction.

5. A dispatching system for a plurality of elevator cars in which the cars are given up starting signals to dispatch them on up trips and down starting signals to dispatch them on down trips and in which for conditions of approximately equal traffic in each direction such signals are initiated by dispatching mechanism to cause the ratio of up cars to down cars to be equal to thereby balance the cars against the traffic, characterized in that electromagnetic switching means is provided which is operable to cause corrective signals to be given said cars for restoring said balance when the cars get out of balance with respect to traffic conditions, and in that means is provided which is controlled by the ratio of up cars to down cars and by said dispatching mechanism for controlling the application of voltage to said switching means.

6. A dispatching system for a plurality of elevator cars comprising, starting signals for said cars, dispatching mechanism for initiating the giving of said signals to the cars at regular intervals of time, and a balancing device responsive to the distribution of the cars for causing when the cars are not balanced with respect to traffic conditions the giving of additional starting signals to correct the unbalance.

7. A dispatching system for a plurality of elevator cars in which the cars are given up starting signals to dispatch them on up trips and down starting signals to dispatch them on down trips and in which for conditions of approximately equal traffic in each direction such signals are initiated by dispatching mechanism to cause the ratio of up cars to down cars to be equal to thereby balance the cars against the traffic, characterized in that electromagnetic switching means is provided which is operable to cause signals to be given said cars to restore said balance when the cars get out of balance with respect to traffic conditions, in that a bridge circuit is provided which is controlled by the ratio of up cars to down cars and by said dispatching mechanism, and in that electroresponsive means is provided which is controlled by said bridge circuit for controlling the operation of said switching means.

8. A dispatching system for a plurality of elevator cars comprising, up starting signals for said cars, down starting signals for said cars, dispatching means for said cars operable with the cars distributed so as to be balanced with respect to traffic conditions to cause the up and down starting signals to be given to said cars to dispatch them so as to continue that distribution, a bridge circuit having two variable resistance legs, means controlled by the ratio of up cars to down cars and by said dispatching means for controlling said variable legs to unbalance the bridge when the cars get out of said distribution, and means responsive to an unbalance of the bridge to give a corrective starting signal to dispatch a car to restore the distribution.

9. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means operable under conditions of approximately equal up and down traffic with the cars distributed so that there are in effect the same number of up cars as down cars to cause said dispatching mechanism to initiate said up and down signals to dispatch the cars to continue that distribution, a bridge circuit, means responsive to the cars getting out of said distribution for unbalancing the bridge, and means responsive to an unbalance of said bridge for causing the giving of a starting signal for restoring the distribution.

10. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means operable under conditions of up and down traffic with traffic predominant in one direction and with the cars distributed to be more in the direction of traffic predominance than in the other to cause said dispatching mechanism to initiate said up and down signals to dispatch the cars to continue that distribution, a bridge circuit, means responsive to the cars getting out of said distribution for unbalancing the bridge, and means responsive to an unbalance of said bridge for causing the giving of a starting signal for restoring the distribution.

11. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means for causing said dispatching mechanism to initiate said up and down signals simultaneously or alternately, a bridge circuit having two variable legs, means controlled by the ratio of up cars to down cars and by the dispatching of said cars for controlling said variable legs to unbalance said bridge when the cars are not balanced with respect to traffic, and means responsive to an unbalance of said bridge for causing the giving of a starting signal for correcting the unbalance of the cars.

12. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means for causing said dispatching mechanism to initiate said up and down signals simultaneously or alternately, depending upon whether an even number or an odd number of cars are in service and upon traffic conditions, a bridge circuit having two variable legs, means for controlling said variable legs to unbalance said bridge when the cars are not balanced with respect to traffic, and means responsive to an unbalance of said bridge for giving a starting signal for correcting the unbalance of the cars.

13. A dispatching system for a plurality of elevator cars in which the cars are given up starting signals to dispatch them on up trips and down starting signals to dispatch them on down trips and in which for conditions of approximately equal traffic in each direction such signals are initiated by dispatching mechanism to cause the ratio of up cars to down cars to be equal to thereby balance the cars against the traffic, characterized in that switching means is provided for also causing said signals to be given said cars, in that a Wheatstone bridge circuit is provided having two fixed legs and two variable legs, in that electroresponsive means is provided which is connected in a circuit extending from the point of joinder of said fixed legs to the point of joinder of said variable legs for controlling the operation of said switching means, and in that means is provided which is controlled by the direction for which the cars are set and by said dispatching mechanism for controlling the potential drop across said variable legs to cause when the cars get out of balance with respect to traffic conditions operation of said electroresponsive means to cause operation of said switching means to give a starting signal for a direction to restore said balance.

14. A dispatching system for a plurality of elevator cars in which the cars are given up starting signals to dispatch them on up trips and down starting signals to dispatch them on down trips and in which for conditions of approximately equal traffic in each direction such signals are initiated by dispatching mechanism to cause the ratio of up cars to down cars to be equal to thereby balance the cars against the traffic, characterized in that switching means is provided for also causing said signals to be given said cars, in that a Wheatstone bridge circuit is provided, said bridge circuit having two fixed resistance legs of equal ohmic value and two variable resistance legs, said variable resistance legs being made up from a plurality of additional resistances each of the same ohmic value adapted for connection in either variable leg, in that electroresponsive means is provided which is connected in a circuit extending from the point of joinder of said fixed legs to the point of joinder of said variable legs for controlling the operation of said switching means, and in that means is provided which is controlled by whether the cars are respectively up cars or down cars and by said dispatching mechanism for determining the number of said additional resistances connected in each of said variable legs, said last named means acting when the cars get out of balance with respect to traffic conditions to cause that number more of said additional resistances to be connected in that one of said variable legs than in the other which will result in operation of said electroresponsive means to cause operation of said switching means to give a starting signal for a direction to restore said balance.

15. A dispatching system for a plurality of elevator cars in which the cars are given up starting signals to dispatch them on up trips and down starting signals to dispatch them on down trips and in which such signals are initiated by dispatching mechanism at such times as to balance the cars against the traffic, characterized in that a Wheatstone bridge circuit is provided, said bridge circuit having two fixed resistance legs of equal ohmic value and two variable resistance legs, said variable resistance legs being made up from a plurality of additional resistances of equal ohmic value adapted for connection across either variable leg, in that switching means is provided for each car for controlling the connection of certain of said additional resistances across said variable legs, in that additional switching mechanism is provided which is controlled by said dispatching mechanism for controlling the connection of certain of said additional resistances across said variable legs, in that a polarized relay is provided the coil of which is connected in a circuit extending from the point of joinder of said fixed legs to the point of joinder of said variable legs, said polarized relay operating in one direction when more of said additional resistances are connected across one of said variable legs than the other and in the other direction when more of said additional resistances are connected across said other of said variable legs than said one variable leg, and in that means is provided which is controlled by said polarized relay for also causing the giving of said starting signals.

16. A dispatching system for a plurality of elevator cars in which the cars are given up starting signals to dispatch them on up trips and down starting signals to dispatch them on down trips and in which when an even number of cars are in service and when traffic in each direction is approximately equal such signals are initiated simultaneously by dispatching mechanism at regular intervals of time so that with the cars distributed to provide the same number of up cars as down cars they will be dispatched by said dispatching mechanism to continue that distribution, characterized in that a Wheatstone bridge circuit is provided, said bridge circuit having two fixed resistance legs of equal ohmic value and two variable resistance legs, in that means is provided for controlling the ohmic values of said variable resistance legs to cause them to equal each other when there are the same number of up cars as down cars but to be unequal when there are more cars for one direction than the other under conditions where the number of cars for each direction will not be equalized by the dispatching of a car by a starting signal for the other direction initiated by said dispatching mechanism, in that switching means is provided for also causing the giving of said starting signals, and in that electroresponsive means is connected in a circuit extending from the point of joinder of said fixed legs to the point of joinder of said variable legs for causing operation of said switching means when said variable legs are of unequal ohmic value to give a starting signal to correct the inequality of up and down cars.

17. A dispatching system for a plurality of elevator cars comprising, dispatching means for said cars operable with the cars distributed so as to be balanced with respect to any one of a plurality of traffic conditions to dispatch the cars to continue that distribution, selective means for setting the dispatching means for operation under any one of said traffic conditions, and means operable, upon operation of said selective means to set the dispatching means for operation under a different traffic condition to automatically dispatch the cars to distribute them according to the new traffic conditions for which the dispatching mechanism is set, regardless of their distribution at the time said selective means is operated.

18. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars for operation under different traffic conditions, manually operable switching mechanism for setting the system for operation under said different traffic conditions, a bridge circuit having two variable legs, means controlled by the ratio of up cars to down cars and by the giving of said signals for controlling said variable legs to unbalance said bridge when the cars are not distributed in accordance with the traffic conditions for which the system is set, and electroresponsive means connected across the diagonal of the bridge operable upon an unbalance of said bridge to cause the giving of a starting signal for correcting the distribution.

19. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars to dispatch them for conditions of approximately equal up and down traffic or for conditions of up and down traffic with traffic predominance in one direction, manually operable switching mechanism for setting the system for operation under said different traffic conditions, a bridge circuit, means operable to unbalance said bridge when the cars are not distributed in accordance with the traffic conditions for which the system is set by said switching mechanism, and means responsive to an unbalance of said bridge for controlling the giving of the starting signals to place the cars in proper distribution.

20. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said signals, a manually operable plural position switch, means controlled by said switch for setting the dispatching mechanism for operation to dispatch the cars for conditions for approximately equal up and down traffic or for conditions of up and down traffic with traffic predominance in one direction, and balancing means operable, when said switch is operated from one position to another, to automatically dispatch the cars to balance them against the traffic conditions corresponding to the new position of the switch, should they be out of said balance.

21. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means operable under conditions of approximately equal up and down traffic or under conditions of traffic predominance in either the up direction or the down direction and with the cars distributed so as to be balanced against the particular traffic conditions, to cause said dispatching mechanism to initiate said signals to dispatch the cars to continue that distribution, a manually operable three position traffic distributor switch, one position for approximately equal up and down traffic, another position for up and down traffic with traffic predominance in the up direction and the remaining position for up and down traffic with traffic predominance in the down direction, means responsive to said switch for setting the system for operation under that one of said traffic conditions for which the switch is set, a bridge circuit, means operable when, upon movement of said switch from any one of its said positions to another, the cars are out of balance with respect to the traffic conditions for the new position to which the switch has been moved for causing the bridge to be unbalanced, and means responsive to an unbalance of said bridge for causing the giving of a starting signal to dispatch a car in a direction to place the cars in balance.

22. A dispatching system for a plurality of elevator cars comprising, a plurality of up starting signals, one for each car, adapted to be given to the respective cars to dispatch them on up trips, a plurality of down starting signals, one for each car, adapted to be given to the respective cars to dispatch them on down trips, dispatching mechanism operable at regular intervals of time to initiate the giving of said up signals and down signals to the respective cars, means operable under conditions of approximately equal up and down traffic or under conditions of traffic predominance in either the up direction or the down direction and with the cars distributed so as to be balanced against the particular traffic conditions to cause said dispatching mechanism to initiate said signals to dispatch the cars to continue that distribution, a manually operable three position switch, one position for each of said traffic conditions, means controlled by said switch for setting the dispatching mechanism for operation under that one of said traffic conditions for which the switch is set, and balancing means operable, when said switch is moved from any one of its said positions to another, to cause the automatic dispatching of the cars to distribute them for the traffic conditions corresponding to the new position of the switch.

23. A dispatching system for a plurality of elevator cars in which the cars are given up starting signals to dispatch them on up trips and down starting signals to dispatch them on down trips and in which dispatching mechanism is operable under conditions of up and down traffic with traffic in one direction predominant and with the cars distributed to be more on the trip in the direction of predominant traffic than on the trip in the other direction to cause the up and down signals to be given to said cars to dispatch them so as to continue that distribution, characterized in that a balancing device is provided which is controlled by the ratio of up cars to down cars for causing, when the cars are not so distributed, the giving of a starting signal to restore said distribution.

24. A dispatching system for a plurality of elevator cars in which the cars are dispatched by starting signals, in which dispatching mechanism is provided which is operable with the cars distributed to balance them against the traffic to cause the said starting signals to be given to the cars to dispatch them so as to continue that distribution, and in which means is provided for changing the number of cars subject to the dispatching mechanism, characterized in that balancing means is provided which is controlled by said changing means for automatically causing the cars to be dispatched to properly distribute them for the new number of cars in service, regardless of their distribution at the time said changing means is operated.

25. A dispatching system for a plurality of elevator cars in which the cars are given up starting signals to dispatch them on up trips and down starting signals to dispatch them on down trips initiated by dispatching mechanism, in which means is provided for causing either an even number of cars or an odd number of cars to be subject to the dispatching mechanism, and in which means is provided for causing the dispatching mechanism to initiate such signals either simultaneously or alternately, depending on whether the number of cars in service is even or odd and on whether the traffic is approximately equal in each direction or is predominant in one direction, to balance the cars against traffic, characterized in that switching means is provided which is responsive to a change from an even number to an odd number of cars or vice versa for causing the cars to be given signals to dispatch them so as to automatically balance the new number of cars against the traffic conditions.

26. A dispatching system for a plurality of elevator cars in which to dispatch the cars they are given starting signals initiated by dispatching mechanism, characterized in that selective means is provided for setting the system for operation under conditions of approximately equal up and down traffic or under conditions of up and down traffic with traffic predominant in one direction and that means controlled by the relationship of the cars to traffic conditions is provided which is operable upon operation of said selective means to set the system for a different one of said traffic conditions to cause starting signals to be given to automatically dispatch the cars to distribute them according to the new traffic conditions for which said system is set, regardless of the position of the cars when said selective means is operated.

27. A dispatching system for a plurality of elevator cars in which the cars are given starting signals by dispatching mechanism and in which the system may be set for operation under conditions of approximately equal up and down traffic, under conditions of up and down traffic with traffic predominant in the up direction or under conditions of up and down traffic with traffic predominant in the down direction characterized in that a manually operable selecting device is provided for setting the system for operation under said different traffic conditions and that means controlled by the relationship of the cars to traffic conditions is provided which is operable upon operation of said selecting device to change the setting from any one of said traffic conditions to any other to automatically give the starting signals to the cars to distribute them according to the new traffic conditions for which said system is set, regardless of the distribution of the cars at the time said device is operated.

28. A dispatching system for a plurality of elevator cars in which the cars are dispatched on up trips by up starting signals and on down trips by down starting signals, in which said signals are initiated by dispatching mechanism and in which the dispatching mechanism is operable to initiate such signals to dispatch said cars either for conditions of approximately equal up and down traffic or for conditions of up and down traffic with traffic predominance either in the up direction or the down direction so that with the cars distributed so as to be balanced against the particular traffic conditions they will be dispatched to continue that distribution, characterized in that a manually operable three position traffic distributor switch is provided, one position for approximately equal up and down traffic, another position for up and down traffic with traffic predominance in the up direction and the remaining position for up and down traffic with traffic predominance in the down direction, in that means is provided which is responsive to said switch for setting the dispatching mechanism for operation under that one of said up and down traffic conditions for which the switch is set, and in that balancing means is provided for causing when, upon operation of said switch from any one of said positions to another, the cars are out of balance with respect to the traffic conditions for the new position in which said switch is set, the giving of a starting signal to dispatch a car in a direction to place the cars in balance.

29. In a dispatching system for a plurality of elevator cars, a balancing device comprising, a bridge circuit having two fixed legs and two variable legs, current conducting means for each car adapted for connection in either variable leg, switching means for each car for connecting said current conducting means for that car in one of said variable legs when that car is an up car and in the other of said variable legs when that car is a down car, and electro-responsive means responsive to an unbalance of said bridge for controlling the dispatching of the cars.

30. In a dispatching system for a plurality of elevator cars, a balancing device comprising, a bridge circuit having two fixed legs and two variable legs, two current conducting means of equal impedance for each car, switching means for each car for connecting both of said current conducting means for that car in one of said variable legs when that car is an up car and in the other of said variable legs when that car is a down car and for connecting one of said current conducting means for that car in one of said variable legs and the other in the other variable leg when the car is cut out, and electroresponsive means responsive to an unbalance of said bridge for controlling the dispatching of the cars.

31. A dispatching system for a plurality of elevator cars, comprising mechanism for dispatching said cars, a bridge circuit having two fixed legs and two variable legs, two current conducting means of equal impedance for each car, switching means for each car for connecting both of said current conducting means for that car in one of said variable legs when that car is an up car and in the other of said variable legs when that car is a down car, a plurality of current conducting means controlled by said dispatching mechanism to balance said variable legs when under certain conditions said current conducting means for said cars render them out of balance, and electroresponsive means connected across the diagonal of said bridge for also dispatching said cars.

32. A dispatching system for a plurality of elevator cars comprising, up starting signals for said cars, down starting signals for said cars, mechanism for dispatching said cars for causing said up signals and down signals to be given either alternately or simultaneously, a bridge circuit having two fixed legs and two variable legs, two resistances of equal ohmic value for each car, switching means for each car for connecting both of said resistances for that car in one of said variable legs when that car is an up car and in the other of said variable legs when that car is a down car, four additional resistances, each of the same ohmic value as each of said first mentioned resistances, means controlled by said dispatching mechanism for controlling connecting said additional resistances in said variable legs, means for rendering all four of said additional resistances effective when said signals are being given simultaneously and for rendering but two of said additional resistances effective when said signals are being given alternately, and electroresponsive means connected across the diagonal of said bridge for also controlling the giving of said starting signals when the bridge is unbalanced.

GAVIN WATSON.

REFERENCES CITED

The following references are of record in the file of this patent:

UNITED STATES PATENTS

| Number | Name | Date |
|---|---|---|
| 1,948,748 | Ellis | Feb. 28, 1934 |
| 1,966,071 | Larson | July 10, 1934 |
| 2,121,587 | Eames | June 21, 1938 |
| 2,177,400 | Almquist | Oct. 24, 1939 |
| 2,262,393 | Eames | Nov. 11, 1941 |
| 2,290,714 | Searles | July 21, 1942 |